United States Patent
Luo

(10) Patent No.: US 10,904,408 B2
(45) Date of Patent: Jan. 26, 2021

(54) PICTURE FILE PROCESSING METHOD, DEVICE, AND COMPUTER STORAGE MEDIUM

(71) Applicant: Tencent Technology (Shenzhen) Company Limited, Shenzhen (CN)

(72) Inventor: Binji Luo, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 88 days.

(21) Appl. No.: 16/415,912

(22) Filed: May 17, 2019

(65) Prior Publication Data
US 2019/0273841 A1 Sep. 5, 2019

Related U.S. Application Data

(63) Continuation of application No. PCT/CN2018/079104, filed on Mar. 15, 2018.

(30) Foreign Application Priority Data

Apr. 8, 2017 (CN) .......................... 2017 1 0225914

(51) Int. Cl.
*H04N 1/60* (2006.01)
*H04N 19/182* (2014.01)
*H04N 19/186* (2014.01)
*H04N 1/54* (2006.01)
(Continued)

(52) U.S. Cl.
CPC ............. *H04N 1/6016* (2013.01); *H04N 1/54* (2013.01); *H04N 19/182* (2014.11);
(Continued)

(58) Field of Classification Search
CPC .. H04N 19/60; H04N 19/167; H04N 1/40012; G06K 9/4604; G06K 9/3233
See application file for complete search history.

(56) References Cited

U.S. PATENT DOCUMENTS 7,106,366 B2 * 9/2006 Parker ................. H04N 19/176
  348/222.1
7,454,074 B2 * 11/2008 Dekel .................. H04N 1/3873
  375/E7.013
(Continued)

FOREIGN PATENT DOCUMENTS

CN   101459829     6/2009
CN   101540901 A   9/2009
(Continued)

OTHER PUBLICATIONS

International Search Report and Written Opinion from corresponding international application No. PCT/CN2018/079104 with English translation of International Search Report, 12 pgs., dated Apr. 28, 2018.
(Continued)

*Primary Examiner* — Yosef Kassa
(74) *Attorney, Agent, or Firm* — Brinks Gilson & Lione

(57) ABSTRACT

Embodiments of the present application disclose a picture file processing method, device, and computer storage medium. The method includes the following steps: generating, by a transmitter, a picture header information data segment of a picture file according to the picture file, and converting each image frame in the picture file into YUV data; encoding the YUV data to generate data stream, generating compressed image data, and sending the compressed image data to a receiving device, the compressed image data including the picture header information data segment and the data stream; receiving, by the receiving device, the compressed image data, and parsing the compressed image data to acquire the picture header information data segment and the data stream; and generating, by the receiving device, the YUV data according to the data stream,
(Continued)

and processing the YUV data based on the picture header information data segment to generate the picture file.

20 Claims, 35 Drawing Sheets

(51) Int. Cl.
 *H04N 21/2343* (2011.01)
 *H04N 21/4402* (2011.01)
(52) U.S. Cl.
 CPC ... *H04N 19/186* (2014.11); *H04N 21/234318* (2013.01); *H04N 21/234336* (2013.01); *H04N 21/440218* (2013.01); *H04N 21/440236* (2013.01)

(56) References Cited

U.S. PATENT DOCUMENTS

| | | | | |
|---|---|---|---|---|
| 7,793,205 B2* | 9/2010 | Errico | ................ | H04N 21/8549 715/201 |
| 8,111,933 B2* | 2/2012 | Furihata | .................... | G06T 9/00 382/244 |
| 8,270,734 B2* | 9/2012 | Romanovskiy | ...... | H04N 19/186 382/232 |
| 8,582,862 B2* | 11/2013 | Nepomniachtchi | .... | G06K 9/036 382/137 |
| 9,094,615 B2* | 7/2015 | Aman | ................ | H04N 5/23238 |
| 2008/0112634 A1 | 5/2008 | Romanovkiy | | |

FOREIGN PATENT DOCUMENTS

| | | |
|---|---|---|
| CN | 104333762 A | 2/2015 |
| CN | 106899861 A | 6/2017 |

OTHER PUBLICATIONS

Office Action regarding Chinese Patent Application No. CN20171022599141 dated Feb. 5, 2018 with concise English translation, 12 pages.

* cited by examiner

| Global color table information | | | Trained color table information | |
|---|---|---|---|---|
| Color index | Source RGB value | | Color index | Source RGB value |
| ... | ... | | ... | ... |
| 5 | (8, 1, 10) | ⇨ | 5 | (8, 1, 10) |
| 6 | (8, 9, 8) | | 6 | (1, 7, 6) |
| 7 | (1, 7, 6) | | 7 | (5, 8, 5) |
| 8 | (10, 8, 6) | | 8 | (10, 8, 6) |
| 9 | (5, 8, 5) | | 9 | (8, 9, 8) |
| 10 | (9, 10, 1) | | 10 | (9, 10, 1) |
| ... | ... | | ... | ... |

FIG. 3

RGB data

| First pixel<br><br>RGB value = (9, 9, 9) | Second pixel<br><br>RGB value = (4, 9, 6) |
|---|---|
| Third pixel<br><br>RGB value = (5, 8, 7) | Fourth pixel<br><br>RGB value = (1, 1, 1) |

Trained color table information

| Color index | Source RGB value |
|---|---|
| ... | ... |
| 5 | (8, 1, 10) |
| 6 | (1, 7, 6) |
| 7 | (5, 8, 5) |
| 8 | (10, 8, 6) |
| 9 | (8, 9, 8) |
| 10 | (9, 10, 1) |
| ... | ... |

FIG. 4

RGB data

| First pixel<br><br>RGB value = (9, 9, 9) | Second pixel<br><br>RGB value = (4, 9, 6) |
|---|---|
| Third pixel<br><br>RGB value = (5, 8, 7) | Fourth pixel<br><br>RGB value = (1, 1, 1) |

Trained color table information

| Color index | Source RGB value |
|---|---|
| ... | ... |
| 5 | (8, 1, 10) |
| 6 | (1, 7, 6) |
| 7 | (5, 8, 5) |
| 8 | (9, 9, 8) |
| 9 | (9, 9, 9) |
| 10 | (9, 9, 7) |
| ... | ... |

FIG. 5

RGB data

| First pixel<br><br>8 | Second pixel<br><br>10 |
|---|---|
| Third pixel<br><br>9 | Fourth pixel<br><br>6 |

Local color table information

| Color index | Source RGB value |
|---|---|
| ... | ... |
| 5 | (2, 1, 3) |
| 6 | (1, 1, 1) |
| 7 | (2, 2, 2) |
| 8 | (9, 9, 8) |
| 9 | (5, 9, 6) |
| 10 | (4, 9, 6) |
| ... | ... |

FIG. 6

PICTURE FILE PROCESSING METHOD, DEVICE, AND COMPUTER STORAGE MEDIUM

RELATED APPLICATION

This application is a continuation of International Application number PCT/CN2018/079104, filed Mar. 15, 2018, which claims priority to Chinese Patent Application No. 201710225914.1, filed with the China National Intellectual Property Administration on Apr. 8, 2017, both of which applications are incorporated herein by reference in their entireties.

FIELD OF THE TECHNOLOGY

The present application relates to the field of computer technologies, and in particular, to a picture file processing method, device, and computer storage medium.

BACKGROUND OF THE DISCLOSURE

A picture file may be a single-frame image or an animation that includes a plurality of consecutive image frames. With the ongoing development of computer technologies, picture files are widely applied to, for example, instant messaging, and web page presentation. However, a picture file has relatively complex content and as a result has a relatively large amount of file data. Therefore, relatively large bandwidth needs to be consumed to transmit picture files, leading to an increase in bandwidth costs.

SUMMARY

Embodiments of the present application provide a picture file processing method, device, and computer storage medium, to reduce an amount of file data of a picture file during transmission and reduce bandwidth costs.

An embodiment of the present application provides a picture file processing method. The method may include receiving, by a receiving device comprising a memory and a processor in communication with the memory, compressed image data transmitted by a transmitter. The method may include parsing, by the receiving device, the compressed image data to acquire picture header information data segment and data stream of a picture, wherein the picture header information data segment represents a starting of the compressed image data and comprises an image feature information segment which is used for representing at least one of delay information, a total number of frames, and global color table information of the picture. the method may further include generating, by the receiving device, YUV data according to the data stream of the picture; and converting, by the receiving device, the YUV data into RGB data based on the picture header information data segment.

An embodiment of the present application provides a picture file processing apparatus. The apparatus may include a processor; and a memory in communication with the processor. The memory stores processor-executable instructions, that when executed by the processor, cause the processor to receive compressed image data transmitted by a transmitter. The instructions may further cause the processor to parse the compressed image data to acquire picture header information data segment and data stream of a picture, wherein the picture header information data segment represents a starting of the compressed image data and comprises an image feature information segment which is used for representing at least one of delay information, a total number of frames, and global color table information of the picture. The instructions may also cause the processor to generate YUV data according to the data stream of the picture; and convert the YUV data into RGB data based on the picture header information data segment.

An embodiment of the present application further provides a non-transitory computer readable medium. The non-transitory computer readable medium may store a computer-executable program, The computer-executable program, when executed by a processor, may cause the processor to receive compressed image data transmitted by a transmitter; and parse the compressed image data to acquire picture header information data segment and data stream of a picture, wherein the picture header information data segment represents a starting of the compressed image data and comprises an image feature information segment which is used for representing at least one of delay information, a total number of frames, and global color table information of the picture. The computer-executable program may further cause the processor to generate YUV data according to the data stream of the picture; and convert the YUV data into RGB data based on the picture header information data segment.

In the embodiments of the present application, a picture header information data segment of a picture file is generated according to the picture file, each image frame in the picture file is converted into YUV data, compressed image data is then generated based on the picture header information data segment and data stream that is obtained by encoding the YUV data, and the compressed image data is transmitted. The YUV data may be generated according to the data stream when the compressed image data is received, and the YUV data is then processed based on the picture header information data segment to generate the picture file. Each image frame in the picture file having a relatively large amount of file data is converted into the YUV data having a relatively small amount of data, and the YUV data is then encoded to obtain the data stream, so that an amount of file data of the picture file during transmission is greatly reduced, and bandwidth costs are reduced.

BRIEF DESCRIPTION OF THE DRAWINGS

To describe the technical solutions of the embodiments of the present application or the existing technology more clearly, the following briefly describes the accompanying drawings required for describing the embodiments or the existing technology. The accompanying drawings in the following description show only some embodiments of the present application, and a person of ordinary skill in the art may still derive other drawings from these accompanying drawings without creative efforts.

FIG. 3 is a schematic diagram of an example of processing a picture file according to an embodiment of the present application.

FIG. 4 is a schematic diagram of another example of processing a picture file according to an embodiment of the present application.

FIG. 5 is a schematic diagram of still another example of processing a picture file according to an embodiment of the present application.

FIG. 6 is a schematic diagram of still another example of processing a picture file according to an embodiment of the present application.

DESCRIPTION OF EMBODIMENTS

Figure 1:
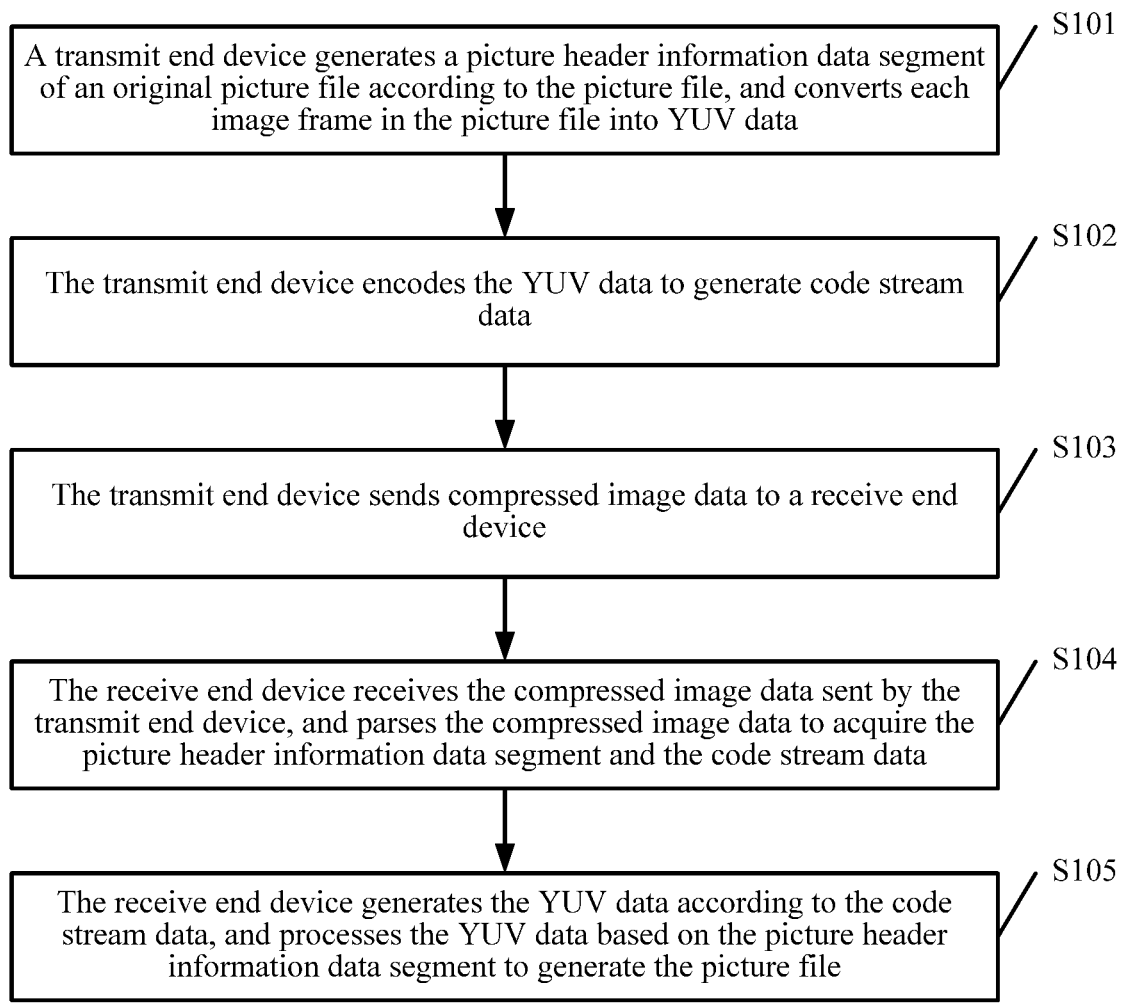
FIG. 1 is a schematic flowchart of a picture file processing method according to an embodiment of the present application.

The following clearly and completely describes the technical solutions in the embodiments of the present application with reference to the accompanying drawings in the embodiments of the present application. Apparently, the described embodiments are merely some of the embodiments of the present application rather than all of the embodiments. All other embodiments obtained by a person of ordinary skill in the art based on the embodiments of the present application without creative efforts shall fall within the protection scope of the present disclosure.

A picture file processing method provided in the embodiments of the present application may be applied to a scenario of encoding, decoding, and transmitting a picture file, for example, an instant messaging scenario, and a web page presentation scenario, for example, in a scenario, a transmitter generates a picture header information data segment of an original picture file according to the picture file, converts each image frame in the picture file into YUV data, encodes the YUV data to generate data stream, generates compressed image data, and sends the compressed image data to a receiving device, the compressed image data including the picture header information data segment and the data stream; and the receiving device receives the compressed image data sent by the transmitter, parses the compressed image data to acquire the picture header information data segment and the data stream, generates the YUV data according to the data stream, and encodes the YUV data based on the picture header information data segment to generate the picture file. Each image frame in the picture file having a relatively large amount of file data is converted into the YUV data having a relatively small amount of data, and the YUV data is then encoded to obtain the data stream, so that an amount of file data of the picture file during transmission is greatly reduced, and bandwidth costs are reduced.

The transmitter used in the embodiments of the present application may be a terminal device or a backend service device that has functions such as picture file decoding and encoding, or may be an image processing module in the terminal device or service device. The receiving device may be a terminal device or a backend service device that has functions such as picture file encoding and video decompression or may be an image processing module in the terminal device or service device. The terminal device may include a computer, a tablet computer, a smartphone, a notebook computer, a palmtop computer, a mobile Internet device (MID), and the like. The transmitter and the receiving device are two ends that are applicable to various scenarios, for example, in an instant messaging scenario, the transmitter may be a terminal device that sends a picture file, and the receiving device may be a backend service device of an instant messaging application that receives the picture file. Alternatively, the transmitter may be a backend service device of an instant messaging application that forwards a picture file, and the receiving device is a terminal device that receives the picture file. In a scenario of transmitting data using Bluetooth, infrared or a data line, the transmitter may be a terminal device that sends a picture file, and the receiving device may be a terminal device that receives the picture file. The scenario is merely an example for description. Types of the transmitter and the receiving device may be determined according to an actual operation scenario. All scenarios that include picture file encoding, decoding, and transmission fall within the protection scope of the embodiments of the present application. The picture file may be an image in any one of a Graphics Interchange Format (GIF), an Audio Video Interleaved (AVI) format, a ShockWave Flash (SWF) format, and a bitmapped animation format (Animated Portable Network Graphics, APNG).

Common terms used in the embodiments of the present application are described below:

An image is used for representing a picture frame in a picture file.

A picture is used for representing a complete image file and may include one or more image frames.

A component is used for representing one of three sample matrices of an image or a single sample in the matrix.

A luminance is used for representing a sample matrix of a luminance signal Y or a single sample in the sample matrix.

A chrominance is used for representing a sample matrix of either of two color difference signals Cr and Cb or a single sample in the sample matrix.

Data stream is used for representing encoded data and may also be referred to as video frame data or the like.

An image feature information segment is used for representing delay information, a total number of frames, global color table information, and the like of a picture file.

A user-defined information segment is used for representing information such as a configuration parameter and an encoder complexity input to encode Red Green Blue (RGB) data or YUV data.

A picture header information data segment is used for representing a start end of compressed image data and may include an image feature information segment and a user-defined information segment.

Compressed image data is used for representing data generated by encapsulating data stream and a picture header information data segment in a picture format and may also be referred to as an image sequence, a compressed code stream, or the like.

The picture file processing method provided in the embodiments of the present application are described below in detail with reference to FIG. 1 to FIG. 22.

FIG. 1 is a schematic flowchart of a picture file processing method according to an embodiment of the present application. A specific procedure of the picture file processing method is described from the perspectives of both a transmitter and a receiving device in this embodiment of the present application. The method may include the following steps S101 to S105.

S101: A transmitter generates a picture header information data segment of an original picture file according to the picture file, and converts each image frame in the picture file into YUV data.

In some embodiments, the transmitter may decode the original picture file to generate the picture header information data segment of the picture file. The picture file may be an image input after a developer finishes making an image or may be an image received from another end. The picture header information data segment may include delay information, a total number of frames, and the like of the picture file. The delay information records a play interval between image frames in the picture file. The total number of frames is a quantity of image frames in the picture file. It may be understood that the picture header information data segment may further include global color table information of the picture file. The global color table information includes an RGB value of each pixel in each image frame. All images included in some picture files share the global color table information, and each image frame in some other picture files has respective local color table information. Therefore, the global color table information is acquired if the picture file has the global color table information, and the local color table information is not acquired if the picture file has only the local color table information. The transmitter further converts each image frame in the picture file into the YUV data.

S102: The transmitter encodes the YUV data to generate data stream.

In some embodiments, the transmitter may further encode the YUV data to generate the data stream. The encoding may include one or more of predictive coding, transform coding, quantization coding, and entropy coding. For example, the transmitter may compress the YUV data in IPPP mode. The first frame of the YUV data is an I frame. The I frame is an intra-frame prediction frame. The remaining frames of the YUV data are P frames. The P frame is an inter-frame prediction frame. Therefore, an amount of file data of the picture file can be effectively reduced, and a constant quantization parameter (Quantization Parameter, QP) mode can further be used to stabilize quality and the like of different frames. The entropy coding may include Huffman coding, arithmetic coding, and the like.

S103: The transmitter sends compressed image data to a receiving device.

In some embodiments, the transmitter may generate the compressed image data. The transmitter may store the compressed image data. The transmitter then sends the compressed image data to the receiving device when detecting a request from the receiving device for the picture file, for example, when detecting that a web page including the picture file is opened. Alternatively, the transmitter may directly send the compressed image data to the receiving device, for example, when one client of an instant messaging application needs to send the picture file to another client, or when an application service device needs to forward the picture file. The compressed image data includes the picture header information data segment and the data stream.

S104: The receiving device receives the compressed image data sent by the transmitter, and parses the compressed image data to acquire the picture header information data segment and the data stream.

In some embodiments, the receiving device receives the compressed image data sent by the transmitter, and the receiving device may parse the compressed image data to acquire the picture header information data segment and the data stream in the compressed image data.

S105: The receiving device generates the YUV data according to the data stream, and processes the YUV data based on the picture header information data segment to generate the picture file.

In some embodiments, the receiving device decodes the data stream to generate the YUV data, and encodes the YUV data based on the delay information, the total number of frames, the global color table information, and the like in the picture header information data segment to generate the picture file.

In this embodiment of the present application, a picture header information data segment of an original picture file is generated according to the picture file, each image frame in the picture file is converted into YUV data, compressed image data is then generated based on the picture header information data segment and data stream that is obtained by encoding the YUV data, and the compressed image data is transmitted. The YUV data may be generated according to the data stream when the compressed image data is received, and the YUV data is then processed based on the picture header information data segment to generate the picture file. Each image frame in the picture file having a relatively large amount of file data is converted into the YUV data having a relatively small amount of data, and the YUV data is then encoded to obtain the data stream, so that an amount of file data of the picture file during transmission is greatly reduced, and bandwidth costs are reduced.

Figure 2:
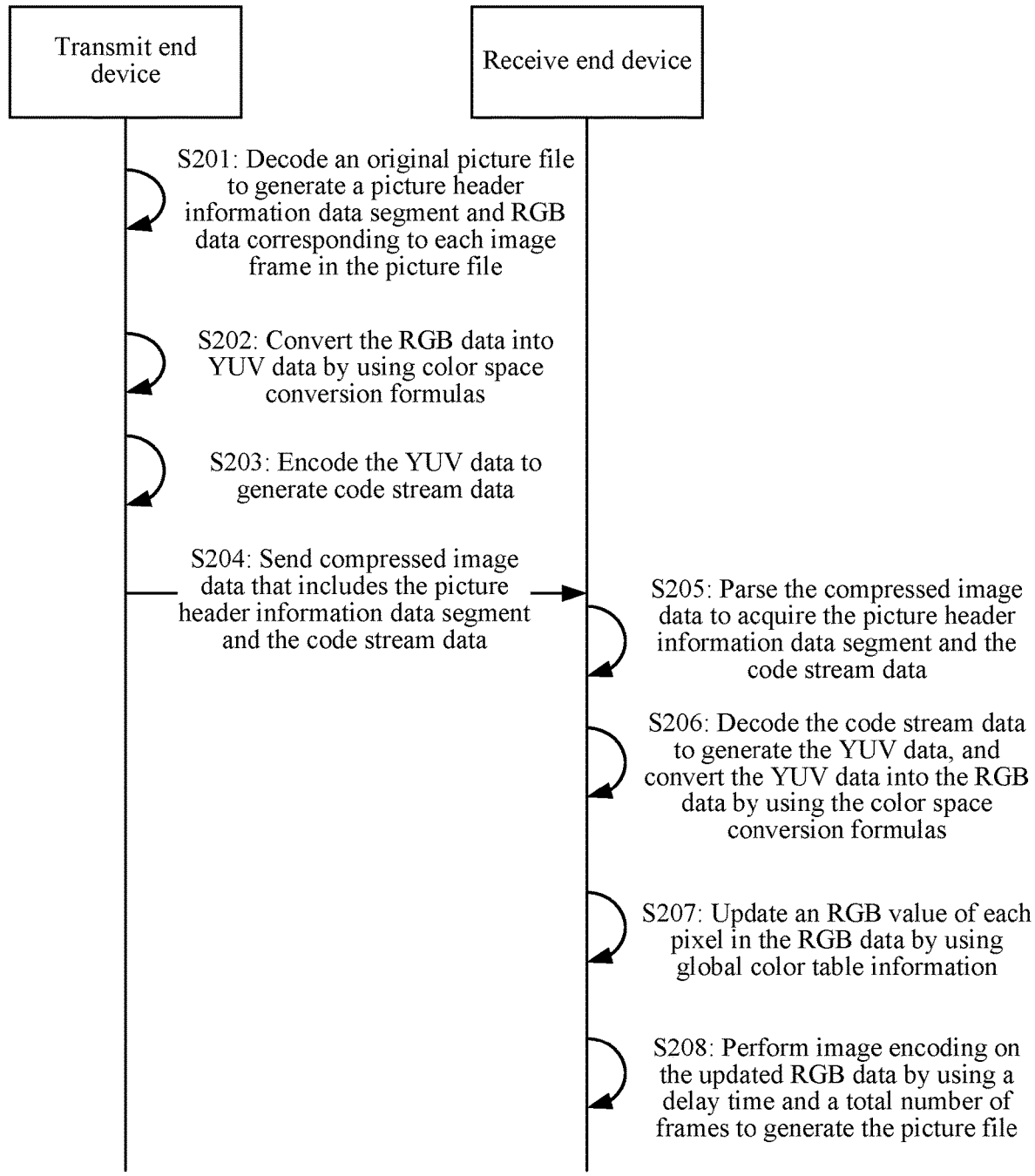
FIG. 2 is a procedure sequence diagram of a picture file processing method according to an embodiment of the present application.

FIG. 2 is a procedure sequence diagram of a picture file processing method according to an embodiment of the present application. A specific procedure of the picture file processing method is described from the perspectives of both a transmitter and a receiving device in this embodiment of the present application. The method may include the following steps S201 to S208.

S201: The transmitter decodes an original picture file to generate a picture header information data segment of the picture file and RGB data corresponding to each image frame in the picture file.

In some embodiments, the transmitter may decode the original picture file to generate the picture header information data segment of the picture file and the RGB data corresponding to each image frame in the picture file. The picture file may be an image input after a developer finishes making an image or may be an image received from another end. The picture header information data segment may include delay information, a total number of frames, and the like of the picture file. The delay information records a play interval between image frames in the picture file. The total number of frames is a quantity of image frames in the picture file. It may be understood that the picture header information data segment may further include global color table information of the picture file. The global color table information includes an RGB value of each pixel in each image frame. All images included in some picture files share the global color table information, and each image frame in some other picture files has respective local color table information. Therefore, the global color table information is acquired if the picture file has the global color table information, and the local color table information is not acquired if the picture file has only the local color table information.

S202: The transmitter converts the RGB data into YUV data by using color space conversion formulas.

In some embodiments, the transmitter may convert the RGB data into the YUV data by using the color space conversion formulas. During the conversion of the RGB data into the YUV data, color space conversion formulas in which a domain range of a luminance component is [16, 235] and a domain range of a chrominance component is [16, 240] may be selected. Because the ranges are reduced, the YUV data obtained after conversion can have a greatly reduced amount of data but has relatively severe distortion. Alternatively, color space conversion formulas in which domain ranges of both a luminance component and a chrominance component are [0, 255] may be selected. In this case, the YUV data obtained after conversion can have less severe distortion but has a relatively large amount of data, and the color space conversion formulas in which the domain ranges of both the luminance component and the chrominance component are [0, 255] are:

$$Y=0.299R+0.587G+0.114B;$$

$$U=-0.1687R-0.3313G+0.5B+128;\text{ and}$$

$$V=0.5R-0.4187G-0.0813B+128,\text{ where}$$

YUV is a video data format, Y is a luminance component, UV is a chrominance component, and raster-scan processing may be performed on pixels in each image frame by using the color space conversion formulas to convert each frame of the RGB data into corresponding YUV data.

S203: The transmitter encodes the YUV data to generate data stream.

In some embodiments, the transmitter may further encode the YUV data to generate the data stream. The encoding may include one or more of predictive coding, transform coding, quantization coding, and entropy coding. For example, the transmitter may compress the YUV data in IPPP mode. The first frame of the YUV data is an I frame. The I frame is an intra-frame prediction frame. The remaining frames of the YUV data are P frames. The P frame is an inter-frame prediction frame. Therefore, an amount of file data of the picture file can be effectively reduced, and a constant QP mode can further be used to stabilize quality and the like of different frames. The entropy coding may include Huffman coding, arithmetic coding, and the like.

Further, during encoding of the YUV data, it may be supported that a user adds a configuration parameter. The configuration parameter may be a parameter for encoding the YUV data. The configuration parameter may include any one of a standard definition mode parameter, a high definition mode parameter, and a lossless mode parameter. The standard definition mode parameter (for example, a YUV420 mode parameter) may be selected when reduced bandwidth is required. The high definition mode parameter (for example, a YUV444 mode parameter) may be selected when image quality is required. The transmitter may encode the YUV data by using the configuration parameter to generate the data stream.

In some embodiments, during encoding of the YUV data, it may further be supported that a user adds an encoder complexity, and the encoder complexity may be an encoding fineness parameter determined according to hardware performance of the transmitter. The encoder complexity may include any one of a first complexity, a second complexity, and a third complexity. The first complexity is higher than the second complexity, and the second complexity is higher than the third complexity. For example, the hardware performance of the transmitter may be detected to generate a performance value. For example, a computational rate or the like of a central processing unit (CPU) of the transmitter is tested. It may be determined that the transmitter has very high hardware performance when the performance value is in a first preset value range, and it may be recommended to use an encoding scheme with the first complexity. It may be determined that the transmitter has medium hardware performance when the performance value is in a second preset value range, and it may be recommended to use an encoding scheme with the second complexity. It may be determined that the transmitter has relatively poor hardware performance or currently real-time transcoding or the like is required when the performance value is in a third preset value range, and it may be recommended to use an encoding scheme with the third complexity. The transmitter may configure the encoder complexity to encode the YUV data to generate the data stream.

It should be noted that the foregoing two encoding schemes may be parallel encoding schemes. To be specific, the transmitter may use both the configuration parameter and the configured encoder complexity to encode the YUV data to generate the data stream. The performance value, the first preset value range, the second preset value range, and the third preset value range may be specifically set according to the experience of a developer.

S204: The transmitter sends compressed image data to a receiving device.

In some embodiments, the transmitter may generate the compressed image data. The transmitter may store the compressed image data. The transmitter then sends the compressed image data to the receiving device when detecting a request from the receiving device for the picture file, for example, when detecting that a web page including the picture file is opened. Alternatively, the transmitter may directly send the compressed image data to the receiving device, for example, when one client of an instant messaging application needs to send the picture file to another client, or when an application service device needs to forward the picture file. The compressed image data includes the picture header information data segment and the data stream.

S205: The receiving device receives the compressed image data sent by the transmitter, and parses the compressed image data to acquire the picture header information data segment and the data stream.

In some embodiments, the receiving device receives the compressed image data sent by the transmitter, and the receiving device may parse the compressed image data to acquire the picture header information data segment and the data stream in the compressed image data.

S206: The receiving device decodes the data stream to generate the YUV data, and converts the YUV data into the RGB data by using the color space conversion formulas.

In some embodiments, the receiving device decodes the data stream to generate the YUV data, and may convert the YUV data into the RGB data by using the color space conversion formulas. Further, the receiving device needs to determine used color space conversion formulas according to a domain range of a luminance component. It may be understood that for YUV data in a YUV444 mode, color space conversion formulas in which a domain range of a luminance component is [16, 235] and a domain range of a chrominance component is [16, 240] may be selected, or color space conversion formulas in which domain ranges of both a luminance component and a chrominance component are [0, 255] may be selected. Specifically, the selected color space conversion formulas may correspond to the color space conversion formulas selected to convert the RGB data into the YUV data in the foregoing embodiments. It should be noted that the chrominance includes a sample matrix of either of two color difference signals Cb and Cr or a single sample in the sample matrix. Upsampling processing needs to be separately performed on the two color difference signals in a same manner. Cb corresponds to U in YUV, and Cr corresponds to V in YUV.

If the domain range of the luminance component is [16, 235] and the domain range of the chrominance component is [16, 240], the color space conversion formulas are:

$$R=\text{Clip3}(0,255,(298*Y+409*(Cr-128)+128)>>8);$$

$$G=\text{Clip3}(0,255,(298*Y-100*(Cb-128)+208*(Cr-128)+128)>>8); \text{ and}$$

$$B=\text{Clip3}(0,255,(298*Y+516*(Cb-128)+128)>>8),$$

where

"+128" is used for rounding the value of R, the value of B, and the value of G, and ">>8" represents division by the eighth power of 2.

If the domain ranges of the luminance component and the chrominance component are both [0, 255], the color space conversion formulas are:

$$R=\text{Clip3}(0,255,Y+(359*(Cr-128)+128)>>8);$$

$$G=\text{Clip3}(0,255,Y-(88*(Cb-128)+183*(Cr-128)+128)>>8); \text{ and}$$

$$B=\text{Clip3}(0,255,Y+(454*(Cb-128)+128)>>8), \text{ where}$$

"+128" is used for rounding the value of R, the value of B, and the value of G, and ">>8" represents division by the eighth power of 2.

Raster-scan processing may be performed on pixels in each image frame by using the color space conversion formulas to convert each frame of the YUV data into corresponding RGB data.

S207: The receiving device updates an RGB value of each pixel in the RGB data by using global color table information.

In some embodiments, because the YUV data is encoded previously, the RGB data obtained by converting the YUV data is distorted, and the receiving device may update the RGB value of each pixel in the RGB data by using the global color table information. It may be understood that the RGB data may include one or more pixels. When the RGB data has only one pixel, the RGB value of the pixel may be updated by using the global color table information. When the RGB data has a plurality of pixels, the RGB value of each of the plurality of pixels may be updated by using the global color table information. The receiving device needs to train the global color table information again to generate local color table information that meets the RGB data. The receiving device may generate initial color table information if there is no global color table information, and train the initial color table information to generate the local color table information that meets the RGB data. A specific processing process is as follows:

In a first implementation of this embodiment of the present application, the receiving device may train the global color table information by using the RGB value of each pixel in the RGB data to generate the local color table information of the RGB data when the RGB data is the first image frame in the picture file and the picture header information data segment has the global color table information, and update the RGB value of each pixel by using the local color table information of the RGB data.

Further, the receiving device may sort at least one source RGB value in the global color table information in a preset sorting manner (for example, ascending order or descending order) of the G component to generate trained color table information when the RGB data is the first image frame in the picture file and the picture header information data segment has the global color table information. Referring together to FIG. 3, as shown in FIG. 3, the global color table information includes a color index and a source RGB value, for example: 5, (8, 1, 10); 6, (8, 9, 8); 7, (1, 7, 6); 8, (10, 8, 6); 9, (5, 8, 5); 10, (9, 10, 1). The trained color table information may be generated through sorting in ascending order of the G component, for example: 5, (8, 1, 10); 6, (1, 7, 6); 7, (5, 8, 5); 8, (10, 8, 6); 9, (8, 9, 8); 10, (9, 10, 1).

The receiving device acquires, from the trained color table information, a first source RGB value in which the G component is closest to the G component of a current pixel in the RGB data, and acquires a first color index of the first source RGB value. It may be understood that the receiving device may traverse source RGB values in the trained color table information by using the G component of the current pixel to acquire the first source RGB value having the closest G component. Referring together to FIG. 4, it is assumed that the first frame of the RGB data has four pixels, the current pixel is the first pixel in the RGB data, and an RGB value of the current pixel is (9, 9, 9). It may be found from the trained color table information that the G component in (8, 9, 8) is closest to the G component in the RGB value of the current pixel. (8, 9, 8) is determined as the first source RGB value, and it is acquired that a first color index of the first source RGB value is "9".

The receiving device acquires, from the trained color table information in a preset range with the first color index being the center, a second source RGB value having the smallest difference from the RGB value of the current pixel, and acquires a second color index of the second source RGB value. It may be understood that the receiving device may acquire a plurality of source RGB values in the preset range with the first color index being the center, calculate respectively differences of the first source RGB value and the plurality of source RGB values from the RGB value of the current pixel, and determine one of the plurality of source RGB values that has the smallest difference as the second source RGB value. According to the foregoing example, it is assumed that the preset range is a range of the center minus 1 to the center plus 1. "9" is the center, two source RGB values (10, 8, 6) and (9, 10, 1) are acquired, and difference values of (10, 8, 6), (8, 9, 8), and (9, 10, 1) from (9, 9, 9) are calculated respectively. A difference value of the source RGB value with the color index being "8" is |9−10|+|9−8|+|9−6|=5, a difference value of the source RGB value with the color index being "9" is |9−8|+|9−9|+|9−8|=2, and a difference value of the source RGB value with the color index being "10" is |9−9|+|9−10|+|9−1|=9. It is determined that the source RGB value (8, 9, 8) is the second source RGB value, and it is acquired that a second color index of the second source RGB value is "9". It may be understood that the first source RGB value and the first color index acquired in the foregoing may be respectively the same as or different from the second source RGB value and the second color index, depending specifically on an actual execution process.

The receiving device replaces the second source RGB value with the RGB value of the current pixel, and changes the plurality of source RGB values in a preset range with the second color index being the center in the trained color table information by using a preset weight value and the RGB value of the current pixel. Referring together to FIG. 5, according to the foregoing example, the second source RGB value is (8, 9, 8), and (8, 9, 8) is replaced with the RGB value (9, 9, 9) of the current pixel. In addition, the plurality of source RGB values in the preset range with the second color index being the center may be changed according to the preset weight value and the RGB value of the current pixel.

Assuming that the preset range is a range of the center minus 1 to the center plus 1, two source RGB values (10, 8, 6) and (9, 10, 1) need to be changed. The preset weight value may be a dynamic weight value. A source RGB value whose color index is closer to the second color index is affected more significantly by the RGB value of the current pixel. It is assumed that the current distribution of weight values is 2:8. (10, 8, 6) is changed by using (9, 9, 9), for example, the R component=9*0.8+10*0.2=9.2, the G component=9*0.8+8*0.2=8.8, and the B component=9*0.8+6*0.2=8.4. The foregoing results are rounded, so that it is determined that the source RGB value with the color index "8" is changed from (10, 8, 6) into (9, 9, 8). Similarly, the source RGB value with the color index "10" is changed from (9, 10, 1) into (9, 9, 7).

The receiving device acquires the changed trained color table information when the current pixel is not the last pixel in the RGB data, for example, when the current pixel is the first pixel in the RGB data shown in FIG. 4 or FIG. 5, uses a next pixel of the current pixel as a current pixel, and starts to acquire, from the trained color table information, a first source RGB value in which the G component is closest to the G component of a current pixel in the RGB data. For example, the second pixel in the RGB data is used as the current pixel, and the changed trained color table information is then trained again. For a specific training process, refer to the foregoing description of the training process. Details are not described herein.

The receiving device acquires the changed trained color table information when the current pixel is the last pixel in the RGB data, for example, when the current pixel is the fourth pixel in the RGB data shown in FIG. 4 or FIG. 5, and determines the trained color table information as the local color table information of the RGB data.

The receiving device may update the RGB value of each pixel by using the local color table information of the RGB data. Further, the receiving device may sequentially acquire, from the local color table information of the RGB data, a source RGB value with an RGB value that is the same as or has the smallest difference from the RGB value of each pixel to replace the RGB value of the pixel. In some embodiments, the receiving device may use a color index corresponding to a source RGB value with an RGB value that is the same as or has the smallest difference from the RGB value of each pixel to replace the RGB value of the pixel. Referring together to FIG. 6, according to the foregoing example, the RGB value of the first pixel in the RGB data is (9, 9, 9), and (9, 9, 8) in the local color table information has the smallest difference from (9, 9, 9), so that the color index "8" corresponding to (9, 9, 8) is used to replace the RGB value of the first pixel. Similarly, the color index of the second pixel is "10", the color index of the third pixel is "9", and the color index of the fourth pixel is "6".

In a second implementation of this embodiment of the present application, the receiving device may train the initial color table information by using the RGB value of each pixel in the RGB data to generate the local color table information of the RGB data when the RGB data is the first image frame in the picture file and the picture header information data segment does not have the global color table information, and update the RGB value of each pixel by using the local color table information of the RGB data.

Further, the receiving device may generate one piece of initial color table information, for example, (0, 0, 0), (1, 1, 1), (2, 2, 2), ... , and (255, 255, 255), when the RGB data is the first image frame in the picture file and the picture header information data segment does not have the global color table information. The receiving device acquires, from the initial color table information, a third source RGB value in which the G component is closest to the G component of the current pixel in the RGB data, and acquires a third color index of the third source RGB value. The receiving device acquires, from the initial color table information in a preset range with the third color index being the center, a fourth source RGB value having the smallest difference from the RGB value of the current pixel, and acquires a fourth color index of the fourth source RGB value. The receiving device replaces the fourth source RGB value with the RGB value of the current pixel, and changes the plurality of source RGB values in a preset range with the fourth color index being the center in the initial color table information by using a preset weight value and the RGB value of the current pixel. The receiving device acquires the changed initial color table information when the current pixel is not the last pixel in the RGB data, uses a next pixel of the current pixel as a current pixel, and starts to acquire, from the initial color table information, the third source RGB value in which the G component is closest to the G component of the current pixel in the RGB data. The receiving device acquires changed trained color table information when the current pixel is the last pixel in the RGB data, and determines the initial color table information as the local color table information of the RGB data. The receiving device may update the RGB value of each pixel by using the local color table information of the RGB data. It should be noted that for both the processes of training the initial color table information and updating the RGB value of each pixel by using the local color table information of the RGB data in the second implementation, refer to the foregoing execution process in the first implementation. Details are not described herein.

For the foregoing first implementation and second implementation, in a third implementation of this embodiment of the present application, if the RGB data is not the first image frame in the picture file, to be specific, the RGB data is an $N^{th}$ image frame in the picture file, where N is a positive integer greater than 1 and less than or equal to the total number of frames, the receiving device may train local color table information of an $(N-1)^{th}$ frame of the RGB data by using the RGB value of each pixel in the RGB data to generate local color table information of the RGB data, and update the RGB value of each pixel by using the local color table information of the RGB data.

Further, the receiving device may sort at least one source RGB value in the local color table information of the $(N-1)^{th}$ frame of the RGB data in a preset sorting manner of the G component to generate trained color table information when the RGB data is the $N^{th}$ image frame in the picture file. The receiving device acquires, from the trained color table information, a fifth source RGB value in which the G component is closest to the G component of the current pixel in the RGB data, and acquires a fifth color index of the fifth source RGB value. The receiving device acquires, from the trained color table information in a preset range with the fifth color index being the center, a sixth source RGB value having the smallest difference from the RGB value of the current pixel, and acquires a sixth color index of the sixth source RGB value. The receiving device replaces the sixth source RGB value with the RGB value of the current pixel, and changes the plurality of source RGB values in a preset range with the sixth color index being the center in the trained color table information by using a preset weight value and the RGB value of the current pixel. The receiving device acquires the changed trained color table information when the current pixel is not the last pixel in the RGB data, uses a next pixel of the current pixel as a current pixel, and starts to acquire, from the trained color table information, the fifth source RGB value in which the G component is closest to the G component of the current pixel in the RGB data. The receiving device acquires the changed trained color table information when the current pixel is the last pixel in the RGB data, and determines the trained color table information as the local color table information of the RGB data. The receiving device may update the RGB value of each pixel by using the local color table information of the RGB data. It should be noted that for both the processes of training the trained color table information and updating the RGB value of each pixel by using the local color table information of the RGB data in the third implementation, refer to the foregoing execution process in the first implementation. Details are not described herein.

It should be noted that the foregoing use of the G component as a guide for training of the color table information is merely an example. In this embodiment of the present application, the R component or the B component may be similarly used to guide the training of the color table information. For an execution process, refer to the description in the foregoing content. Details are not described herein. The first source RGB value, the second source RGB value, the third source RGB value, the fourth source RGB value, the fifth source RGB value, and the sixth source RGB value may represent the same meaning of a source RGB value, and the first color index, the second color index, the third color index, the fourth color index, the fifth color index, and the sixth color index may represent the same meaning of a color index. Such a naming manner is merely used to distinguish between different execution scenarios, for example, the foregoing three execution scenarios in which the RGB data is the first image frame in the picture file and the picture header information data segment has the global color table information, the RGB data is the first image frame in the picture file and the picture header information data segment does not have the global color table information, and the RGB data is the $N^{th}$ image frame in the picture file.

S208: The receiving device performs image encoding on the updated RGB data by using a delay information and a total number of frames to generate the picture file.

In some embodiments, the receiving device performs image encoding on the updated RGB data by using the delay information and the total number of frames to generate the picture file. In some embodiments, the receiving device may perform image encoding on the color index of each pixel in the RGB data based on the delay information and the total number of frames and by using Lempel-Ziv-Welch (LZW) encoding to generate the picture file. The receiving device may store or present the picture file. It may be understood that a scheme of the image encoding is specifically determined by an image format of the picture file. For example, the image encoding may be GIF encoding or the like if the picture file that needs to be generated is a GIF image.

In this embodiment of the present application, a picture header information data segment of an original picture file is generated according to the picture file, each image frame in the picture file is converted into YUV data, compressed image data is then generated based on the picture header information data segment and data stream that is obtained by encoding the YUV data, and the compressed image data is transmitted. The YUV data may be generated according to the data stream when the compressed image data is received, and the YUV data is then processed based on the picture header information data segment to generate the picture file. Each image frame in the picture file having a relatively large amount of file data is converted into the YUV data having a relatively small amount of data, and the YUV data is then encoded to obtain the data stream, so that an amount of file data of the picture file during transmission is greatly reduced, and bandwidth costs are reduced. The use of a configuration parameter is flexibly controlled, and an encoder complexity is configured, so that different service scenarios and different machine performance can be satisfied, and the efficiency of encoding the picture file is optimized. Global color table information or initial color table information is trained to generate local color table information of the RGB data, so that image distortion is effectively reduced. The G component is used to acquire a source RGB value having the closest G component, a search for a color index is made in a small range in the color table information, and it is not necessary to traverse all the color table information, so that the complexity of training the local color table information can be lowered, thereby further improving the efficiency of encoding the picture file.

Figure 7:
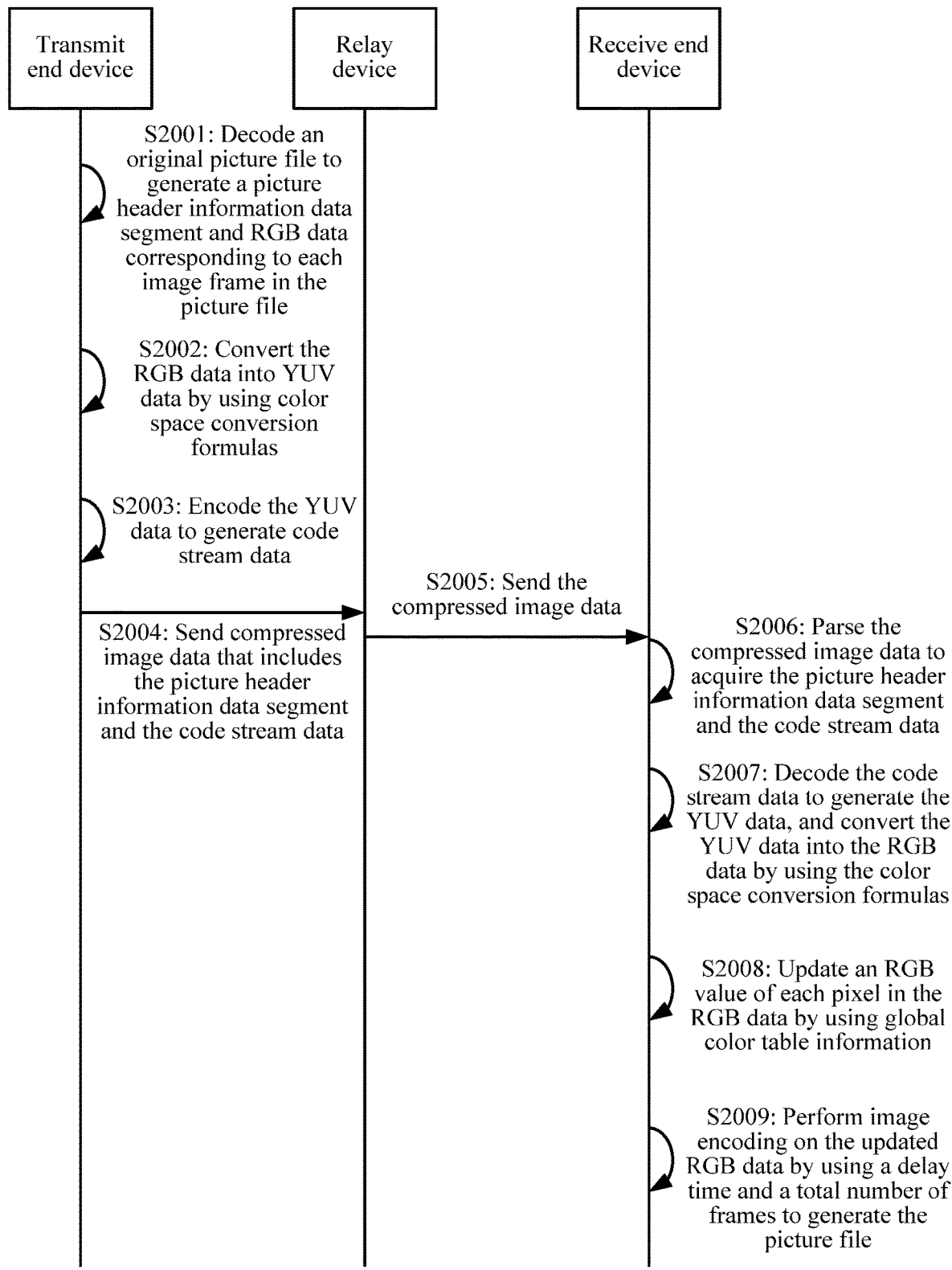
FIG. 7 is a procedure sequence diagram of another picture file processing method according to an embodiment of the present application.

FIG. 7 is a procedure sequence diagram of another picture file processing method according to an embodiment of the present application. A specific procedure of the picture file processing method is described from the perspectives of a transmitter, a relay device, and a receiving device in this embodiment of the present application. The method includes the following steps S2001 to S2009.

S2001: A transmitter decodes an original picture file to generate a picture header information data segment of the picture file and RGB data corresponding to each image frame in the picture file.

In some embodiments, the transmitter may decode the original picture file to generate the picture header information data segment of the picture file and the RGB data corresponding to each image frame in the picture file. The picture file may be an image input after a developer finishes making an image or may be an image received from another end. The picture header information data segment may include delay information, a total number of frames, and the like of the picture file. The delay information records a play interval between image frames in the picture file. The total number of frames is a quantity of image frames in the picture file. It may be understood that the picture header information data segment may further include global color table information of the picture file. The global color table information includes an RGB value of each pixel in each image frame. All images included in some picture files share the global color table information, and each image frame in some other picture files has respective local color table information. Therefore, the global color table information is acquired if the picture file has the global color table information, and the local color table information is not acquired if the picture file has only the local color table information.

S2002: The transmitter converts the RGB data into YUV data by using color space conversion formulas.

In some embodiments, the transmitter may convert the RGB data into the YUV data by using the color space conversion formulas. During the conversion of the RGB data into the YUV data, color space conversion formulas in which a domain range of a luminance component is [16, 235] and a domain range of a chrominance component is [16, 240] may be selected. Because the ranges are reduced, the YUV data obtained after conversion can have a greatly reduced amount of data but has relatively severe distortion. Alternatively, color space conversion formulas in which domain ranges of both a luminance component and a chrominance component are [0, 255] may be selected. In this case, the YUV data obtained after conversion can have less severe distortion but has a relatively large amount of data, and the color space conversion formulas in which the domain ranges of both the luminance component and the chrominance component are [0, 255] are:

$Y=0.299R+0.587G+0.114B;$ $U=-0.1687R-0.3313G+0.5B+128;$ and $V=0.5R-0.4187G-0.0813B+128,$ where YUV is a video data format, Y is a luminance component, UV is a chrominance component, and raster-scan processing may be performed on pixels in each image frame by using the color space conversion formulas to convert each frame of the RGB data into corresponding YUV data.

S2003: The transmitter encodes the YUV data to generate data stream.

In some embodiments, the transmitter may further encode the YUV data to generate the data stream. The encoding may include one or more of predictive coding, transform coding, quantization coding, and entropy coding. For example, the transmitter may compress the YUV data in IPPP mode. The first frame of the YUV data is an I frame. The I frame is an intra-frame prediction frame. The remaining frames of the YUV data are P frames. The P frame is an inter-frame prediction frame. Therefore, an amount of file data of the picture file can be effectively reduced, and a constant QP mode can further be used to stabilize quality and the like of different frames. The entropy coding may include Huffman coding, arithmetic coding, and the like.

Further, during encoding of the YUV data, it may be supported that a user adds a configuration parameter. The configuration parameter may be a parameter for encoding the YUV data. The configuration parameter may include any one of a standard definition mode parameter, a high definition mode parameter, and a lossless mode parameter. The standard definition mode parameter (for example, a YUV420 mode parameter) may be selected when reduced bandwidth is required. The high definition mode parameter (for example, a YUV444 mode parameter) may be selected when image quality is required. The transmitter may encode the YUV data by using the configuration parameter to generate the data stream.

In some embodiments, during encoding of the YUV data, it may further be supported that a user adds an encoder complexity, and the encoder complexity may be an encoding fineness parameter determined according to hardware performance of the transmitter. The encoder complexity may include any one of a first complexity, a second complexity, and a third complexity. The first complexity is higher than the second complexity, and the second complexity is higher than the third complexity. For example, the hardware performance of the transmitter may be detected to generate a performance value. For example, a computational rate or the like of a CPU of the transmitter is tested. It may be determined that the transmitter has very high hardware performance when the performance value is in a first preset value range, and it may be recommended to use an encoding scheme with the first complexity. It may be determined that the transmitter has medium hardware performance when the performance value is in a second preset value range, and it may be recommended to use an encoding scheme with the second complexity. It may be determined that the transmitter has relatively poor hardware performance or currently real-time transcoding or the like is required when the performance value is in a third preset value range, and it may be recommended to use an encoding scheme with the third complexity. The transmitter may configure the encoder complexity to encode the YUV data to generate the data stream.

It should be noted that the foregoing two encoding schemes may be parallel encoding schemes. To be specific, the transmitter may use both the configuration parameter and the configured encoder complexity to encode the YUV data to generate the data stream. The performance value, the first preset value range, the second preset value range, and the third preset value range may be specifically set according to the experience of a developer.

S2004: The transmitter sends compressed image data to a relay device.

In some embodiments, the transmitter may generate the compressed image data. The transmitter may store the compressed image data. The transmitter then sends the compressed image data to the receiving device when detecting a request from the receiving device for the picture file, for example, when detecting that a web page including the picture file is opened. Alternatively, the transmitter may directly send the compressed image data to the receiving device, for example, when one client of an instant messaging application needs to send the picture file to another client, or when an application service device needs to forward the picture file. The compressed image data includes the picture header information data segment and the data stream.

S2005: The relay device receives the compressed image data sent by the transmitter, and sends the compressed image data to a receiving device.

In some embodiments, the relay device may be a connecting device between the transmitter and the receiving device. The relay device relays the compressed image data if the transmitter and the receiving device cannot be directly connected. For example, for two clients in an instant messaging application, the relay device may be a backend service device or the like of the instant messaging application. The relay device receives the compressed image data sent by the transmitter, and may send the compressed image data to the receiving device according to an application identifier of the receiving device indicated by the transmitter.

S2006: The receiving device receives the compressed image data sent by the relay device, and parses the compressed image data to acquire the picture header information data segment and the data stream.

In some embodiments, the receiving device receives the compressed image data sent by the relay device. The receiving device may parse the compressed image data to acquire the picture header information data segment and the data stream in the compressed image data.

S2007: The receiving device decodes the data stream to generate the YUV data, and converts the YUV data into the RGB data by using the color space conversion formulas.

In some embodiments, the receiving device decodes the data stream to generate the YUV data, and may convert the YUV data into the RGB data by using the color space conversion formulas. Further, the receiving device needs to determine used color space conversion formulas according to a domain range of a luminance component. It may be understood that for YUV data in a YUV444 mode, color space conversion formulas in which a domain range of a luminance component is [16, 235] and a domain range of a chrominance component is [16, 240] may be selected, or color space conversion formulas in which domain ranges of both a luminance component and a chrominance component are [0, 255] may be selected. Specifically, the selected color space conversion formulas may correspond to the color space conversion formulas selected to convert the RGB data into the YUV data in the foregoing embodiments. It should be noted that the chrominance includes a sample matrix of either of two color difference signals Cb and Cr or a single sample in the sample matrix. Upsampling processing needs to be separately performed on the two color difference signals in a same manner. Cb corresponds to U in YUV, and Cr corresponds to V in YUV.

If the domain range of the luminance component is [16, 235] and the domain range of the chrominance component is [16, 240], the color space conversion formulas are:

$R=\text{Clip3}(0,255,(298*Y+409*(Cr-128)+128)>>8);$ $G=\text{Clip3}(0,255,(298*Y-100*(Cb-128)+208*(Cr-128)+128)>>8);$ and $B=\text{Clip3}(0,255,(298*Y+516*(Cb-128)+128)>>8),$ where "+128" is used for rounding the value of R, the value of B, and the value of G, and ">>8" represents division by the eighth power of 2.

If the domain ranges of the luminance component and the chrominance component are both [0, 255], the color space conversion formulas are:

$R=\text{Clip3}(0,255,Y+(359*(Cr-128)+128)>>8);$ $G=\text{Clip3}(0,255,Y-(88*(Cb-128)+183*(Cr-128)+128)>>8);$ and $B=\text{Clip3}(0,255,Y+(454*(Cb-128)+128)>>8),$ where "+128" is used for rounding the value of R, the value of B, and the value of G, and ">>8" represents division by the eighth power of 2.

Raster-scan processing may be performed on pixels in each image frame by using the color space conversion formulas to convert each frame of the YUV data into corresponding RGB data.

S2008: The receiving device updates an RGB value of each pixel in the RGB data by using the global color table information.

In some embodiments, because the YUV data is encoded previously, the RGB data obtained by converting the YUV data is distorted, and the receiving device may update the RGB value of each pixel in the RGB data by using the global color table information. It may be understood that the RGB data may include one or more pixels. When the RGB data has only one pixel, the RGB value of the pixel may be updated by using the global color table information. When the RGB data has a plurality of pixels, the RGB value of each of the plurality of pixels may be updated by using the global color table information. The receiving device needs to train the global color table information again to generate local color table information that meets the RGB data. The receiving device may generate initial color table information if there is no global color table information, and train the initial color table information to generate the local color table information that meets the RGB data. A specific processing process is as follows:

In a first implementation of this embodiment of the present application, the receiving device may train the global color table information by using the RGB value of each pixel in the RGB data to generate the local color table information of the RGB data when the RGB data is the first image frame in the picture file and the picture header information data segment has the global color table information, and update the RGB value of each pixel by using the local color table information of the RGB data.

Further, the receiving device may sort at least one source RGB value in the global color table information in a preset sorting manner (for example, ascending order or descending order) of the G component to generate trained color table information when the RGB data is the first image frame in the picture file and the picture header information data segment has the global color table information. Referring together to FIG. 3, as shown in FIG. 3, the global color table information includes a color index and a source RGB value, for example: 5, (8, 1, 10); 6, (8, 9, 8); 7, (1, 7, 6); 8, (10, 8, 6); 9, (5, 8, 5); 10, (9, 10, 1). The trained color table information may be generated through sorting in ascending order of the G component, for example: 5, (8, 1, 10); 6, (1, 7, 6); 7, (5, 8, 5); 8, (10, 8, 6); 9, (8, 9, 8); 10, (9, 10, 1).

The receiving device acquires, from the trained color table information, a first source RGB value in which the G component is closest to the G component of a current pixel in the RGB data, and acquires a first color index of the first source RGB value. It may be understood that the receiving device may traverse source RGB values in the trained color table information by using the G component of the current pixel to acquire the first source RGB value having the closest G component. Referring together to FIG. 4, it is assumed that the first frame of the RGB data has four pixels, the current pixel is the first pixel in the RGB data, and an RGB value of the current pixel is (9, 9, 9). It may be found from the trained color table information that the G component in (8, 9, 8) is closest to the G component in the RGB value of the current pixel. (8, 9, 8) is determined as the first source RGB value, and it is acquired that a first color index of the first source RGB value is "9".

The receiving device acquires, from the trained color table information in a preset range with the first color index being the center, a second source RGB value having the smallest difference from the RGB value of the current pixel, and acquires a second color index of the second source RGB value. It may be understood that the receiving device may acquire a plurality of source RGB values in the preset range with the first color index being the center, calculate respectively differences of the first source RGB value and the plurality of source RGB values from the RGB value of the current pixel, and determine one of the plurality of source RGB values that has the smallest difference as the second source RGB value. According to the foregoing example, it is assumed that the preset range is a range of the center minus 1 to the center plus 1. "9" is the center, two source RGB values (10, 8, 6) and (9, 10, 1) are acquired, and difference values of (10, 8, 6), (8, 9, 8), and (9, 10, 1) from (9, 9, 9) are calculated respectively. A difference value of the source RGB value with the color index being "8" is |9−10|+|9−8|+|9−6|=5, a difference value of the source RGB value with the color index being "9" is |9−8|+|9−9|+|9−8|=2, and a difference value of the source RGB value with the color index being "10" is |9−9|+|9−10|+|9−1|=9. It is determined that the source RGB value (8, 9, 8) is the second source RGB value, and it is acquired that a second color index of the second source RGB value is "9". It may be understood that the first source RGB value and the first color index acquired in the foregoing may be respectively the same as or different from the second source RGB value and the second color index, depending specifically on an actual execution process.

The receiving device replaces the second source RGB value with the RGB value of the current pixel, and changes the plurality of source RGB values in a preset range with the second color index being the center in the trained color table information by using a preset weight value and the RGB value of the current pixel. Referring together to FIG. 5, according to the foregoing example, the second source RGB value is (8, 9, 8), and (8, 9, 8) is replaced with the RGB value (9, 9, 9) of the current pixel. In addition, the plurality of source RGB values in the preset range with the second color index being the center may be changed according to the preset weight value and the RGB value of the current pixel. Assuming that the preset range is a range of the center minus 1 to the center plus 1, two source RGB values (10, 8, 6) and (9, 10, 1) need to be changed. The preset weight value may be a dynamic weight value. A source RGB value whose color index is closer to the second color index is affected more significantly by the RGB value of the current pixel. It is assumed that the current distribution of weight values is 2:8. (10, 8, 6) is changed by using (9, 9, 9), for example, the R component=9*0.8+10*0.2=9.2, the G component=9*0.8+8*0.2=8.8, and the B component=9*0.8+6*0.2=8.4. The foregoing results are rounded, so that it is determined that the source RGB value with the color index "8" is changed from (10, 8, 6) into (9, 9, 8). Similarly, the source RGB value with the color index "10" is changed from (9, 10, 1) into (9, 9, 7).

The receiving device acquires the changed trained color table information when the current pixel is not the last pixel in the RGB data, for example, when the current pixel is the first pixel in the RGB data shown in FIG. 4 or FIG. 5, uses a next pixel of the current pixel as a current pixel, and starts to acquire, from the trained color table information, a first source RGB value in which the G component is closest to the G component of a current pixel in the RGB data. For example, the second pixel in the RGB data is used as the current pixel, and the changed trained color table information is then trained again. For a specific training process, refer to the foregoing description of the training process. Details are not described herein.

The receiving device acquires the changed trained color table information when the current pixel is the last pixel in the RGB data, for example, when the current pixel is the fourth pixel in the RGB data shown in FIG. 4 or FIG. 5, and determines the trained color table information as the local color table information of the RGB data.

The receiving device may update the RGB value of each pixel by using the local color table information of the RGB data. Further, the receiving device may sequentially acquire, from the local color table information of the RGB data, a source RGB value with an RGB value that is the same as or has the smallest difference from the RGB value of each pixel to replace the RGB value of the pixel. In some embodiments, the receiving device may use a color index corresponding to a source RGB value with an RGB value that is the same as or has the smallest difference from the RGB value of each pixel to replace the RGB value of the pixel. Referring together to FIG. 6, according to the foregoing example, the RGB value of the first pixel in the RGB data is (9, 9, 9), and (9, 9, 8) in the local color table information has the smallest difference from (9, 9, 9), so that the color index "8"

corresponding to (9, 9, 8) is used to replace the RGB value of the first pixel. Similarly, the color index of the second pixel is "10", the color index of the third pixel is "9", and the color index of the fourth pixel is "6".

In a second implementation of this embodiment of the present application, the receiving device may train the initial color table information by using the RGB value of each pixel in the RGB data to generate the local color table information of the RGB data when the RGB data is the first image frame in the picture file and the picture header information data segment does not have the global color table information, and update the RGB value of each pixel by using the local color table information of the RGB data.

Further, the receiving device may generate one piece of initial color table information, for example, (0, 0, 0), (1, 1, 1), (2, 2, 2), . . . , and (255, 255, 255), when the RGB data is the first image frame in the picture file and the picture header information data segment does not have the global color table information. The receiving device acquires, from the initial color table information, a third source RGB value in which the G component is closest to the G component of the current pixel in the RGB data, and acquires a third color index of the third source RGB value. The receiving device acquires, from the initial color table information in a preset range with the third color index being the center, a fourth source RGB value having the smallest difference from the RGB value of the current pixel, and acquires a fourth color index of the fourth source RGB value. The receiving device replaces the fourth source RGB value with the RGB value of the current pixel, and changes the plurality of source RGB values in a preset range with the fourth color index being the center in the initial color table information by using a preset weight value and the RGB value of the current pixel. The receiving device acquires the changed initial color table information when the current pixel is not the last pixel in the RGB data, uses a next pixel of the current pixel as a current pixel, and starts to acquire, from the initial color table information, the third source RGB value in which the G component is closest to the G component of the current pixel in the RGB data. The receiving device acquires changed trained color table information when the current pixel is the last pixel in the RGB data, and determines the initial color table information as the local color table information of the RGB data. The receiving device may update the RGB value of each pixel by using the local color table information of the RGB data. It should be noted that for both the processes of training the initial color table information and updating the RGB value of each pixel by using the local color table information of the RGB data in the second implementation, refer to the foregoing execution process in the first implementation. Details are not described herein.

For the foregoing first implementation and second implementation, in a third implementation of this embodiment of the present application, if the RGB data is not the first image frame in the picture file, to be specific, the RGB data is an $N^{th}$ image frame in the picture file, where N is a positive integer greater than 1 and less than or equal to the total number of frames, the receiving device may train local color table information of an $(N-1)^{th}$ frame of the RGB data by using the RGB value of each pixel in the RGB data to generate local color table information of the RGB data, and update the RGB value of each pixel by using the local color table information of the RGB data.

Further, the receiving device may sort at least one source RGB value in the local color table information of the $(N-1)^{th}$ frame of the RGB data in a preset sorting manner of the G component to generate trained color table information when the RGB data is the $N^{th}$ image frame in the picture file. The receiving device acquires, from the trained color table information, a fifth source RGB value in which the G component is closest to the G component of the current pixel in the RGB data, and acquires a fifth color index of the fifth source RGB value. The receiving device acquires, from the trained color table information in a preset range with the fifth color index being the center, a sixth source RGB value having the smallest difference from the RGB value of the current pixel, and acquires a sixth color index of the sixth source RGB value. The receiving device replaces the sixth source RGB value with the RGB value of the current pixel, and changes the plurality of source RGB values in a preset range with the sixth color index being the center in the trained color table information by using a preset weight value and the RGB value of the current pixel. The receiving device acquires the changed trained color table information when the current pixel is not the last pixel in the RGB data, uses a next pixel of the current pixel as a current pixel, and starts to acquire, from the trained color table information, the fifth source RGB value in which the G component is closest to the G component of the current pixel in the RGB data. The receiving device acquires the changed trained color table information when the current pixel is the last pixel in the RGB data, and determines the trained color table information as the local color table information of the RGB data. The receiving device may update the RGB value of each pixel by using the local color table information of the RGB data. It should be noted that for both the processes of training the trained color table information and updating the RGB value of each pixel by using the local color table information of the RGB data in the third implementation, refer to the foregoing execution process in the first implementation. Details are not described herein.

It should be noted that the foregoing use of the G component as a guide for training of the color table information is merely an example. In this embodiment of the present application, the R component or the B component may be similarly used to guide the training of the color table information. For an execution process, refer to the description in the foregoing content. Details are not described herein. The first source RGB value, the second source RGB value, the third source RGB value, the fourth source RGB value, the fifth source RGB value, and the sixth source RGB value may represent the same meaning of a source RGB value, and the first color index, the second color index, the third color index, the fourth color index, the fifth color index, and the sixth color index may represent the same meaning of a color index. Such a naming manner is merely used to distinguish between different execution scenarios, for example, the foregoing three execution scenarios in which the RGB data is the first image frame in the picture file and the picture header information data segment has the global color table information, the RGB data is the first image frame in the picture file and the picture header information data segment does not have the global color table information, and the RGB data is the $N^{th}$ image frame in the picture file.

S2009: The receiving device performs image encoding on the updated RGB data by using a delay information and a total number of frames to generate the picture file.

In some embodiments, the receiving device performs image encoding on the updated RGB data by using the delay information and the total number of frames to generate the picture file. In some embodiments, the receiving device may perform image encoding on the color index of each pixel in the RGB data based on the delay information and the total number of frames and by using Lempel-Ziv-Welch (LZW) encoding to generate the picture file. The receiving device may store or present the picture file. It may be understood that a scheme of the image encoding is specifically determined by an image format of the picture file. For example, the image encoding may be GIF encoding or the like if the picture file that needs to be generated is a GIF image.

In this embodiment of the present application, a picture header information data segment of an original picture file is generated according to the picture file, each image frame in the picture file is converted into YUV data, compressed image data is then generated based on the picture header information data segment and data stream that is obtained by encoding the YUV data, and the compressed image data is transmitted. The YUV data may be generated according to the data stream when the compressed image data is received, and the YUV data is then processed based on the picture header information data segment to generate the picture file. Each image frame in the picture file having a relatively large amount of file data is converted into the YUV data having a relatively small amount of data, and the YUV data is then encoded to obtain the data stream, so that an amount of file data of the picture file during transmission is greatly reduced, and bandwidth costs are reduced. The use of a configuration parameter is flexibly controlled, and an encoder complexity is configured, so that different service scenarios and different machine performance can be satisfied, and the efficiency of encoding the picture file is optimized. Global color table information or initial color table information is trained to generate local color table information of the RGB data, so that image distortion is effectively reduced. The G component is used to acquire a source RGB value having the closest G component, a search for a color index is made in a small range in the color table information, and it is not necessary to traverse all the color table information, so that the complexity of training the local color table information can be lowered, thereby further improving the efficiency of encoding the picture file.

Figure 8:
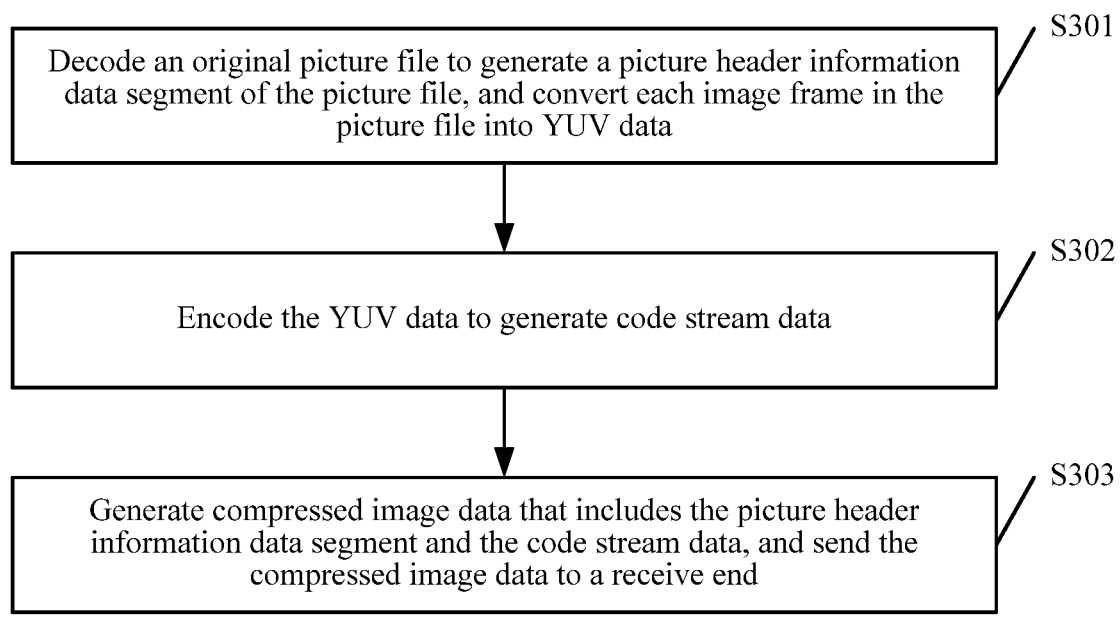
FIG. 8 is a schematic flowchart of another picture file processing method according to an embodiment of the present application.

FIG. 8 is a schematic flowchart of another picture file processing method according to an embodiment of the present application. A specific procedure of the picture file processing method is described from the perspective of a transmitter in this embodiment of the present application. The method may include the following steps S301 to S303.

S301: Generate a picture header information data segment of an original picture file according to the picture file, and convert each image frame in the picture file into YUV data.

In some embodiments, a transmitter may decode the original picture file to generate the picture header information data segment of the picture file. The picture file may be an image input after a developer finishes making an image or may be an image received from another end. The picture header information data segment may include delay information, a total number of frames, and the like of the picture file. The delay information records a play interval between image frames in the picture file. The total number of frames is a quantity of image frames in the picture file. It may be understood that the picture header information data segment may further include global color table information of the picture file. The global color table information includes an RGB value of each pixel in each image frame. All images included in some picture files share the global color table information, and each image frame in some other picture files has respective local color table information. Therefore, the global color table information is acquired if the picture file has the global color table information, and the local color table information is not acquired if the picture file has only the local color table information. The transmitter further converts each image frame in the picture file into the YUV data.

S302: Encode the YUV data to generate data stream.

In some embodiments, the transmitter may further encode the YUV data to generate the data stream. The encoding may include one or more of predictive coding, transform coding, quantization coding, and entropy coding. For example, the transmitter may compress the YUV data in IPPP mode. The first frame of the YUV data is an I frame. The I frame is an intra-frame prediction frame. The remaining frames of the YUV data are P frames. The P frame is an inter-frame prediction frame. Therefore, an amount of file data of the picture file can be effectively reduced, and a constant QP mode can further be used to stabilize quality and the like of different frames. The entropy coding may include Huffman coding, arithmetic coding, and the like.

S303: Send compressed image data to a receiving device.

In some embodiments, the transmitter may generate the compressed image data. The transmitter may store the compressed image data. The transmitter then sends the compressed image data to the receiving device when detecting a request from the receiving device for the picture file, for example, when detecting that a web page including the picture file is opened. Alternatively, the transmitter may directly send the compressed image data to the receiving device, for example, when one client of an instant messaging application needs to send the picture file to another client, or when an application service device needs to forward the picture file. The compressed image data includes the picture header information data segment and the data stream.

The receiving device receives the compressed image data sent by the transmitter, and the receiving device may parse the compressed image data to acquire the picture header information data segment and the data stream in the compressed image data.

The receiving device decodes the data stream to generate the YUV data, and encodes the YUV data based on the delay information, the total number of frames, the global color table information, and the like in the picture header information data segment to generate the picture file.

In this embodiment of the present application, an original picture file is decoded to obtain a picture header information data segment of the picture file, each image frame in the picture file is converted into YUV data, compressed image data is then generated based on the picture header information data segment and data stream that is obtained by encoding the YUV data, and the compressed image data is transmitted. The data stream may be decoded to generate the YUV data when the compressed image data is received, and the YUV data is then encoded based on the picture header information data segment to generate the picture file. Each image frame in the picture file having a relatively large amount of file data is converted into the YUV data having a relatively small amount of data, and the YUV data is then encoded to obtain the data stream, so that an amount of file data of the picture file during transmission is greatly reduced, and bandwidth costs are reduced.

Figure 9:
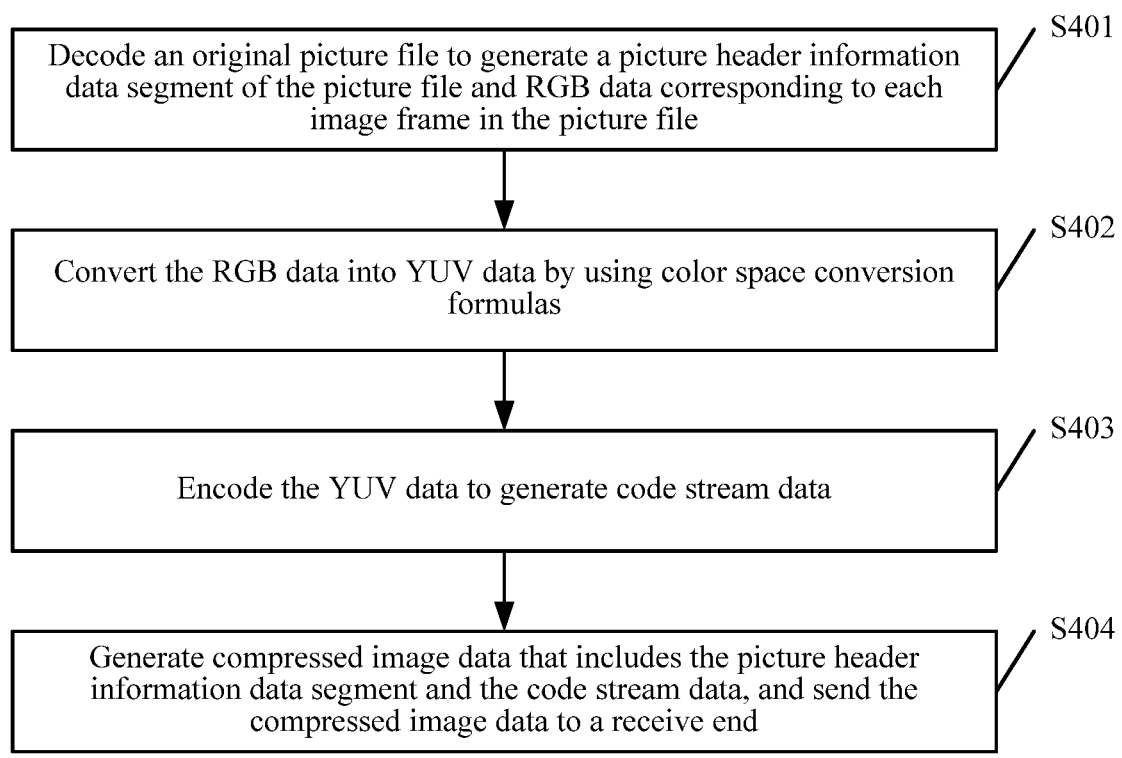
FIG. 9 is a schematic flowchart of still another picture file processing method according to an embodiment of the present application.

FIG. 9 is a schematic flowchart of still another picture file processing method according to an embodiment of the present application. A specific procedure of the picture file processing method is described from the perspective of a transmitter in this embodiment of the present application. The method may include the following steps S401 to S404.

S401: Decode an original picture file to generate a picture header information data segment of the picture file and RGB data corresponding to each image frame in the picture file.

In some embodiments, a transmitter may decode the original picture file to generate the picture header information data segment of the picture file and the RGB data corresponding to each image frame in the picture file. The picture file may be an image input after a developer finishes making an image or may be an image received from another end. The picture header information data segment may include delay information, a total number of frames, and the like of the picture file. The delay information records a play interval between image frames in the picture file. The total number of frames is a quantity of image frames in the picture file. It may be understood that the picture header information data segment may further include global color table information of the picture file. The global color table information includes an RGB value of each pixel in each image frame. All images included in some picture files share the global color table information, and each image frame in some other picture files has respective local color table information. Therefore, the global color table information is acquired if the picture file has the global color table information, and the local color table information is not acquired if the picture file has only the local color table information.

S402: Convert the RGB data into YUV data by using color space conversion formulas.

In some embodiments, the transmitter may convert the RGB data into the YUV data by using the color space conversion formulas. During the conversion of the RGB data into the YUV data, color space conversion formulas in which a domain range of a luminance component is [16, 235] and a domain range of a chrominance component is [16, 240] may be selected. Because the ranges are reduced, the YUV data obtained after conversion can have a greatly reduced amount of data but has relatively severe distortion. Alternatively, color space conversion formulas in which domain ranges of both a luminance component and a chrominance component are [0, 255] may be selected. In this case, the YUV data obtained after conversion can have less severe distortion but has a relatively large amount of data, and the color space conversion formulas in which the domain ranges of both the luminance component and the chrominance component are [0, 255] are:

$Y=0.299R+0.587G+0.114B;$ $U=-0.1687R-0.3313G+0.5B+128;$ and $V=0.5R-0.4187G-0.0813B+128,$ where YUV is a video data format, Y is a luminance component, UV is a chrominance component, and raster-scan processing may be performed on pixels in each image frame by using the color space conversion formulas to convert each frame of the RGB data into corresponding YUV data.

S403: Encode the YUV data to generate data stream.

In some embodiments, the transmitter may further encode the YUV data to generate the data stream. The encoding may include one or more of predictive coding, transform coding, quantization coding, and entropy coding. For example, the transmitter may compress the YUV data in IPPP mode. The first frame of the YUV data is an I frame. The I frame is an intra-frame prediction frame. The remaining frames of the YUV data are P frames. The P frame is an inter-frame prediction frame. Therefore, an amount of file data of the picture file can be effectively reduced, and a constant QP mode can further be used to stabilize quality and the like of different frames. The entropy coding may include Huffman coding, arithmetic coding, and the like.

Further, during encoding of the YUV data, it may be supported that a user adds a configuration parameter. The configuration parameter may be a parameter for encoding the YUV data. The configuration parameter may include any one of a standard definition mode parameter, a high definition mode parameter, and a lossless mode parameter. The standard definition mode parameter (for example, a YUV420 mode parameter) may be selected when reduced bandwidth is required. The high definition mode parameter (for example, a YUV444 mode parameter) may be selected when image quality is required. The transmitter may encode the YUV data by using the configuration parameter to generate the data stream.

In some embodiments, during encoding of the YUV data, it may further be supported that a user adds an encoder complexity, and the encoder complexity may be an encoding fineness parameter determined according to hardware performance of the transmitter. The encoder complexity may include any one of a first complexity, a second complexity, and a third complexity. The first complexity is higher than the second complexity, and the second complexity is higher than the third complexity. For example, the hardware performance of the transmitter may be detected to generate a performance value. For example, a computational rate or the like of a CPU of a transmitter is tested. It may be determined that the transmitter has very high hardware performance when the performance value is in a first preset value range, and it may be recommended to use an encoding scheme with the first complexity. It may be determined that the transmitter has medium hardware performance when the performance value is in a second preset value range, and it may be recommended to use an encoding scheme with the second complexity. It may be determined that the transmitter has relatively poor hardware performance or currently real-time transcoding or the like is required when the performance value is in a third preset value range, and it may be recommended to use an encoding scheme with the third complexity. The transmitter may configure the encoder complexity to encode the YUV data to generate the data stream.

It should be noted that the foregoing two encoding schemes may be parallel encoding schemes. To be specific, the transmitter may use both the configuration parameter and the configured encoder complexity to encode the YUV data to generate the data stream. The performance value, the first preset value range, the second preset value range, and the third preset value range may be specifically set according to the experience of a developer.

S404: Send compressed image data to a receiving device.

In some embodiments, the transmitter may generate the compressed image data. The transmitter may store the compressed image data. The transmitter then sends the compressed image data to the receiving device when detecting a request from the receiving device for the picture file, for example, when detecting that a web page including the picture file is opened. Alternatively, the transmitter may directly send the compressed image data to the receiving device, for example, when one client of an instant messaging application needs to send the picture file to another client, or when an application service device needs to forward the picture file. The compressed image data includes the picture header information data segment and the data stream.

The receiving device receives the compressed image data sent by the transmitter, and the receiving device may parse the compressed image data to acquire the picture header information data segment and the data stream in the compressed image data.

The receiving device decodes the data stream to generate the YUV data, and encodes the YUV data based on the delay information, the total number of frames, the global color table information, and the like in the picture header information data segment to generate the picture file.

In this embodiment of the present application, a picture header information data segment of an original picture file is generated according to the picture file, each image frame in the picture file is converted into YUV data, compressed image data is then generated based on the picture header information data segment and data stream that is obtained by encoding the YUV data, and the compressed image data is transmitted. The YUV data may be generated according to the data stream when the compressed image data is received, and the YUV data is then processed based on the picture header information data segment to generate the picture file. Each image frame in the picture file having a relatively large amount of file data is converted into the YUV data having a relatively small amount of data, and the YUV data is then encoded to obtain the data stream, so that an amount of file data of the picture file during transmission is greatly reduced, and bandwidth costs are reduced. The use of a configuration parameter is flexibly controlled, and an encoder complexity is configured, so that different service scenarios and different machine performance can be satisfied, and the efficiency of encoding the picture file is optimized.

Figure 10:
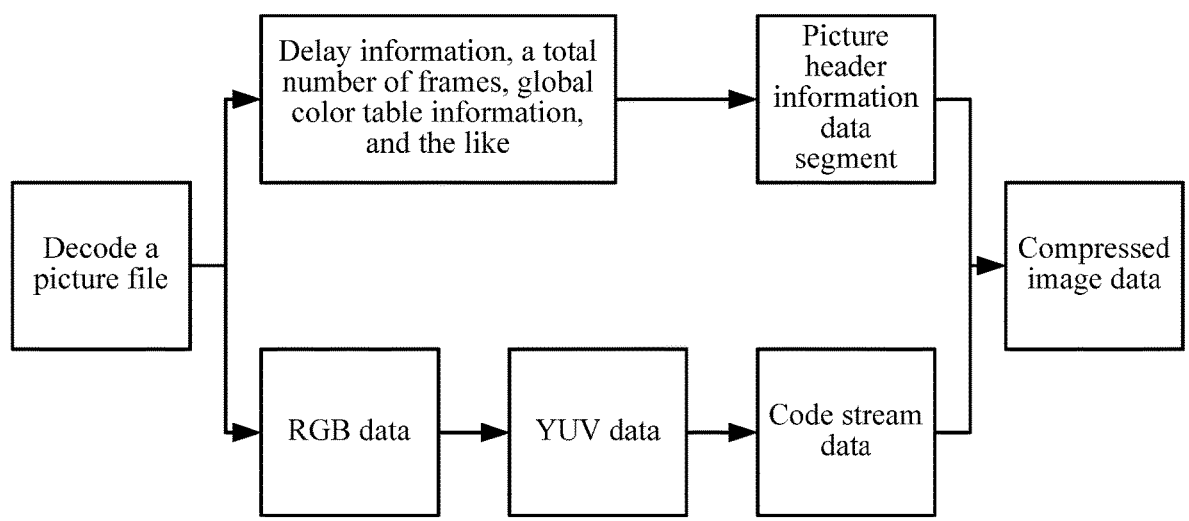
FIG. 10 is a schematic diagram of an example of generating compressed image data according to an embodiment of the present application.

FIG. 10 is a schematic diagram of an example of generating compressed image data according to an embodiment of the present application. As shown in FIG. 10, during decoding of an original picture file, delay information, a total number of frames, global color table information, and the like of the picture file may be acquired. The delay information records a play interval between image frames in the picture file. The total number of frames is a quantity of image frames in the picture file. It may be understood that a picture header information data segment may further include the global color table information of the picture file. The global color table information includes an RGB value of each pixel in each image frame. All images included in some picture files share the global color table information, and each image frame in some other picture files has respective local color table information. Therefore, the global color table information is acquired if the picture file has the global color table information, and the local color table information is not acquired if the picture file has only the local color table information. The delay information, the total number of frames, the global color table information, and the like of the picture file may be encapsulated to generate the picture header information data segment of the picture file. In addition, RGB data corresponding to each image frame in the picture file may be acquired by decoding the picture file, the RGB data may be further converted into YUV data by using color space conversion formulas, and raster-scan processing may be performed on pixels in each image frame by using the color space conversion formulas to convert each frame of the RGB data into corresponding YUV data. The YUV data may be further encoded to generate data stream. The encoding may include one or more of predictive coding, transform coding, quantization coding, and entropy coding. During encoding of the YUV data, it may be supported that a user adds a configuration parameter, it may further be supported that a user adds an encoder complexity. The compressed image data may be eventually generated.

Figure 11:
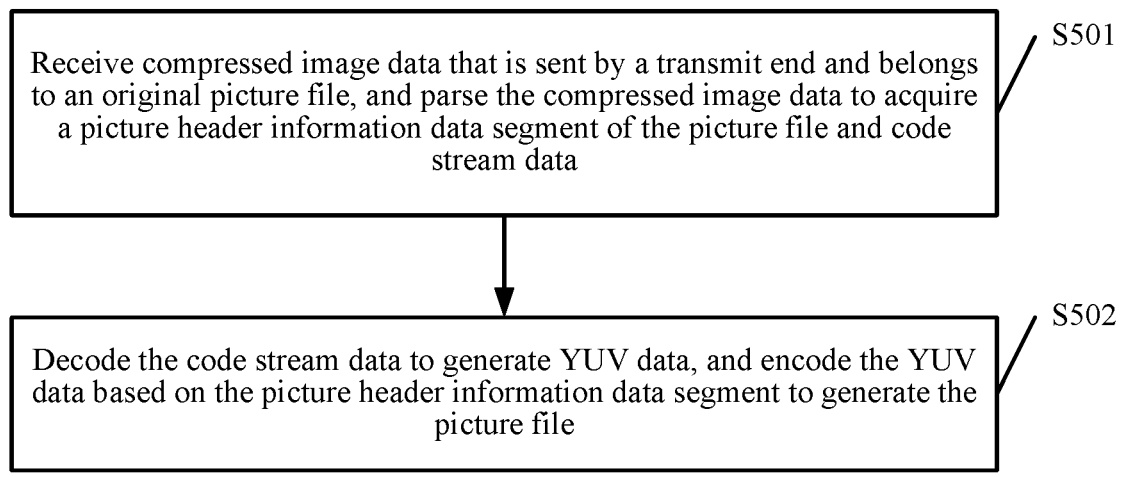
FIG. 11 is a schematic flowchart of still another picture file processing method according to an embodiment of the present application.

FIG. 11 is a schematic flowchart of still another picture file processing method according to an embodiment of the present application. A specific procedure of the picture file processing method is described from the perspective of a receiving device in this embodiment of the present application. The method may include the following steps S501 and S502.

S501: Receive compressed image data that is sent by a transmitter and belongs to an original picture file, and parse the compressed image data to acquire a picture header information data segment of the picture file and data stream.

In some embodiments, the transmitter may decode the original picture file to generate the picture header information data segment of the picture file. The picture file may be an image input after a developer finishes making an image or may be an image received from another end. The picture header information data segment may include delay information, a total number of frames, and the like of the picture file. The delay information records a play interval between image frames in the picture file. The total number of frames is a quantity of image frames in the picture file. It may be understood that the picture header information data segment may further include global color table information of the picture file. The global color table information includes an RGB value of each pixel in each image frame. All images included in some picture files share the global color table information, and each image frame in some other picture files has respective local color table information. Therefore, the global color table information is acquired if the picture file has the global color table information, and the local color table information is not acquired if the picture file has only the local color table information. The transmitter further converts each image frame in the picture file into YUV data.

The transmitter may further encode the YUV data to generate the data stream. The encoding may include one or more of predictive coding, transform coding, quantization coding, and entropy coding. For example, the transmitter may compress the YUV data in IPPP mode. The first frame of the YUV data is an I frame. The I frame is an intra-frame prediction frame. The remaining frames of the YUV data are P frames. The P frame is an inter-frame prediction frame. Therefore, an amount of file data of the picture file can be effectively reduced, and a constant QP mode can further be used to stabilize quality and the like of different frames. The entropy coding may include Huffman coding, arithmetic coding, and the like.

The transmitter may generate the compressed image data. The transmitter may store the compressed image data. The transmitter then sends the compressed image data to a receiving device when detecting a request from the receiving device for the picture file, for example, when detecting that a web page including the picture file is opened. Alternatively, the transmitter may directly send the compressed image data to the receiving device, for example, when one client of an instant messaging application needs to send the picture file to another client, or when an application service device needs to forward the picture file.

The receiving device receives the compressed image data sent by the transmitter, and the receiving device may parse the compressed image data to acquire the picture header information data segment and the data stream in the compressed image data.

S502: Generate YUV data according to the data stream, and process the YUV data based on the picture header information data segment to generate the picture file.

In some embodiments, the receiving device decodes the data stream to generate the YUV data, and encodes the YUV data based on the delay information, the total number of frames, the global color table information, and the like in the picture header information data segment to generate the picture file.

In this embodiment of the present application, YUV data may be generated according to the data stream when compressed image data is received, and the YUV data is then processed based on a picture header information data segment to generate the picture file. Each image frame in the picture file having a relatively large amount of file data is converted into the YUV data having a relatively small amount of data, and the YUV data is then encoded to obtain the data stream, so that an amount of file data of the picture file during transmission is greatly reduced, and bandwidth costs are reduced.

Figure 12:
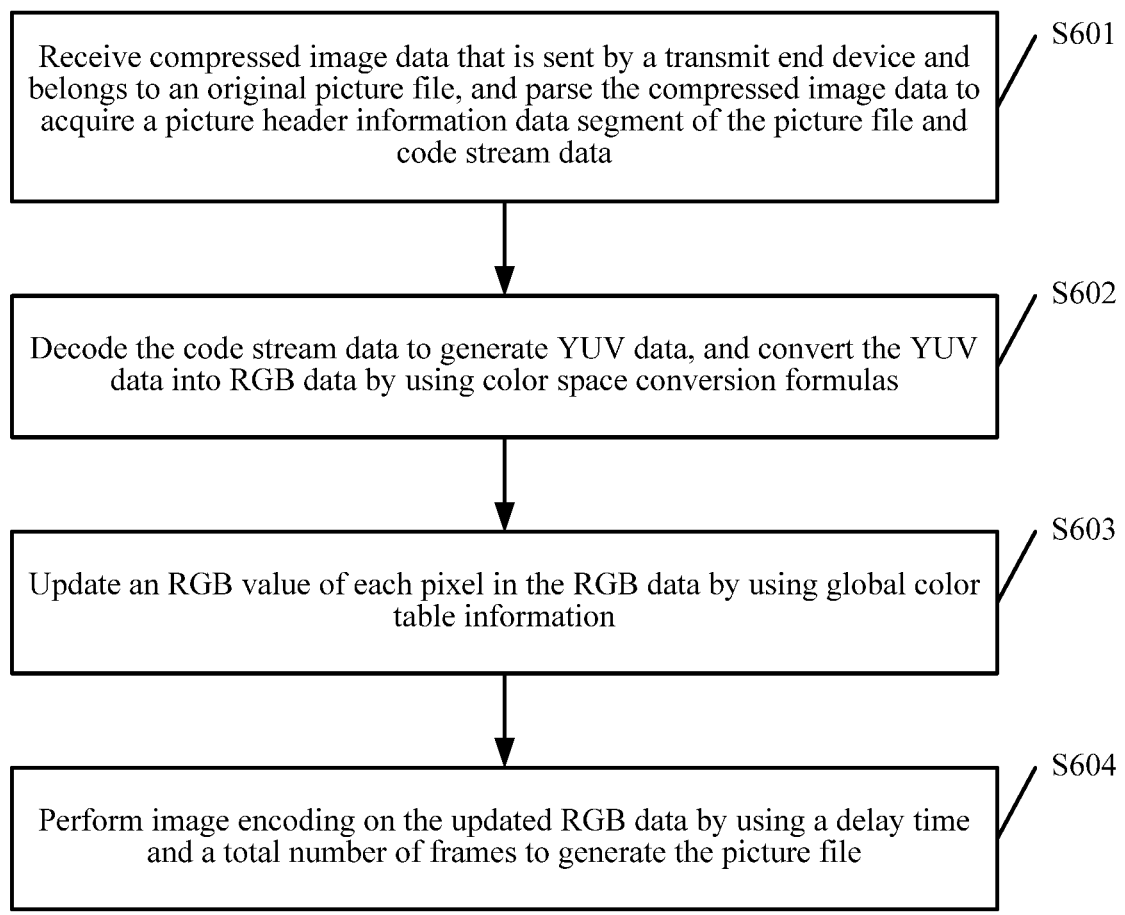
FIG. 12 is a schematic flowchart of still another picture file processing method according to an embodiment of the present application.

FIG. 12 is a schematic flowchart of still another picture file processing method according to an embodiment of the present application. A specific procedure of the picture file processing method is described from the perspective of a receiving device in this embodiment of the present application. The method may include the following steps S601 to S604.

S601: Receive compressed image data that is sent by a transmitter and belongs to an original picture file, and parse the compressed image data to acquire a picture header information data segment of the picture file and data stream.

In some embodiments, the transmitter may decode the original picture file to generate the picture header information data segment of the picture file and RGB data corresponding to each image frame in the picture file. The picture file may be an image input after a developer finishes making an image or may be an image received from another end. The picture header information data segment may include delay information, a total number of frames, and the like of the picture file. The delay information records a play interval between image frames in the picture file. The total number of frames is a quantity of image frames in the picture file. It may be understood that the picture header information data segment may further include global color table information of the picture file. The global color table information includes an RGB value of each pixel in each image frame. All images included in some picture files share the global color table information, and each image frame in some other picture files has respective local color table information. Therefore, the global color table information is acquired if the picture file has the global color table information, and the local color table information is not acquired if the picture file has only the local color table information.

The transmitter may convert the RGB data into YUV data by using color space conversion formulas. During the conversion of the RGB data into the YUV data, color space conversion formulas in which a domain range of a luminance component is [16, 235] and a domain range of a chrominance component is [16, 240] may be selected. Because the ranges are reduced, the YUV data obtained after conversion can have a greatly reduced amount of data but has relatively severe distortion. Alternatively, color space conversion formulas in which domain ranges of both a luminance component and a chrominance component are [0, 255] may be selected. In this case, the YUV data obtained after conversion can have less severe distortion but has a relatively large amount of data, and the color space conversion formulas in which the domain ranges of both the luminance component and the chrominance component are [0, 255] are:

$$Y = 0.299R + 0.587G + 0.114B;$$

$$U = -0.1687R - 0.3313G + 0.5B + 128; \text{ and}$$

$$V = 0.5R - 0.4187G - 0.0813B + 128, \text{ where}$$

YUV is a video data format, Y is a luminance component, UV is a chrominance component, and raster-scan processing may be performed on pixels in each image frame by using the color space conversion formulas to convert each frame of the RGB data into corresponding YUV data.

The transmitter may further encode the YUV data to generate the data stream. The encoding may include one or more of predictive coding, transform coding, quantization coding, and entropy coding. For example, the transmitter may compress the YUV data in IPPP mode. The first frame of the YUV data is an I frame. The I frame is an intra-frame prediction frame. The remaining frames of the YUV data are P frames. The P frame is an inter-frame prediction frame. Therefore, an amount of file data of the picture file can be effectively reduced, and a constant QP mode can further be used to stabilize quality and the like of different frames. The entropy coding may include Huffman coding, arithmetic coding, and the like.

The transmitter may generate the compressed image data. The transmitter may store the compressed image data. The transmitter then sends the compressed image data to the receiving device when detecting a request from the receiving device for the picture file, for example, when detecting that a web page including the picture file is opened. Alternatively, the transmitter may directly send the compressed image data to the receiving device, for example, when one client of an instant messaging application needs to send the picture file to another client, or when an application service device needs to forward the picture file.

The receiving device receives the compressed image data sent by the transmitter, and the receiving device may parse the compressed image data to acquire the picture header information data segment and the data stream in the compressed image data.

S602: Decode the data stream to generate YUV data, and convert the YUV data into RGB data by using color space conversion formulas.

In some embodiments, the receiving device decodes the data stream to generate the YUV data, and may convert the YUV data into the RGB data by using the color space conversion formulas. Further, the receiving device needs to determine used color space conversion formulas according to a domain range of a luminance component. It may be understood that for YUV data in a YUV444 mode, color space conversion formulas in which a domain range of a luminance component is [16, 235] and a domain range of a chrominance component is [16, 240] may be selected, or color space conversion formulas in which domain ranges of both a luminance component and a chrominance component are [0, 255] may be selected. Specifically, the selected color space conversion formulas may correspond to the color space conversion formulas selected to convert the RGB data into the YUV data in the foregoing embodiments. It should be noted that the chrominance includes a sample matrix of either of two color difference signals Cb and Cr or a single sample in the sample matrix. Upsampling processing needs to be separately performed on the two color difference signals in a same manner. Cb corresponds to U in YUV, and Cr corresponds to V in YUV.

If the domain range of the luminance component is [16, 235] and the domain range of the chrominance component is [16, 240], the color space conversion formulas are:

$$R = \text{Clip3}(0, 255, (298*Y + 409*(Cr-128) + 128) >> 8);$$

$$G = \text{Clip3}(0, 255, (298*Y - 100*(Cb-128) + 208*(Cr-128) + 128) >> 8); \text{ and}$$

$B=\text{Clip3}(0,255,(298*Y+516*(Cb-128)+128)>>8)$,
where

"+128" is used for rounding the value of R, the value of B, and the value of G, and ">>8" represents division by the eighth power of 2.

If the domain ranges of the luminance component and the chrominance component are both [0, 255], the color space conversion formulas are:

$R=\text{Clip3}(0,255,Y+(359*(Cr-128)+128)>>8)$;

$G=\text{Clip3}(0,255,Y-(88*(Cb-128)+183*(Cr-128)+128)>>8)$; and $B=\text{Clip3}(0,255,Y+(454*(Cb-128)+128)>>8)$, where "+128" is used for rounding the value of R, the value of B, and the value of G, and ">>8" represents division by the eighth power of 2.

Raster-scan processing may be performed on pixels in each image frame by using the color space conversion formulas to convert each frame of the YUV data into corresponding RGB data.

S603: Update an RGB value of each pixel in the RGB data by using global color table information.

In some embodiments, because the YUV data is encoded previously, the RGB data obtained by converting the YUV data is distorted, and the receiving device may update the RGB value of each pixel in the RGB data by using the global color table information. It may be understood that the RGB data may include one or more pixels. When the RGB data has only one pixel, the RGB value of the pixel may be updated by using the global color table information. When the RGB data has a plurality of pixels, the RGB value of each of the plurality of pixels may be updated by using the global color table information. The receiving device needs to train the global color table information again to generate local color table information that meets the RGB data. The receiving device may generate initial color table information if there is no global color table information, and train the initial color table information to generate the local color table information that meets the RGB data. A specific processing process is as follows:

In a first implementation of this embodiment of the present application, the receiving device may train the global color table information by using the RGB value of each pixel in the RGB data to generate the local color table information of the RGB data when the RGB data is the first image frame in the picture file and the picture header information data segment has the global color table information, and update the RGB value of each pixel by using the local color table information of the RGB data.

Further, the receiving device may sort at least one source RGB value in the global color table information in a preset sorting manner (for example, ascending order or descending order) of the G component to generate trained color table information when the RGB data is the first image frame in the picture file and the picture header information data segment has the global color table information. Referring together to FIG. 3, as shown in FIG. 3, the global color table information includes a color index and a source RGB value, for example: 5, (8, 1, 10); 6, (8, 9, 8); 7, (1, 7, 6); 8, (10, 8, 6); 9, (5, 8, 5); 10, (9, 10, 1). The trained color table information may be generated through sorting in ascending order of the G component, for example: 5, (8, 1, 10); 6, (1, 7, 6); 7, (5, 8, 5); 8, (10, 8, 6); 9, (8, 9, 8); 10, (9, 10, 1).

The receiving device acquires, from the trained color table information, a first source RGB value in which the G component is closest to the G component of a current pixel in the RGB data, and acquires a first color index of the first source RGB value. It may be understood that the receiving device may traverse source RGB values in the trained color table information by using the G component of the current pixel to acquire the first source RGB value having the closest G component. Referring together to FIG. 4, it is assumed that the first frame of the RGB data has four pixels, the current pixel is the first pixel in the RGB data, and an RGB value of the current pixel is (9, 9, 9). It may be found from the trained color table information that the G component in (8, 9, 8) is closest to the G component in the RGB value of the current pixel. (8, 9, 8) is determined as the first source RGB value, and it is acquired that a first color index of the first source RGB value is "9".

The receiving device acquires, from the trained color table information in a preset range with the first color index being the center, a second source RGB value having the smallest difference from the RGB value of the current pixel, and acquire a second color index of the second source RGB value. It may be understood that the receiving device may acquire a plurality of source RGB values in the preset range with the first color index being the center, calculate respectively differences of the first source RGB value and the plurality of source RGB values from the RGB value of the current pixel, and determine one of the plurality of source RGB values that has the smallest difference as the second source RGB value. According to the foregoing example, it is assumed that the preset range is a range of the center minus 1 to the center plus 1. "9" is the center, two source RGB values (10, 8, 6) and (9, 10, 1) are acquired, and difference values of (10, 8, 6), (8, 9, 8), and (9, 10, 1) from (9, 9, 9) are calculated respectively. A difference value of the source RGB value with the color index being "8" is |9−10|+|9−8|+|9−6|=5, a difference value of the source RGB value with the color index being "9" is |9−8|+|9−9|+|9−8|=2, and a difference value of the source RGB value with the color index being "10" is |9−9|+|9−10|+|9−1|=9. It is determined that the source RGB value (8, 9, 8) is the second source RGB value, and it is acquired that a second color index of the second source RGB value is "9". It may be understood that the first source RGB value and the first color index acquired in the foregoing may be respectively the same as or different from the second source RGB value and the second color index, depending specifically on an actual execution process.

The receiving device replaces the second source RGB value with the RGB value of the current pixel, and changes the plurality of source RGB values in a preset range with the second color index being the center in the trained color table information by using a preset weight value and the RGB value of the current pixel. Referring together to FIG. 5, according to the foregoing example, the second source RGB value is (8, 9, 8), and (8, 9, 8) is replaced with the RGB value (9, 9, 9) of the current pixel. In addition, the plurality of source RGB values in the preset range with the second color index being the center may be changed according to the preset weight value and the RGB value of the current pixel. Assuming that the preset range is a range of the center minus 1 to the center plus 1, two source RGB values (10, 8, 6) and (9, 10, 1) need to be changed. The preset weight value may be a dynamic weight value. A source RGB value whose color index is closer to the second color index is affected more significantly by the RGB value of the current pixel. It is assumed that the current distribution of weight values is 2:8. (10, 8, 6) is changed by using (9, 9, 9), for example, the R component=9*0.8+10*0.2=9.2, the G component=9*0.8+

8*0.2=8.8, and the B component=9*0.8+6*0.2=8.4. The foregoing results are rounded, so that it is determined that the source RGB value with the color index "8" is changed from (10, 8, 6) into (9, 9, 8). Similarly, the source RGB value with the color index "10" is changed from (9, 10, 1) into (9, 9, 7).

The receiving device acquires the changed trained color table information when the current pixel is not the last pixel in the RGB data, for example, when the current pixel is the first pixel in the RGB data shown in FIG. 4 or FIG. 5, uses a next pixel of the current pixel as a current pixel, and starts to acquire, from the trained color table information, a first source RGB value in which the G component is closest to the G component of a current pixel in the RGB data. For example, the second pixel in the RGB data is used as the current pixel, and the changed trained color table information is then trained again. For a specific training process, refer to the foregoing description of the training process. Details are not described herein.

The receiving device acquires the changed trained color table information when the current pixel is the last pixel in the RGB data, for example, when the current pixel is the fourth pixel in the RGB data shown in FIG. 4 or FIG. 5, and determines the trained color table information as the local color table information of the RGB data.

The receiving device may update the RGB value of each pixel by using the local color table information of the RGB data. Further, the receiving device may sequentially acquire, from the local color table information of the RGB data, a source RGB value with an RGB value that is the same as or has the smallest difference from the RGB value of each pixel to replace the RGB value of the pixel. In some embodiments, the receiving device may use a color index corresponding to a source RGB value with an RGB value that is the same as or has the smallest difference from the RGB value of each pixel to replace the RGB value of the pixel. Referring together to FIG. 6, according to the foregoing example, the RGB value of the first pixel in the RGB data is (9, 9, 9), and (9, 9, 8) in the local color table information has the smallest difference from (9, 9, 9), so that the color index "8" corresponding to (9, 9, 8) is used to replace the RGB value of the first pixel. Similarly, the color index of the second pixel is "10", the color index of the third pixel is "9", and the color index of the fourth pixel is "6".

In a second implementation of this embodiment of the present application, the receiving device may train the initial color table information by using the RGB value of each pixel in the RGB data to generate the local color table information of the RGB data when the RGB data is the first image frame in the picture file and the picture header information data segment does not have the global color table information, and update the RGB value of each pixel by using the local color table information of the RGB data.

Further, the receiving device may generate one piece of initial color table information, for example, (0, 0, 0), (1, 1, 1), (2, 2, 2), . . . , and (255, 255, 255), when the RGB data is the first image frame in the picture file and the picture header information data segment does not have the global color table information. The receiving device acquires, from the initial color table information, a third source RGB value in which the G component is closest to the G component of the current pixel in the RGB data, and acquires a third color index of the third source RGB value. The receiving device acquires, from the initial color table information in a preset range with the third color index being the center, a fourth source RGB value having the smallest difference from the RGB value of the current pixel, and acquires a fourth color index of the fourth source RGB value. The receiving device replaces the fourth source RGB value with the RGB value of the current pixel, and changes the plurality of source RGB values in a preset range with the fourth color index being the center in the initial color table information by using a preset weight value and the RGB value of the current pixel. The receiving device acquires the changed initial color table information when the current pixel is not the last pixel in the RGB data, uses a next pixel of the current pixel as a current pixel, and starts to acquire, from the initial color table information, the third source RGB value in which the G component is closest to the G component of the current pixel in the RGB data. The receiving device acquires changed trained color table information when the current pixel is the last pixel in the RGB data, and determines the initial color table information as the local color table information of the RGB data. The receiving device may update the RGB value of each pixel by using the local color table information of the RGB data. It should be noted that for both the processes of training the initial color table information and updating the RGB value of each pixel by using the local color table information of the RGB data in the second implementation, refer to the foregoing execution process in the first implementation. Details are not described herein.

For the foregoing first implementation and second implementation, in a third implementation of this embodiment of the present application, if the RGB data is not the first image frame in the picture file, to be specific, the RGB data is an $N^{th}$ image frame in the picture file, where N is a positive integer greater than 1 and less than or equal to the total number of frames, the receiving device may train local color table information of an $(N-1)^{th}$ frame of the RGB data by using the RGB value of each pixel in the RGB data to generate local color table information of the RGB data, and update the RGB value of each pixel by using the local color table information of the RGB data.

Further, the receiving device may sort at least one source RGB value in the local color table information of the $(N-1)^{th}$ frame of the RGB data in a preset sorting manner of the G component to generate trained color table information when the RGB data is the $N^{th}$ image frame in the picture file. The receiving device acquires, from the trained color table information, a fifth source RGB value in which the G component is closest to the G component of the current pixel in the RGB data, and acquires a fifth color index of the fifth source RGB value. The receiving device acquires, from the trained color table information in a preset range with the fifth color index being the center, a sixth source RGB value having the smallest difference from the RGB value of the current pixel, and acquires a sixth color index of the sixth source RGB value. The receiving device replaces the sixth source RGB value with the RGB value of the current pixel, and changes the plurality of source RGB values in a preset range with the sixth color index being the center in the trained color table information by using a preset weight value and the RGB value of the current pixel. The receiving device acquires the changed trained color table information when the current pixel is not the last pixel in the RGB data, uses a next pixel of the current pixel as a current pixel, and starts to acquire, from the trained color table information, the fifth source RGB value in which the G component is closest to the G component of the current pixel in the RGB data. The receiving device acquires the changed trained color table information when the current pixel is the last pixel in the RGB data, and determines the trained color table information as the local color table information of the RGB data. The receiving device may update the RGB value of each pixel by using the local color table information of the RGB data. It should be noted that for both the processes of training the trained color table information and updating the RGB value of each pixel by using the local color table information of the RGB data in the third implementation, refer to the foregoing execution process in the first implementation. Details are not described herein.

It should be noted that the foregoing use of the G component as a guide for training of the color table information is merely an example. In this embodiment of the present application, the R component or the B component may be similarly used to guide the training of the color table information. For an execution process, refer to the description in the foregoing content. Details are not described herein. The first source RGB value, the second source RGB value, the third source RGB value, the fourth source RGB value, the fifth source RGB value, and the sixth source RGB value may represent the same meaning of a source RGB value, and the first color index, the second color index, the third color index, the fourth color index, the fifth color index, and the sixth color index may represent the same meaning of a color index. Such a naming manner is merely used to distinguish between different execution scenarios, for example, the foregoing three execution scenarios in which the RGB data is the first image frame in the picture file and the picture header information data segment has the global color table information, the RGB data is the first image frame in the picture file and the picture header information data segment does not have the global color table information, and the RGB data is the $N^{th}$ image frame in the picture file.

S604: Perform image encoding on the updated RGB data by using a delay information and a total number of frames to generate the picture file.

In some embodiments, the receiving device performs image encoding on the updated RGB data by using the delay information and the total number of frames to generate the picture file. In some embodiments, the receiving device may perform image encoding on the color index of each pixel in the RGB data based on the delay information and the total number of frames and by using LZW encoding to generate the picture file. The receiving device may store or present the picture file. It may be understood that a scheme of the image encoding is specifically determined by an image format of the picture file. For example, the image encoding may be GIF encoding or the like if the picture file that needs to be generated is a GIF image.

In this embodiment of the present application, YUV data may be generated according to data stream when compressed image data is received, and the YUV data is then processed based on the picture header information data segment to generate the picture file. Each image frame in the picture file having a relatively large amount of file data is converted into the YUV data having a relatively small amount of data, and the YUV data is then encoded to obtain the data stream, so that an amount of file data of the picture file during transmission is greatly reduced, and bandwidth costs are reduced. Global color table information or initial color table information is trained to generate local color table information of RGB data, so that image distortion is effectively reduced. The G component is used to acquire a source RGB value having the closest G component, a search for a color index is made in a small range in the color table information, and it is not necessary to traverse all the color table information, so that the complexity of training the local color table information can be lowered, thereby further improving the efficiency of encoding the picture file.

Figure 13:
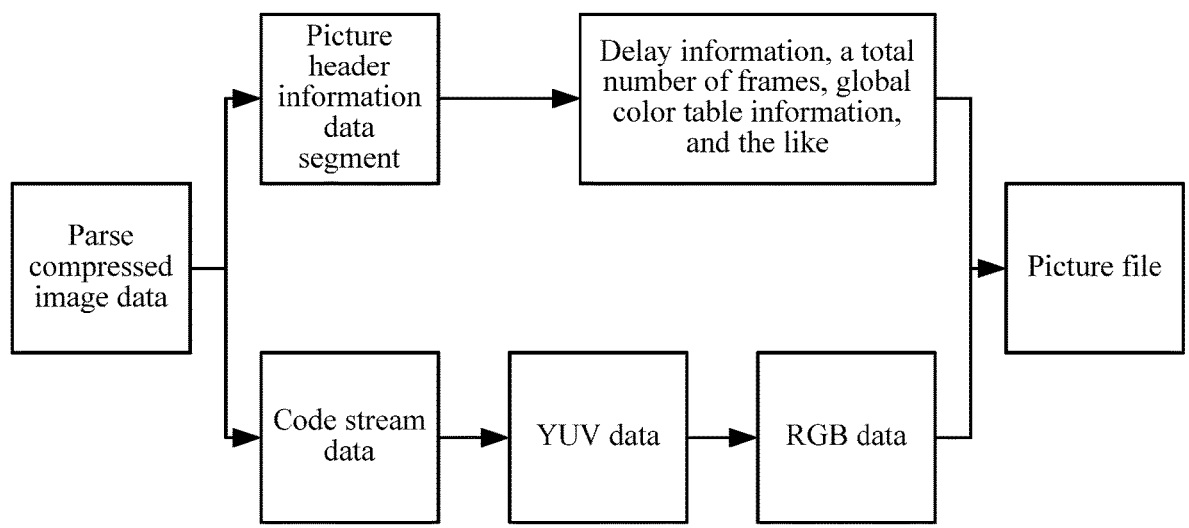
FIG. 13 is a schematic diagram of an example of generating a picture file according to an embodiment of the present application.

FIG. 13 is a schematic diagram of an example of generating a picture file according to an embodiment of the present application. As shown in FIG. 13, compressed image data may be parsed to acquire a picture header information data segment and data stream in the compressed image data when the compressed image data is acquired. The picture header information data segment may include delay information, a total number of frames, global color table information, and the like. The delay information records a play interval between image frames in the picture file. The total number of frames is a quantity of image frames in the picture file. It may be understood that the global color table information includes an RGB value of each pixel in each image frame. All images included in some picture files share the global color table information, and each image frame in some other picture files has respective local color table information. Therefore, the picture header information data segment has the global color table information if the picture file has the global color table information. The picture header information data segment does not have the global color table information if the picture file has only the local color table information. The data stream may be further decoded to generate YUV data, and the YUV data is converted into RGB data by using color space conversion formulas. It is determined whether the picture header information data segment has the global color table information if the currently processed RGB data is the first frame of the RGB data in the picture file. The global color table information is trained by using the RGB value of each pixel in the RGB data to generate the local color table information of the RGB data if the picture header information data segment has the global color table information, and the RGB value of each pixel is updated by using the local color table information of the RGB data. Initial color table information may be generated if the picture header information data segment does not have the global color table information, and the initial color table information is trained by using the RGB value of each pixel in the RGB data to generate the local color table information of the RGB data, and the RGB value of each pixel is updated by using the local color table information of the RGB data. If the currently processed RGB data is an $N^{th}$ frame of the RGB data in the picture file, where N is a positive integer greater than 1, local color table information of an $(N-1)^{th}$ frame of the RGB data may be trained by using the RGB value of each pixel in the RGB data to generate the local color table information of the RGB data, and the RGB value of each pixel is updated by using the local color table information of the RGB data. Image encoding is eventually performed on the updated RGB data by using the delay information and the total number of frames to generate the picture file.

Figure 14:
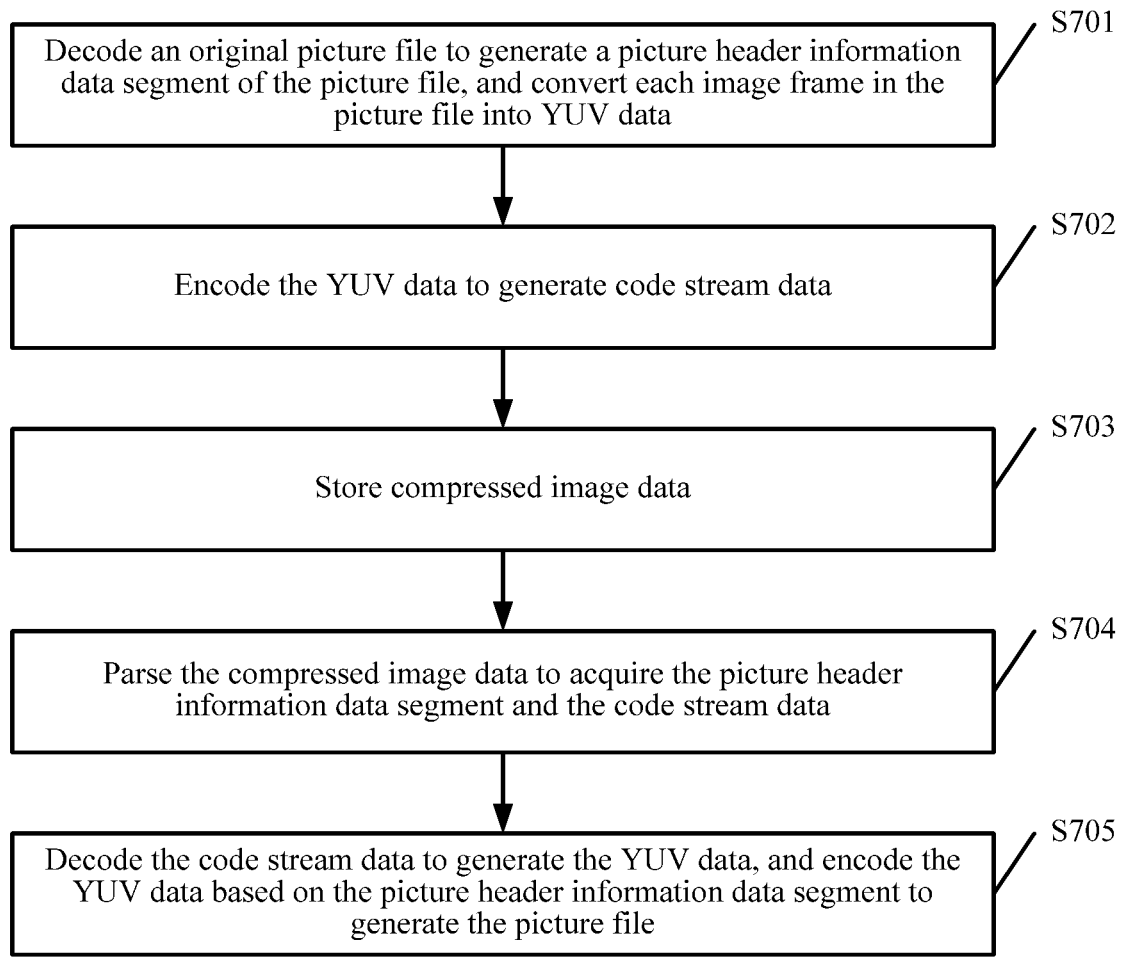
FIG. 14 is a schematic flowchart of still another picture file processing method according to an embodiment of the present application.

FIG. 14 is a schematic flowchart of still another picture file processing method according to an embodiment of the present application. As shown in FIG. 14, a picture file processing device in this embodiment of the present application may be a distributed service device, or may be an image processing module in the distributed service device. The method in this embodiment of the present application may include the following steps S701 to S705.

S701: Generate a picture header information data segment of an original picture file according to the picture file, and convert each image frame in the picture file into YUV data.

In some embodiments, a picture file processing device may decode the original picture file to generate the picture header information data segment of the picture file. The picture file may be an image input after a developer finishes making an image or may be an image received from another end. The picture header information data segment may include delay information, a total number of frames, and the like of the picture file. The delay information records a play interval between image frames in the picture file. The total number of frames is a quantity of image frames in the picture file. It may be understood that the picture header information data segment may further include global color table information of the picture file. The global color table information includes an RGB value of each pixel in each image frame. All images included in some picture files share the global color table information, and each image frame in some other picture files has respective local color table information. Therefore, the global color table information is acquired if the picture file has the global color table information, and the local color table information is not acquired if the picture file has only the local color table information. The picture file processing device further converts each image frame in the picture file into the YUV data.

S702: Encode the YUV data to generate data stream.

In some embodiments, the picture file processing device may further compress and encode the YUV data to generate the data stream. The encoding may include one or more of predictive coding, transform coding, quantization coding, and entropy coding. For example, the picture file processing device may compress the YUV data in IPPP mode. The first frame of the YUV data is an I frame. The I frame is an intra-frame prediction frame. The remaining frames of the YUV data are P frames. The P frame is an inter-frame prediction frame. Therefore, an amount of file data of the picture file can be effectively reduced, and a constant QP mode can further be used to stabilize quality and the like of different frames. The entropy coding may include Huffman coding, arithmetic coding, and the like.

S703: Store compressed image data.

In some embodiments, the picture file processing device may generate the compressed image data, and the picture file processing device may store the compressed image data. The compressed image data includes the picture header information data segment and the data stream.

S704: Parse the compressed image data to acquire the picture header information data segment and the data stream.

In some embodiments, the picture file processing device may parse the compressed image data to acquire the picture header information data segment and the data stream in the compressed image data.

S705: Generate the YUV data according to the data stream, and encode the YUV data based on the picture header information data segment to generate the picture file.

In some embodiments, the picture file processing device decodes the data stream to generate the YUV data, and encodes the YUV data based on the delay information, the total number of frames, the global color table information, and the like in the picture header information data segment to generate the picture file.

In this embodiment of the present application, a picture header information data segment of an original picture file is generated according to the picture file, each image frame in the picture file is converted into YUV data, compressed image data is then generated based on the picture header information data segment and data stream that is obtained by encoding the YUV data, and the compressed image data is stored. The YUV data may be generated according to the data stream when the compressed image data is acquired, and the YUV data is then processed based on the picture header information data segment to generate the picture file. Each image frame in the picture file having a relatively large amount of file data is converted into the YUV data having a relatively small amount of data, and the YUV data is then encoded to obtain the data stream, so that an amount of file data of the picture file during transmission is greatly reduced, and storage costs are reduced.

Figure 15:
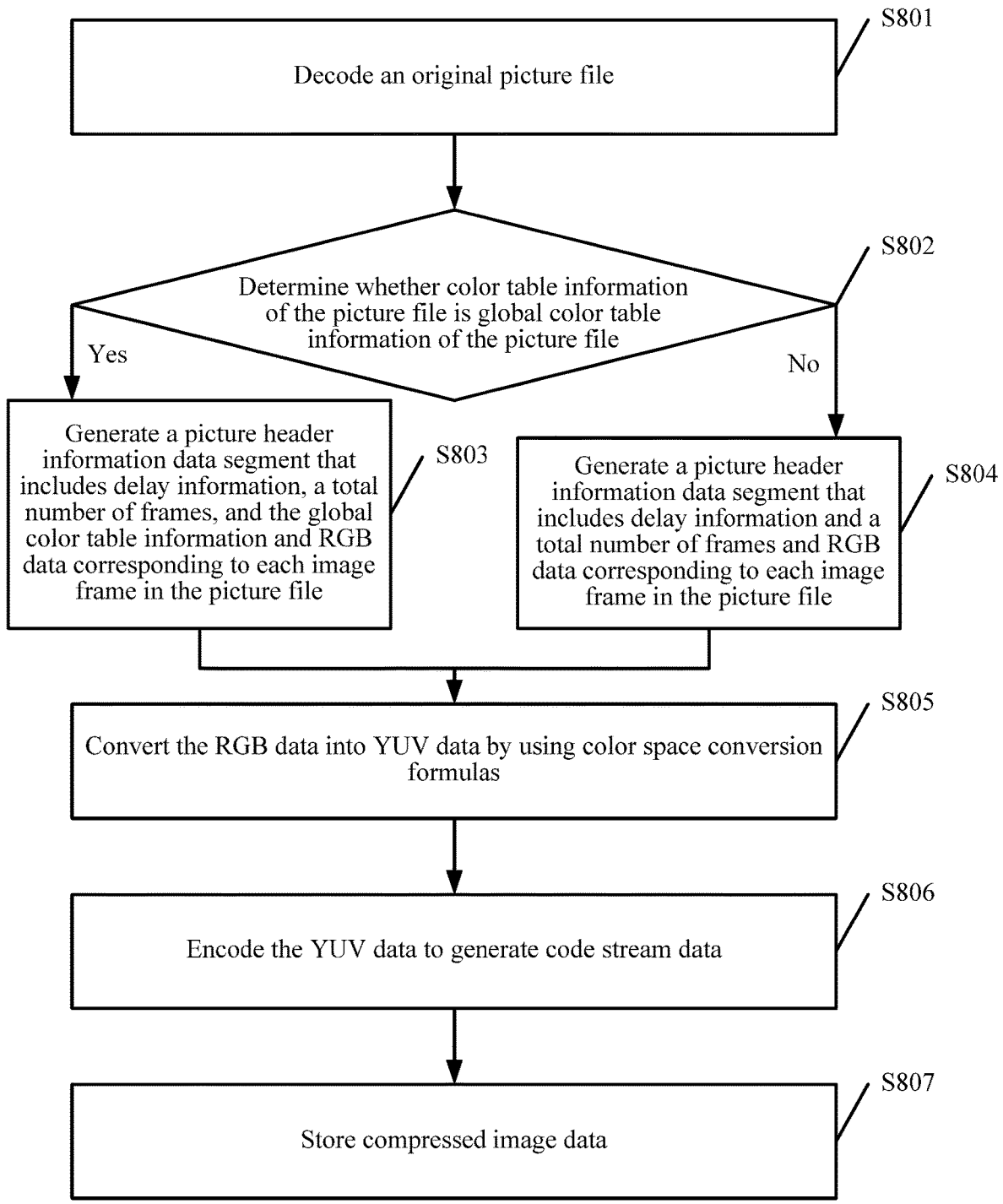
FIG. 15 is a schematic flowchart of still another picture file processing method according to an embodiment of the present application.

FIG. 15 is a schematic flowchart of still another picture file processing method according to an embodiment of the present application. As shown in FIG. 15, a picture file processing device in this embodiment of the present application may be a distributed service device, or may be an image processing module in the distributed service device. A process of compressing a picture file into compressed image data is described in detail in this embodiment of the present application. The method may include the following steps S801 to S807.

S801: Decode an original picture file.

S802: Determine whether color table information of the picture file is global color table information of the picture file.

In some embodiments, the picture file processing device may decode the original picture file. It may be understood that the global color table information includes an RGB value of each pixel in each image frame in the picture file. All images included in some picture files share the global color table information, and each image frame in some other picture files has respective local color table information. The picture file processing device may further determine whether the color table information of the picture file is the global color table information of the picture file. Step S803 is performed if the color table information of the picture file is the global color table information of the picture file. Step S804 is performed if the color table information of the picture file is not the global color table information of the picture file.

S803: Generate a picture header information data segment that includes delay information, a total number of frames, and the global color table information and RGB data corresponding to each image frame in the picture file.

In some embodiments, the picture file processing device may generate the picture header information data segment that includes the delay information, the total number of frames, the global color table information, and the like when it is determined that the color table information of the picture file is the global color table information of the picture file. The delay information records a play interval between image frames in the picture file. The total number of frames is a quantity of image frames in the picture file. In addition, the picture file processing device further generates the RGB data corresponding to each image frame in the picture file.

S804: Generate a picture header information data segment that includes delay information and a total number of frames and the RGB data corresponding to each image frame in the picture file.

In some embodiments, the picture file processing device may generate the picture header information data segment that includes the delay information, the total number of frames, and the like when it is determined that the color table information of the picture file is not the global color table information of the picture file. The delay information records a play interval between image frames in the picture file. The total number of frames is a quantity of image frames in the picture file. In addition, the picture file processing device further generates the RGB data corresponding to each image frame in the picture file.

S805: Convert the RGB data into YUV data by using color space conversion formulas.

In some embodiments, the picture file processing device may convert the RGB data into the YUV data by using the color space conversion formulas. During the conversion of the RGB data into the YUV data, color space conversion formulas in which a domain range of a luminance component is [16, 235] and a domain range of a chrominance component is [16, 240] may be selected. Because the ranges are reduced, the YUV data obtained after conversion can have a greatly reduced amount of data but has relatively severe distortion. Alternatively, color space conversion formulas in which domain ranges of both a luminance component and a chrominance component are [0, 255] may be selected. In this case, the YUV data obtained after conversion can have less severe distortion but has a relatively large amount of data, and the color space conversion formulas in which the domain ranges of both the luminance component and the chrominance component are [0, 255] are:

$Y=0.299R+0.587G+0.114B;$ $U=-0.1687R-0.3313G+0.5B+128;$ and $V=0.5R-0.4187G-0.0813B+128,$ where YUV is a video data format, Y is a luminance component, UV is a chrominance component, and raster-scan processing may be performed on pixels in each image frame by using the color space conversion formulas to convert each frame of the RGB data into corresponding YUV data.

S806: Encode the YUV data to generate data stream.

In some embodiments, the picture file processing device may further encode the YUV data to generate the data stream. The encoding may include one or more of predictive coding, transform coding, quantization coding, and entropy coding. For example, the picture file processing device may compress the YUV data in IPPP mode. The first frame of the YUV data is an I frame. The I frame is an intra-frame prediction frame. The remaining frames of the YUV data are P frames. The P frame is an inter-frame prediction frame. Therefore, an amount of file data of the picture file can be effectively reduced, and a constant QP mode can further be used to stabilize quality and the like of different frames. The entropy coding may include Huffman coding, arithmetic coding, and the like.

Further, during encoding of the YUV data, it may be supported that a user adds a configuration parameter. The configuration parameter may be a parameter for encoding the YUV data. The configuration parameter may include any one of a standard definition mode parameter, a high definition mode parameter, and a lossless mode parameter. The standard definition mode parameter (for example, a YUV420 mode parameter) may be selected when reduced bandwidth is required. The high definition mode parameter (for example, a YUV444 mode parameter) may be selected when image quality is required. The picture file processing device may encode the YUV data by using the configuration parameter to generate the data stream.

In some embodiments, during encoding of the YUV data, it may further be supported that a user adds an encoder complexity, and the encoder complexity may be an encoding fineness parameter determined according to hardware performance of the picture file processing device. The encoder complexity may include any one of a first complexity, a second complexity, and a third complexity. The first complexity is higher than the second complexity, and the second complexity is higher than the third complexity. For example, the hardware performance of the picture file processing device may be detected to generate a performance value. For example, a computational rate or the like of a CPU of a picture file processing device is tested. It may be determined that the picture file processing device has very high hardware performance when the performance value is in a first preset value range, and it may be recommended to use an encoding scheme with the first complexity. It may be determined that a picture file processing device has medium hardware performance when the performance value is in a second preset value range, and it may be recommended to use an encoding scheme with the second complexity. It may be determined that the picture file processing device has relatively poor hardware performance or currently real-time transcoding or the like is required when the performance value is in a third preset value range, and it may be recommended to use an encoding scheme with the third complexity. The picture file processing device may configure the encoder complexity to encode the YUV data to generate the data stream.

It should be noted that the foregoing two encoding schemes may be parallel encoding schemes. To be specific, the picture file processing device may use both the configuration parameter and the configured encoder complexity to encode the YUV data to generate the data stream. The performance value, the first preset value range, the second preset value range, and the third preset value range may be specifically set according to the experience of a developer.

S807: Store compressed image data.

In some embodiments, the picture file processing device may generate the compressed image data, and the picture file processing device may store the compressed image data. The compressed image data includes the picture header information data segment and the data stream.

In this embodiment of the present application, a picture header information data segment of an original picture file is generated according to the picture file, each image frame in the picture file is converted into YUV data, compressed image data is then generated based on the picture header information data segment and data stream that is obtained by encoding the YUV data, and the compressed image data is stored. Each image frame in the picture file having a relatively large amount of file data is converted into the YUV data having a relatively small amount of data, and the YUV data is then encoded to obtain the data stream, so that an amount of file data of the picture file during storage is greatly reduced, and storage costs are reduced.

Figure 16:
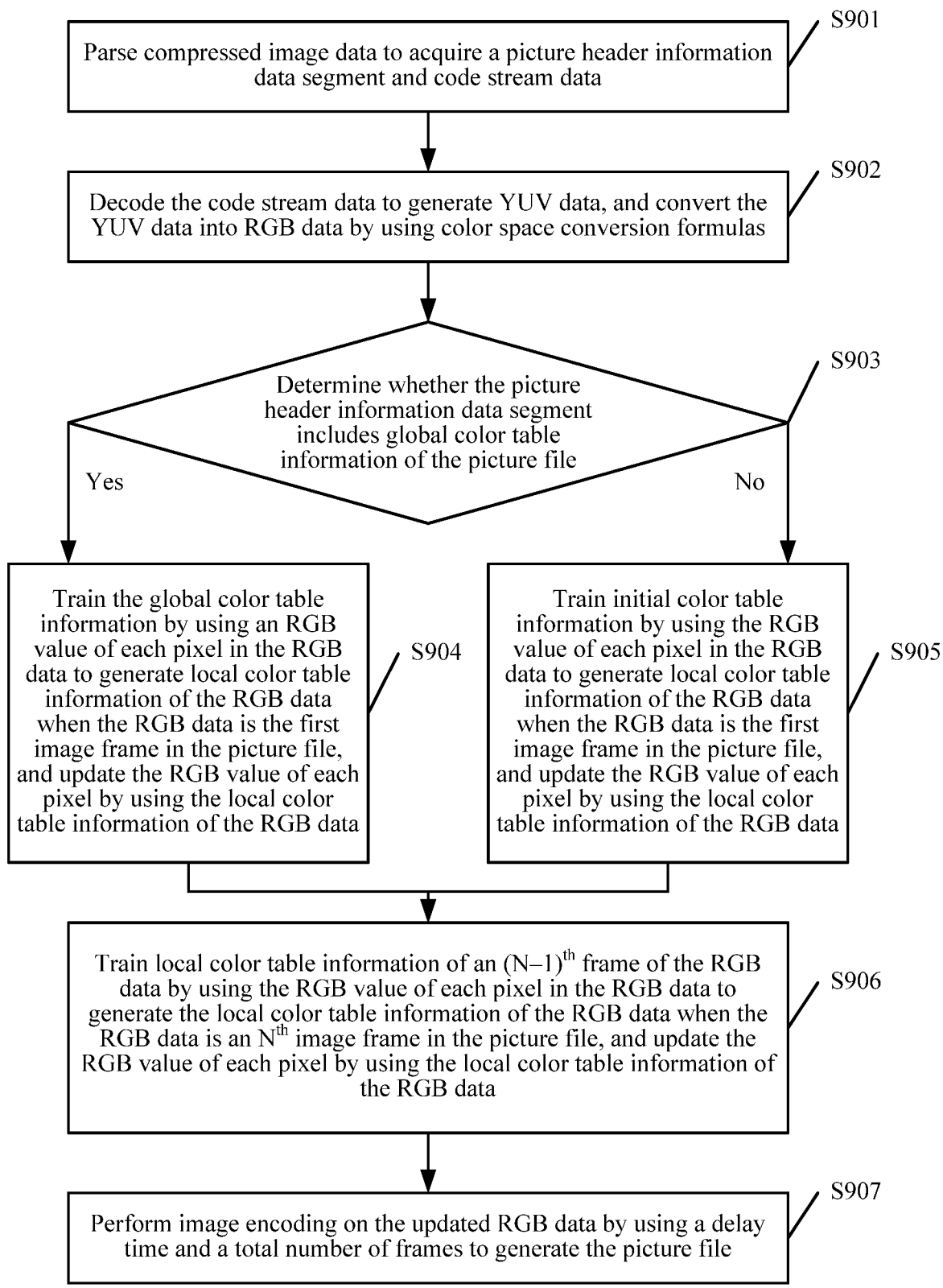
FIG. 16 is a schematic flowchart of still another picture file processing method according to an embodiment of the present application.

FIG. 16 is a schematic flowchart of still another picture file processing method according to an embodiment of the present application. As shown in FIG. 16, a picture file processing device in this embodiment of the present application may be a distributed service device, or may be an image processing module in the distributed service device, a process of decompressing compressed image data into a picture file is described in detail in this embodiment of the present application. The method may include the following steps S901 to S907.

S901: Parse compressed image data to acquire a picture header information data segment and data stream.

In some embodiments, the picture file processing device may parse the compressed image data to acquire the picture header information data segment and the data stream in the compressed image data. It may be understood that the picture header information data segment may include delay information, a total number of frames, an image feature information data segment, and the like of a picture file. The delay information records a play interval between image frames in the picture file. The total number of frames is a quantity of image frames in the picture file. It may be understood that the picture header information data segment may further include global color table information of the picture file. The global color table information includes an RGB value of each pixel in each image frame. All images included in some picture files share the global color table information, and each image frame in some other picture files has respective local color table information. Therefore, the global color table information is acquired if the picture file has the global color table information, and the local color table information is not acquired if the picture file has only the local color table information.

S902: Decode the data stream to generate YUV data, and convert the YUV data into RGB data by using color space conversion formulas.

In some embodiments, the picture file processing device decodes the data stream to generate the YUV data, and may convert the YUV data into the RGB data by using the color space conversion formulas. Further, a receiving device needs to determine used color space conversion formulas according to a domain range of a luminance component. It may be understood that for YUV data in a YUV444 mode, color space conversion formulas in which a domain range of a luminance component is [16, 235] and a domain range of a chrominance component is [16, 240] may be selected, or color space conversion formulas in which domain ranges of both a luminance component and a chrominance component are [0, 255] may be selected. Specifically, the selected color space conversion formulas may correspond to the color space conversion formulas selected to convert the RGB data into the YUV data in the foregoing embodiments. It should be noted that the chrominance includes a sample matrix of either of two color difference signals Cb and Cr or a single sample in the sample matrix. Upsampling processing needs to be separately performed on the two color difference signals in a same manner. Cb corresponds to U in YUV, and Cr corresponds to V in YUV.

If the domain range of the luminance component is [16, 235] and the domain range of the chrominance component is [16, 240], the color space conversion formulas are:

$$R=\text{Clip3}(0,255,(298*Y+409*(Cr-128)+128)>>8);$$

$$G=\text{Clip3}(0,255,(298*Y-100*(Cb-128)+208*(Cr-128)+128)>>8); \text{ and}$$

$$B=\text{Clip3}(0,255,(298*Y+516*(Cb-128)+128)>>8),$$

where

"+128" is used for rounding the value of R, the value of B, and the value of G, and ">>8" represents division by the eighth power of 2.

If the domain ranges of the luminance component and the chrominance component are both [0, 255], the color space conversion formulas are:

$$R=\text{Clip3}(0,255,Y+(359*(Cr-128)+128)>>8);$$

$$G=\text{Clip3}(0,255,Y-(88*(Cb-128)+183*(Cr-128)+128)>>8); \text{ and}$$

$$B=\text{Clip3}(0,255,Y+(454*(Cb-128)+128)>>8), \text{ where}$$

"+128" is used for rounding the value of R, the value of B, and the value of G, and ">>8" represents division by the eighth power of 2.

Raster-scan processing may be performed on pixels in each image frame by using the color space conversion formulas to convert each frame of the YUV data into corresponding RGB data.

S903: Determine whether the picture header information data segment includes global color table information of the picture file.

In some embodiments, the picture file processing device determines whether the picture header information data segment includes the global color table information of the picture file. Step S904 is performed if the picture header information data segment includes the global color table information of the picture file. Step S905 is performed if the picture header information data segment does not include the global color table information of the picture file.

Because the YUV data is encoded previously, the RGB data obtained by converting the YUV data is distorted, and the picture file processing device may update the RGB value of each pixel in the RGB data by using the global color table information. It may be understood that the RGB data may include one or more pixels. When the RGB data has only one pixel, the RGB value of the pixel may be updated by using the global color table information. When the RGB data has a plurality of pixels, the RGB value of each of the plurality of pixels may be updated by using the global color table information. The picture file processing device needs to train the global color table information again to generate local color table information that meets the RGB data. The picture file processing device may generate initial color table information if there is no global color table information, and train the initial color table information to generate the local color table information that meets the RGB data.

S904: Train the global color table information by using an RGB value of each pixel in the RGB data to generate local color table information of the RGB data when the RGB data is the first image frame in the picture file, and update the RGB value of each pixel by using the local color table information of the RGB data.

In some embodiments, in a first implementation, the picture file processing device may train the global color table information by using the RGB value of each pixel in the RGB data to generate the local color table information of the RGB data when the RGB data is the first image frame in the picture file and the picture header information data segment has the global color table information, and update the RGB value of each pixel by using the local color table information of the RGB data.

Further, the picture file processing device may sort at least one source RGB value in the global color table information in a preset sorting manner (for example, ascending order or descending order) of the G component to generate trained color table information when the RGB data is the first image frame in the picture file and the picture header information data segment has the global color table information. Referring together to FIG. 3, as shown in FIG. 3, the global color table information includes a color index and a source RGB value, for example: 5, (8, 1, 10); 6, (8, 9, 8); 7, (1, 7, 6); 8, (10, 8, 6); 9, (5, 8, 5); 10, (9, 10, 1). The trained color table information may be generated through sorting in ascending order of the G component, for example: 5, (8, 1, 10); 6, (1, 7, 6); 7, (5, 8, 5); 8, (10, 8, 6); 9, (8, 9, 8); 10, (9, 10, 1).

The picture file processing device acquires, from the trained color table information, a first source RGB value in which the G component is closest to the G component of a current pixel in the RGB data, and acquires a first color index of the first source RGB value. It may be understood that the picture file processing device may traverse source RGB values in the trained color table information by using the G component of the current pixel to acquire the first source RGB value having the closest G component. Referring together to FIG. 4, it is assumed that the first frame of the RGB data has four pixels, the current pixel is the first pixel in the RGB data, and an RGB value of the current pixel is (9, 9, 9). It may be found from the trained color table information that the G component in (8, 9, 8) is closest to the G component in the RGB value of the current pixel. (8, 9, 8) is determined as the first source RGB value, and it is acquired that a first color index of the first source RGB value is "9".

The picture file processing device acquires, from the trained color table information in a preset range with the first color index being the center, a second source RGB value having the smallest difference from the RGB value of the current pixel, and acquires a second color index of the second source RGB value. It may be understood that the picture file processing device may acquire a plurality of source RGB values in the preset range with the first color index being the center, calculate respectively differences of the first source RGB value and the plurality of source RGB values from the RGB value of the current pixel, and determine one of the plurality of source RGB values that has the smallest difference as the second source RGB value. According to the foregoing example, it is assumed that the preset range is a range of the center minus 1 to the center plus 1. "9" is the center, two source RGB values (10, 8, 6) and (9, 10, 1) are acquired, and difference values of (10, 8, 6), (8, 9, 8), and (9, 10, 1) from (9, 9, 9) are calculated respectively. A difference value of the source RGB value with the color index being "8" is |9−10|+|9−8|+|9−6|=5, a difference value of the source RGB value with the color index being "9" is |9−8|+|9−9|+|9−8|=2, and a difference value of the source RGB value with the color index being "10" is |9−9|+|9−10|+|9−1|=9. It is determined that the source RGB value (8, 9, 8) is the second source RGB value, and it is acquired that a second color index of the second source RGB value is "9". It may be understood that the first source RGB value and the first color index acquired in the foregoing may be respectively the same as or different from the second source RGB value and the second color index, depending specifically on an actual execution process.

The picture file processing device replaces the second source RGB value with the RGB value of the current pixel, and changes the plurality of source RGB values in the preset range with a second color index being the center in the trained color table information by using a preset weight value and the RGB value of the current pixel. Referring together to FIG. 5, according to the foregoing example, the second source RGB value is (8, 9, 8), and (8, 9, 8) is replaced with the RGB value (9, 9, 9) of the current pixel. In addition, the plurality of source RGB values in the preset range with the second color index being the center may be changed according to the preset weight value and the RGB value of the current pixel. Assuming that the preset range is a range of the center minus 1 to the center plus 1, two source RGB values (10, 8, 6) and (9, 10, 1) need to be changed. The preset weight value may be a dynamic weight value. A source RGB value whose color index is closer to the second color index is affected more significantly by the RGB value of the current pixel. It is assumed that the current distribution of weight values is 2:8. (10, 8, 6) is changed by using (9, 9, 9), for example, the R component=9*0.8+10*0.2=9.2, the G component=9*0.8+8*0.2=8.8, and the B component=9*0.8+6*0.2=8.4. The foregoing results are rounded, so that it is determined that the source RGB value with the color index "8" is changed from (10, 8, 6) into (9, 9, 8). Similarly, the source RGB value with the color index "10" is changed from (9, 10, 1) into (9, 9, 7).

The picture file processing device acquires the changed trained color table information when the current pixel is not the last pixel in the RGB data, for example, when the current pixel is the first pixel in the RGB data shown in FIG. 4 or FIG. 5, uses a next pixel of the current pixel as a current pixel, and starts to acquire, from the trained color table information, a first source RGB value in which the G component is closest to the G component of a current pixel in the RGB data. For example, the second pixel in the RGB data is used as the current pixel, and the changed trained color table information is then trained again. For a specific training process, refer to the foregoing description of the training process. Details are not described herein.

The picture file processing device acquires the changed trained color table information when the current pixel is the last pixel in the RGB data, for example, when the current pixel is the fourth pixel in the RGB data shown in FIG. 4 or FIG. 5, and determines the trained color table information as the local color table information of the RGB data.

The picture file processing device may update the RGB value of each pixel by using the local color table information of the RGB data. Further, the picture file processing device may sequentially acquire, from the local color table information of the RGB data, a source RGB value with an RGB value that is the same as or has the smallest difference from the RGB value of each pixel to replace the RGB value of the pixel. In some embodiments, the picture file processing device may use a color index corresponding to a source RGB value with an RGB value that is the same as or has the smallest difference from the RGB value of each pixel to replace the RGB value of the pixel. Referring together to FIG. 6, according to the foregoing example, the RGB value of the first pixel in the RGB data is (9, 9, 9), and (9, 9, 8) in the local color table information has the smallest difference from (9, 9, 9), so that the color index "8" corresponding to (9, 9, 8) is used to replace the RGB value of the first pixel. Similarly, the color index of the second pixel is "10", the color index of the third pixel is "9", and the color index of the fourth pixel is "6".

S905: Train initial color table information by using the RGB value of each pixel in the RGB data to generate local color table information of the RGB data when the RGB data is the first image frame in the picture file, and update the RGB value of each pixel by using the local color table information of the RGB data.

In some embodiments, in a second implementation, the picture file processing device may train the initial color table information by using the RGB value of each pixel in the RGB data to generate the local color table information of the RGB data when the RGB data is the first image frame in the picture file and the picture header information data segment does not have the global color table information, and update the RGB value of each pixel by using the local color table information of the RGB data.

Further, the picture file processing device may generate one piece of initial color table information, for example, (0, 0, 0), (1, 1, 1), (2, 2, 2), . . . , and (255, 255, 255), when the RGB data is the first image frame in the picture file and the picture header information data segment does not have the global color table information. The picture file processing device acquires, from the initial color table information, a third source RGB value in which the G component is closest to the G component of the current pixel in the RGB data, and acquires a third color index of the third source RGB value. The picture file processing device acquires, from the initial color table information in a preset range with the third color index being the center, a fourth source RGB value having the smallest difference from the RGB value of the current pixel, and acquires a fourth color index of the fourth source RGB value. The picture file processing device replaces the fourth source RGB value with the RGB value of the current pixel, and changes the plurality of source RGB values in a preset range with the fourth color index being the center in the initial color table information by using a preset weight value and the RGB value of the current pixel. The picture file processing device acquires the changed initial color table information when the current pixel is not the last pixel in the RGB data, uses a next pixel of the current pixel as a current pixel, and starts to acquire, from the initial color table information, the third source RGB value in which the G component is closest to the G component of the current pixel in the RGB data. The picture file processing device acquires changed trained color table information when the current pixel is the last pixel in the RGB data, and determines the initial color table information as the local color table information of the RGB data. The picture file processing device may update the RGB value of each pixel by using the local color table information of the RGB data. It should be noted that for both the processes of training the initial color table information and updating the RGB value of each pixel by using the local color table information of the RGB data in the second implementation, refer to the foregoing execution process in the first implementation. Details are not described herein.

S906: Train local color table information of an $(N-1)^{th}$ frame of the RGB data by using the RGB value of each pixel in the RGB data to generate the local color table information of the RGB data when the RGB data is an $N^{th}$ image frame in the picture file, and update the RGB value of each pixel by using the local color table information of the RGB data.

In some embodiments, in a third implementation, if the RGB data is not the first image frame in the picture file, to be specific, the RGB data is the $N^{th}$ image frame in the picture file, where N is a positive integer greater than 1 and less than or equal to the total number of frames, the picture file processing device may train the local color table information of the $(N-1)^{th}$ frame of the RGB data by using the RGB value of each pixel in the RGB data to generate the local color table information of the RGB data, and update the RGB value of each pixel by using the local color table information of the RGB data.

Further, the picture file processing device may sort at least one source RGB value in the local color table information of the $(N-1)^{th}$ frame of the RGB data in a preset sorting manner of the G component to generate trained color table information when the RGB data is the $N^{th}$ image frame in the picture file. The picture file processing device acquires, from the trained color table information, a fifth source RGB value in which the G component is closest to the G component of the current pixel in the RGB data, and acquires a fifth color index of the fifth source RGB value. The picture file processing device acquires, from the trained color table information in a preset range with the fifth color index being the center, a sixth source RGB value having the smallest difference from the RGB value of the current pixel, and acquires a sixth color index of the sixth source RGB value. The picture file processing device replaces the sixth source RGB value with the RGB value of the current pixel, and changes the plurality of source RGB values in a preset range with the sixth color index being the center in the trained color table information by using a preset weight value and the RGB value of the current pixel. The picture file processing device acquires the changed trained color table information when the current pixel is not the last pixel in the RGB data, uses a next pixel of the current pixel as a current pixel, and starts to acquire, from the trained color table information, the fifth source RGB value in which the G component is closest to the G component of the current pixel in the RGB data. The picture file processing device acquires the changed trained color table information when the current pixel is the last pixel in the RGB data, and determines the trained color table information as the local color table information of the RGB data. The picture file processing device may update the RGB value of each pixel by using the local color table information of the RGB data. It should be noted that for both the processes of training the trained color table information and updating the RGB value of each pixel by using the local color table information of the RGB data in the third implementation, refer to the foregoing execution process in the first implementation. Details are not described herein.

It should be noted that the foregoing use of the G component as a guide for training of the color table information is merely an example. In this embodiment of the present application, the R component or the B component may be similarly used to guide the training of the color table information. For an execution process, refer to the description in the foregoing content. Details are not described herein. The first source RGB value, the second source RGB value, the third source RGB value, the fourth source RGB value, the fifth source RGB value, and the sixth source RGB value may represent the same meaning of a source RGB value, and the first color index, the second color index, the third color index, the fourth color index, the fifth color index, and the sixth color index may represent the same meaning of a color index. Such a naming manner is merely used to distinguish between different execution scenarios, for example, the foregoing three execution scenarios in which the RGB data is the first image frame in the picture file and the picture header information data segment has the global color table information, the RGB data is the first image frame in the picture file and the picture header information data segment does not have the global color table information, and the RGB data is the $N^{th}$ image frame in the picture file.

S907: Perform image encoding on the updated RGB data by using a delay information and a total number of frames to generate the picture file.

In some embodiments, the picture file processing device performs image encoding on the updated RGB data by using the delay information and the total number of frames to generate the picture file. In some embodiments, the picture file processing device may perform image encoding on the color index of each pixel in the RGB data based on the delay information and the total number of frames and by using LZW encoding to generate the picture file. The picture file processing device may store or present the picture file. It may be understood that a scheme of the image encoding is specifically determined by an image format of the picture file. For example, the image encoding may be GIF encoding or the like if the picture file that needs to be generated is a GIF image.

In this embodiment of the present application, a picture header information data segment of an original picture file is generated according to the picture file, each image frame in the picture file is converted into YUV data, compressed image data is then generated based on the picture header information data segment and data stream that is obtained by encoding the YUV data, and the compressed image data is transmitted. The YUV data may be generated according to the data stream when the compressed image data is received, and the YUV data is then processed based on the picture header information data segment to generate the picture file. Each image frame in the picture file having a relatively large amount of file data is converted into the YUV data having a relatively small amount of data, and the YUV data is then encoded to obtain the data stream, so that an amount of file data of the picture file during transmission is greatly reduced, and bandwidth costs are reduced. The use of a configuration parameter is flexibly controlled, and an encoder complexity is configured, so that different service scenarios and different machine performance can be satisfied, and the efficiency of encoding the picture file is optimized. Global color table information or initial color table information is trained to generate local color table information of the RGB data, so that image distortion is effectively reduced. The G component is used to acquire a source RGB value having the closest G component, a search for a color index is made in a small range in the color table information, and it is not necessary to traverse all the color table information, so that the complexity of training the local color table information can be lowered, thereby further improving the efficiency of encoding the picture file.

Figure 17:
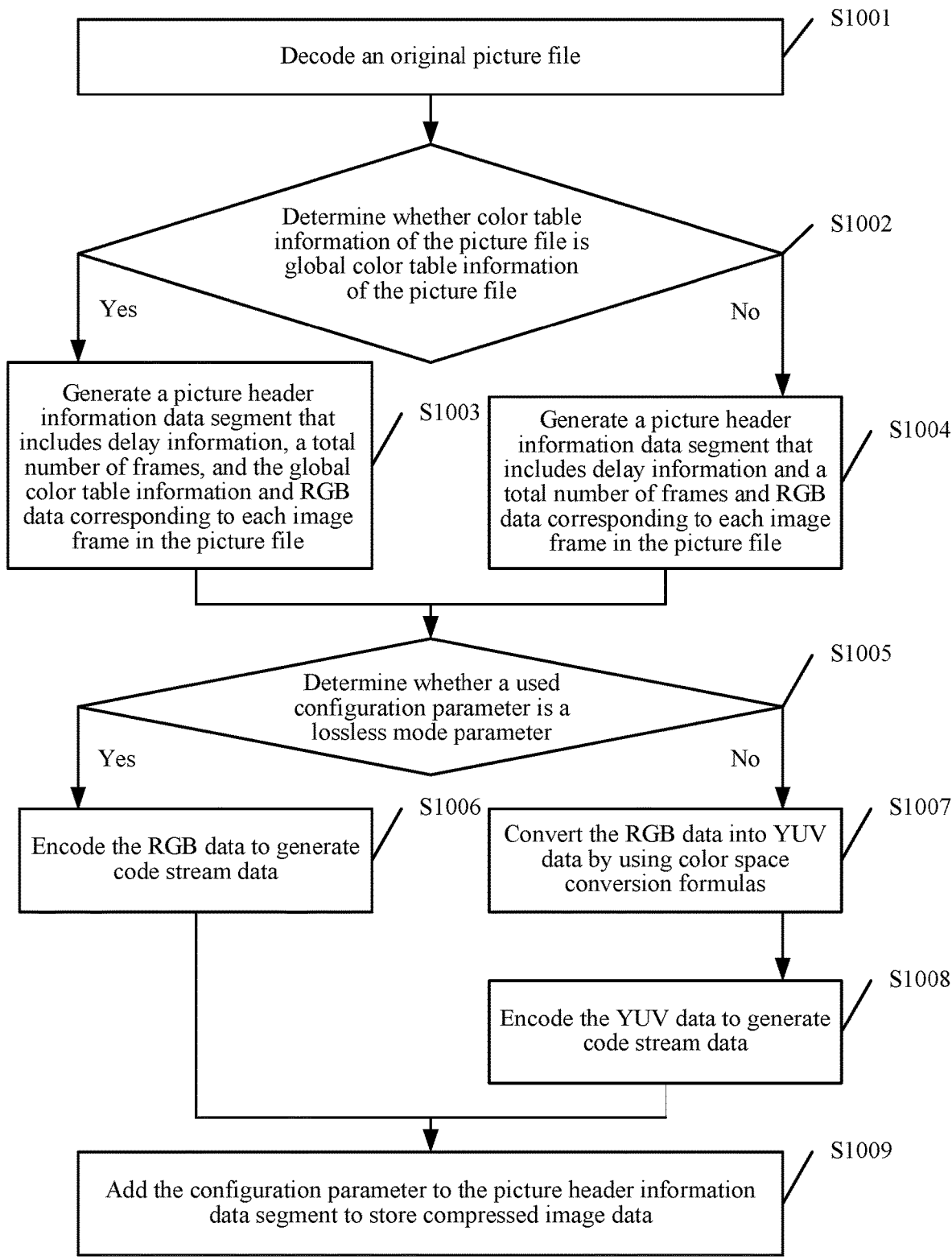
FIG. 17 is a schematic flowchart of still another picture file processing method according to an embodiment of the present application.

FIG. 17 is a schematic flowchart of still another picture file processing method according to an embodiment of the present application. As shown in FIG. 17, the picture file processing method provided in this embodiment of the present application is a further description of the embodiment shown in FIG. 15. The method includes the following steps S1001 to S1009.

S1001: Decode an original picture file.

S1002: Determine whether color table information of the picture file is global color table information of the picture file.

S1003: Generate a picture header information data segment that includes delay information, a total number of frames, and the global color table information and RGB data corresponding to each image frame in the picture file.

S1004: Generate a picture header information data segment that includes delay information and a total number of frames and RGB data corresponding to each image frame in the picture file.

S1005: Determine whether a used configuration parameter is a lossless mode parameter.

In some embodiments, a picture file processing device may acquire a user-defined information data segment. The user-defined information data segment may include the configuration parameter, an encoder complexity, and the like. The configuration parameter may be a parameter for encoding YUV data. The configuration parameter may include any one of a standard definition mode parameter, a high definition mode parameter, and a lossless mode parameter. The standard definition mode parameter (for example, a YUV420 mode parameter) may be selected when reduced bandwidth is required. The high definition mode parameter (for example, a YUV444 mode parameter) may be selected when image quality is required. It may be understood that the RGB data may be directly encoded to generate data stream if the acquired configuration parameter is a lossless mode parameter. The RGB data needs to be converted into the YUV data if the acquired configuration parameter is a standard definition mode parameter or a high definition mode parameter, and the YUV data is then encoded to generate the data stream. Further, the picture file processing device may determine whether the configuration parameter used in the user-defined information data segment is a lossless mode parameter. Step S1006 is performed if the used configuration parameter is a lossless mode parameter. Steps S1007 and S1008 are performed if the used configuration parameter is not a lossless mode parameter.

The encoder complexity may be an encoding fineness parameter determined according to hardware performance of the picture file processing device. The encoder complexity may include any one of a first complexity, a second complexity, and a third complexity. The first complexity is higher than the second complexity, and the second complexity is higher than the third complexity. For example, the hardware performance of the picture file processing device may be detected to generate a performance value. For example, a computational rate or the like of a CPU of the picture file processing device is tested. It may be determined that the picture file processing device has very high hardware performance when the performance value is in a first preset value range, and it may be recommended to use an encoding scheme with the first complexity. It may be determined that a picture file processing device has medium hardware performance when the performance value is in a second preset value range, and it may be recommended to use an encoding scheme with the second complexity. It may be determined that the picture file processing device has relatively poor hardware performance or currently real-time transcoding or the like is required when the performance value is in a third preset value range, and it may be recommended to use an encoding scheme with the third complexity.

It should be noted that the foregoing two encoding schemes may be parallel encoding schemes. To be specific, the picture file processing device may use both the configuration parameter and the configured encoder complexity to encode the YUV data to generate the data stream. The performance value, the first preset value range, the second preset value range, and the third preset value range may be specifically set according to the experience of a developer.

S1006: Encode the RGB data to generate data stream.

In some embodiments, the picture file processing device may encode the RGB data to generate the data stream if determining that the configuration parameter used in the user-defined information data segment is a lossless mode parameter. The encoding may include one or more of predictive coding, transform coding, quantization coding, and entropy coding. For example, the picture file processing device may compress the RGB data in IPPP mode. The first frame of the RGB data is an I frame. The I frame is an intra-frame prediction frame, and the remaining frames of the RGB data are P frames. The P frame is an inter-frame prediction frame. Therefore, an amount of file data of the picture file can be effectively reduced, and a constant QP mode can further be used to stabilize quality and the like of different frames. The entropy coding may include Huffman coding, arithmetic coding, and the like.

S1007: Convert the RGB data into YUV data by using color space conversion formulas.

In some embodiments, the picture file processing device may convert the RGB data into YUV data by using color space conversion formulas if determining that the configuration parameter used in the user-defined information data segment is a lossless mode parameter. During the conversion of the RGB data into the YUV data, color space conversion formulas in which a domain range of a luminance component is [16, 235] and a domain range of a chrominance component is [16, 240] may be selected. Because the ranges are reduced, the YUV data obtained after conversion can have a greatly reduced amount of data but has relatively severe distortion. Alternatively, color space conversion formulas in which domain ranges of both a luminance component and a chrominance component are [0, 255] may be selected. In this case, the YUV data obtained after conversion can have less severe distortion but has a relatively large amount of data, and the color space conversion formulas in which the domain ranges of both the luminance component and the chrominance component are [0, 255] are:

$$Y=0.299R+0.587G+0.114B;$$

$$U=-0.1687R-0.3313G+0.5B+128;\text{ and}$$

$$V=0.5R-0.4187G-0.0813B+128,\text{ where}$$

YUV is a video data format, Y is a luminance component, UV is a chrominance component, and raster-scan processing may be performed on pixels in each image frame by using the color space conversion formulas to convert each frame of the RGB data into corresponding YUV data.

S1008: Encode the YUV data to generate data stream.

In some embodiments, the picture file processing device may further encode the YUV data to generate the data stream. The encoding may include one or more of predictive coding, transform coding, quantization coding, and entropy coding. For example, the picture file processing device may compress the YUV data in IPPP mode. The first frame of the YUV data is an I frame. The I frame is an intra-frame prediction frame. The remaining frames of the YUV data are P frames. The P frame is an inter-frame prediction frame. Therefore, an amount of file data of the picture file can be effectively reduced, and a constant QP mode can further be used to stabilize quality and the like of different frames. The entropy coding may include Huffman coding, arithmetic coding, and the like.

S1009: Add the configuration parameter to the picture header information data segment to store compressed image data.

In some embodiments, the picture file processing device may add the configuration parameter to the picture header information data segment. Further, the picture file processing device may add the user-defined information data segment to the picture header information data segment. The picture file processing device may generate the compressed image data. The picture file processing device may store the compressed image data. The compressed image data includes the picture header information data segment and the data stream.

For steps S1001 to S1004 in this embodiment of the present application, refer to specific descriptions of steps S801 to S804 in the embodiment shown in FIG. 15. Details are not described herein.

In this embodiment of the present application, a picture header information data segment of an original picture file is generated according to the picture file, each image frame in the picture file is converted into YUV data, compressed image data is then generated based on the picture header information data segment and data stream that is obtained by encoding the YUV data, and the compressed image data is stored. Each image frame in the picture file having a relatively large amount of file data is converted into the YUV data having a relatively small amount of data, and the YUV data is then encoded to obtain the data stream, so that an amount of file data of the picture file during storage is greatly reduced, and storage costs are reduced. A user-defined configuration parameter is added, so that encoding processes for different definition may be implemented according to different configuration parameters, thereby improving user experience.

Figure 18:
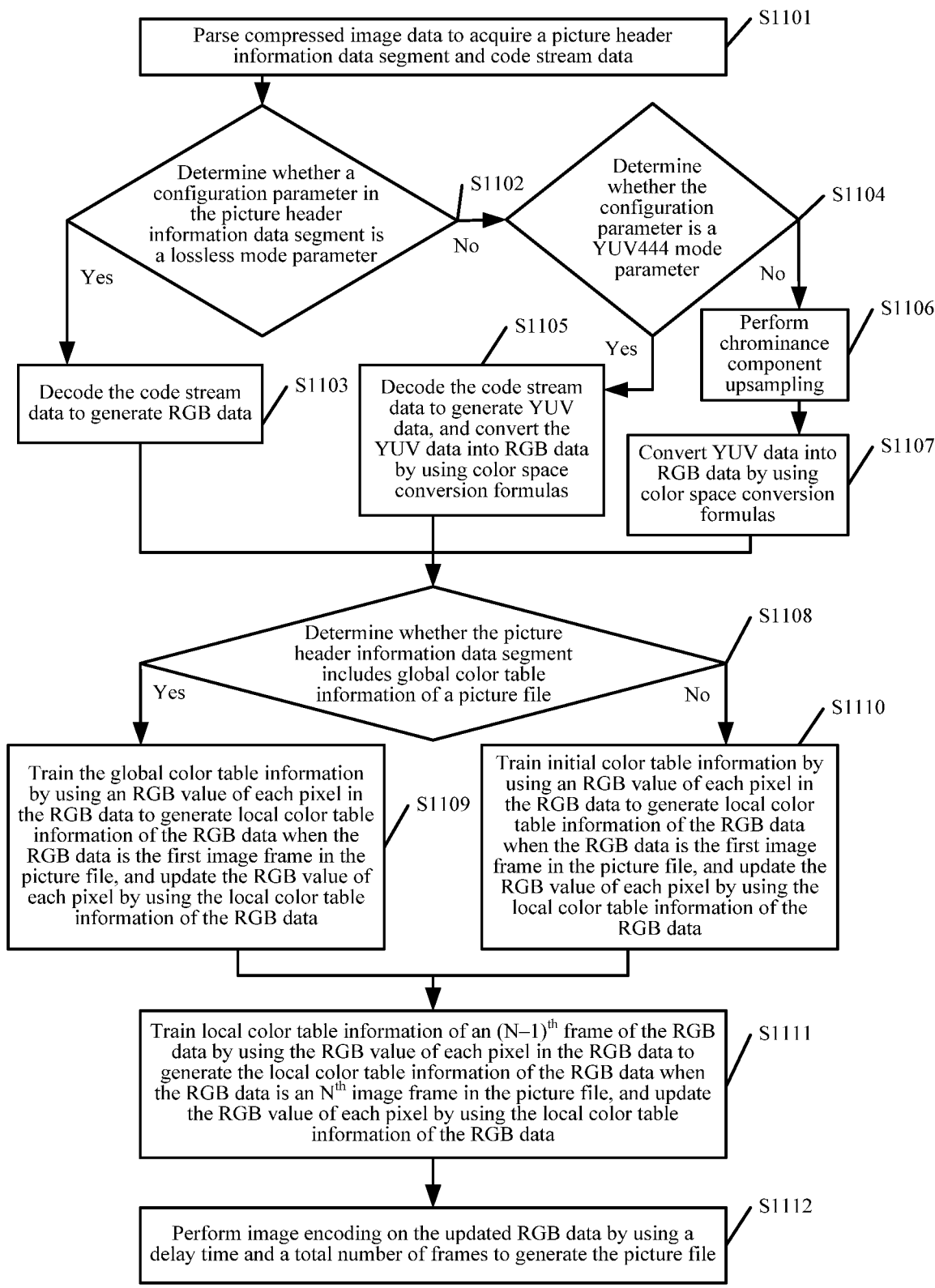
FIG. 18 is a schematic flowchart of still another picture file processing method according to an embodiment of the present application.

FIG. 18 is a schematic flowchart of still another picture file processing method according to an embodiment of the present application. As shown in FIG. 18, the picture file processing method provided in this embodiment of the present application is a further description of the embodiment shown in FIG. 16. The method includes the following steps S1101 to S1112.

S1101: Parse compressed image data to acquire a picture header information data segment and data stream.

In some embodiments, a picture file processing device may parse the compressed image data to acquire the picture header information data segment and the data stream in the compressed image data. It may be understood that the picture header information data segment may include delay information, a total number of frames, an image feature information data segment, and the like of a picture file. The delay information records a play interval between image frames in the picture file. The total number of frames is a quantity of image frames in the picture file. It may be understood that the image feature information data segment may further include global color table information of the picture file. The global color table information includes an RGB value of each pixel in each image frame. All images included in some picture files share the global color table information, and each image frame in some other picture files has respective local color table information. Therefore, the global color table information is acquired if the picture file has the global color table information, and the local color table information is not acquired if the picture file has only the local color table information.

In some embodiments, the picture header information data segment may further include a user-defined information data segment. The user-defined information data segment may include a configuration parameter, an encoder complexity, and the like. The configuration parameter may be a previous parameter for encoding YUV data. The configuration parameter may include any one of a standard definition mode parameter, a high definition mode parameter, and a lossless mode parameter. The encoder complexity may be an encoding fineness parameter determined according to hardware performance of a transmitter. The encoder complexity may include any one of a first complexity, a second complexity, and a third complexity. The first complexity is higher than the second complexity, and the second complexity is higher than the third complexity.

It should be noted that the performance value, the first preset value range, the second preset value range, and the third preset value range may be specifically set according to the experience of a developer.

S1102: Determine whether a configuration parameter in the picture header information data segment is a lossless mode parameter.

In some embodiments, the picture file processing device may determine whether the configuration parameter in the picture header information data segment is a lossless mode parameter. Step S1103 is performed if the configuration parameter in the picture header information data segment is a lossless mode parameter. Steps S1104 to S1107 are performed if the configuration parameter in the picture header information data segment is not a lossless mode parameter.

S1103: Decode the data stream to generate RGB data.

In some embodiments, if the configuration parameter in the picture header information data segment is a lossless mode parameter, because in a lossless mode, the RGB data is directly encoded to generate the data stream, the picture file processing device may decode the data stream directly to generate the RGB data.

S1104: Determine whether the configuration parameter is a YUV444 mode parameter.

In some embodiments, if the configuration parameter in the picture header information data segment is not a lossless mode parameter, to be specific, the configuration parameter in the picture header information data segment is a standard definition mode parameter or a high definition mode parameter, it may be understood that in some embodiments, the standard definition mode parameter is a YUV420 mode parameter, and the high definition mode parameter is a YUV444 mode parameter. The picture file processing device may further determine whether the configuration parameter is the YUV444 mode parameter. Step S1105 is performed if the configuration parameter is the YUV444 mode parameter. Steps S1106 and S1107 are performed if the configuration parameter is not the YUV444 mode parameter.

S1105: Decode the data stream to generate YUV data, and convert the YUV data into RGB data by using color space conversion formulas.

In some embodiments, if the picture file processing device determines that the configuration parameter is the YUV444 mode parameter, to be specific, during encoding of the YUV data, the luminance component and chrominance component of each pixel in the YUV data are completely kept. Therefore, the picture file processing device decodes the data stream directly to generate the YUV data. It should be noted that the chrominance includes a sample matrix of either of two color difference signals Cb and Cr or a single sample in the sample matrix. Upsampling processing needs to be separately performed on the two color difference signals in a same manner. Cb corresponds to U in YUV, and Cr corresponds to V in YUV. The YUV data includes a Y image, a Cb image, and a Cr image. The picture file processing device converts the YUV data into the RGB data by using the color space conversion formulas. It may be understood that for YUV data in a YUV444 mode, color space conversion formulas in which a domain range of a luminance component is [16, 235] and a domain range of a chrominance component is [16, 240] may be selected, or color space conversion formulas in which domain ranges of both a luminance component and a chrominance component are [0, 255] may be selected. Specifically, the selected color space conversion formulas may correspond to the color space conversion formulas selected to convert the RGB data into the YUV data in the foregoing embodiments.

If the domain range of the luminance component is [16, 235] and the domain range of the chrominance component is [16, 240], the color space conversion formulas are:

$R=\text{Clip3}(0,255,(298*Y+409*(Cr-128)+128)>>8);$ $G=\text{Clip3}(0,255,(298*Y-100*(Cb-128)+208*(Cr-128)+128)>>8);$ and $B=\text{Clip3}(0,255,(298*Y+516*(Cb-128)+128)>>8),$ where "+128" is used for rounding the value of R, the value of B, and the value of G, and ">>8" represents division by the eighth power of 2.

If the domain ranges of the luminance component and the chrominance component are both [0, 255], the color space conversion formulas are:

$R=\text{Clip3}(0,255,Y+(359*(Cr-128)+128)>>8;$ $G=\text{Clip3}(0,255,Y-(88*(Cb-128)+183*(Cr-128)+128)>>8);$ and $B=\text{Clip3}(0,255,Y+(454*(Cb-128)+128)>>8),$ where "+128" is used for rounding the value of R, the value of B, and the value of G, and ">>8" represents division by the eighth power of 2.

Raster-scan processing may be performed on pixels in each image frame by using the color space conversion formulas to convert each frame of the YUV data into corresponding RGB data.

S1106: Perform chrominance component upsampling processing.

In some embodiments, if the picture file processing device determines that the configuration parameter is not the YUV444 mode parameter, to be specific, during encoding of the YUV data, only the luminance component of each pixel in the YUV data is kept, but the chrominance component of each pixel in the YUV data is compressed, for example, in a process of encoding the YUV data by using the YUV420 mode parameter, the chrominance components of four vertically and horizontally adjacent pixels in the YUV data may be compressed into one chrominance component. Therefore, the picture file processing device needs to decode the data stream to generate the YUV data, and chrominance component upsampling processing is performed on the YUV data. To be specific, the chrominance component upsampling processing is to restore the chrominance components of four pixels from one chrominance component. It should be noted that the chrominance includes a sample matrix of either of two color difference signals Cb and Cr or a single sample in the sample matrix. Upsampling processing needs to be separately performed on the two color difference signals in a same manner. Cb corresponds to U in YUV, and Cr corresponds to V in YUV, The YUV data includes a Y image, a Cb image, and a Cr image. A description is provided below with reference to a Cb image in the YUV420 mode.

Figure 19:
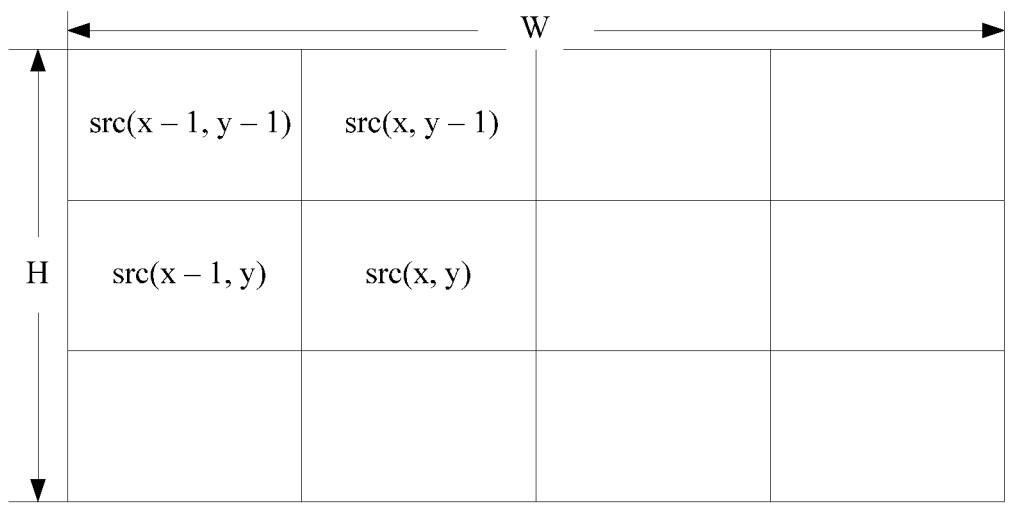
FIG. 19 is a schematic diagram of an example of original chrominance components in a YUV420 mode according to an embodiment of the present application.
Figure 20:
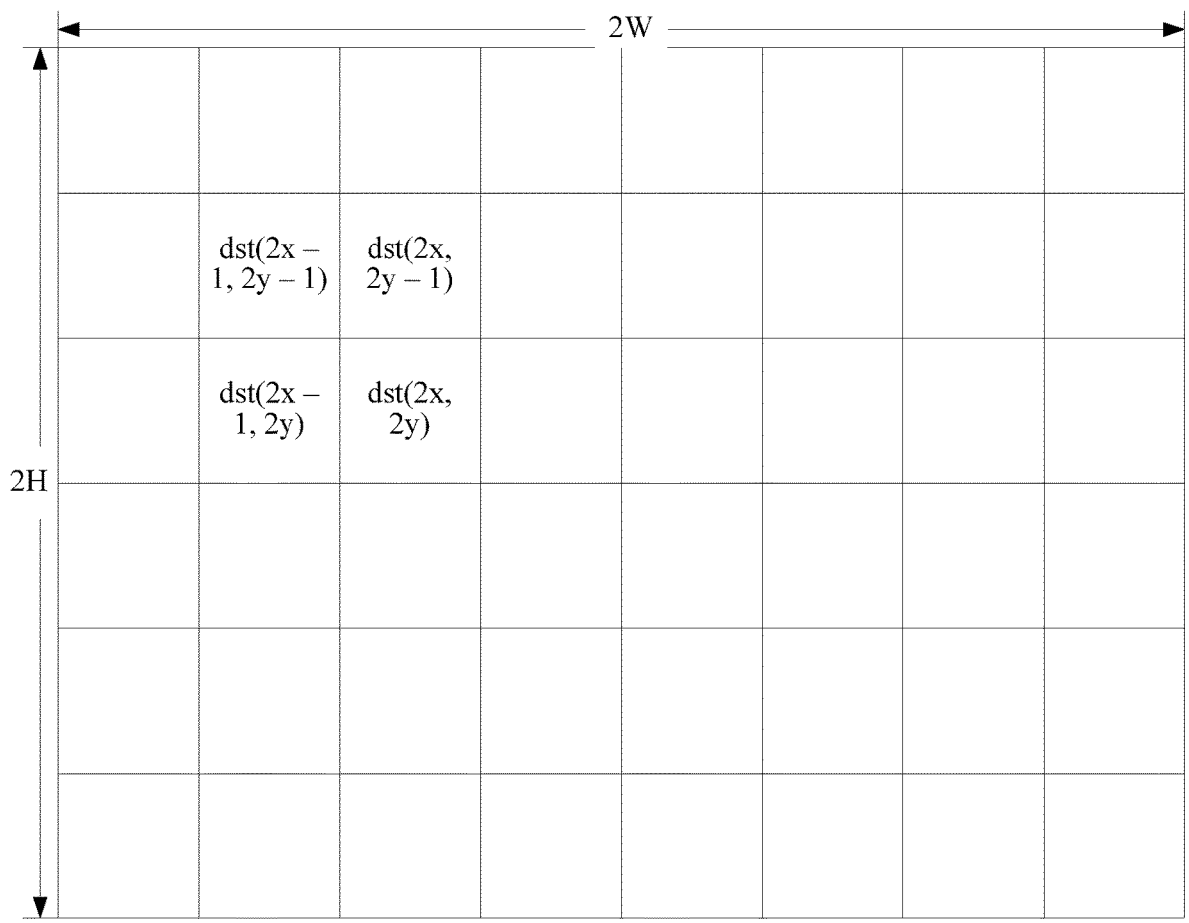
FIG. 20 is a schematic diagram of an example of target chrominance components in a YUV420 mode according to an embodiment of the present application.

Referring together to FIG. 19 and FIG. 20, FIG. 19 shows a compressed Cb image, to be specific, a source Cb image, including (H*K) pixels. Because the configuration parameter is a YUV420 mode parameter, an upsampling algorithm needs to be used to restore a target Cb image including (2H*2K) pixels shown in FIG. 20 from the source Cb image including the (H*K) pixels, where src(x, y) represents a pixel in the source Cb image, and dst(x, y) represents a pixel in the target Cb image. The upsampling algorithm may include:

(1) If dst(x, y) is a non-boundary pixel in the target Cb image, each upsampled Cb value of the non-boundary pixel is determined together by Cb values of four adjacent pixels at corresponding positions in the source Cb image. A specific calculation rule is as follows:

$dst(2x,2y)=\text{Clip3}(0,255,(src(x-1,y-1)+3*src(x,y-1)+3*src(x-1,y)+9*src(x,y)+8)>>4);$ $dst(2x-1,2y)=\text{Clip3}(0,255,(3*src(x-1,y-1)+src(x,y-1)+9*src(x-1,y)+3*src(x,y)+8)>>4);$ $dst(2x,2y-1)=\text{Clip3}(0,255,(3*src(x-1,y-1)+9*src(x,y-1)+src(x-1,y)+3*src(x,y)+8)>>4);$ and $dst(2x-1,2y-1)=\text{Clip3}(0,255,(9*src(x-1,y-1)+3*src(x,y-1)+3*src(x-1,y)+src(x,y)+8)>>4),$ where $0<x<W, 0<y<H$, "+8" is used for rounding a Cb value, and ">>4" is used for eliminating weighting values (1+3+3+9) in the formulas, to be specific, represents division by the fourth power of 2.

(2) If dst(x, y) is a corner point in the target Cb image, the Cb value of the corner point in the target Cb image is determined by a Cb value of a corner point in the source Cb image. A specific calculation rule is as follows:

$dst(0,0)=src(0,0);$ $dst(0,2H-1)=src(0,H-1);$ $dst(2W-1,0)=src(W-1,0)$; and $dst(2W-1,2H-1)=src(W-1,H-1)$.

(3) If dst(x, y) is a pixel other than the corner points in the first row and the last row in the target Cb image, the Cb value of the pixel other than the corner points in the first row and the last row in the target Cb image is determined by Cb values of two horizontally adjacent pixels in the first row and the last row in the source Cb image. A specific calculation rule is as follows:

$dst(2x,0)=\text{Clip3}(0,255,(src(x-1,0)+3*src(x,0)+2)>>2)$;

$dst(2x-1,0)=\text{Clip3}(0,255,(3*src(x-1,0)+src(x,0)+2)>>2)$;

$dst(2x,2H-1)=\text{Clip3}(0,255,(src(x-1,2H-1)+3*src(x,2H-1)+2)>>2)$; and $dst(2x-1,2H-1)=\text{Clip3}(0,255,(3*src(x-1,2H-1)+src(x,2H-1)>>2)>>2\}$, where $0<x<W$, "+2" is used for rounding a Cb value, and ">>2" is used for eliminating weighting values (1+3) in the formulas, to be specific, represents division by the second power of 2.

(4) If dst(x, y) is a pixel other than the corner points in the first column and the last column in the target Cb image, the Cb value of the pixel other than the corner points in the first column and the last column in the target Cb image is determined by Cb values of two vertically adjacent pixels in the first column and the last column in the source Cb image. A specific calculation rule is as follows:

$dst(0,2y-1)=\text{Clip3}(0,255,(src(0,y-1)+3*src(0,y)+2)>>2)$;

$dst(0,2y)=\text{Clip3}(0,255,(3*src(0,y)+src(0,y-1)+2)>>2)$;

$dst(2W-1,2y-1)=\text{Clip3}(0,255,(src(2W-1,y-1)+3*src(2W-1,y)+2)>>2)$; and $dst(2W-1,2y)=\text{Clip3}(0,255,(3*src(2W-1,y)+src(2W-1,y-1)+2)>>2)$, where $0<y<H$, "+2" is used for rounding a Cb value, and ">>2" is used for eliminating weighting values (1+3) in the formulas, to be specific, represents division by the second power of 2.

The Cb values of all pixels in the target Cb image can be obtained by using the foregoing calculation rule. It may be understood that the weighting values in the foregoing formulas may be determined according to empirical values. Similarly, the foregoing calculation rule may be used to obtain Cr values of all pixels in a target Cr image. In this way, a processing process of the chrominance component upsampling processing is completed.

S1107: Convert YUV data into RGB data by using color space conversion formulas.

In some embodiments, the picture file processing device may convert the YUV data into the RGB data by using the color space conversion formulas. Further, the picture file processing device needs to determine used color space conversion formulas according to a domain range of a luminance component. It may be understood that for YUV data in a YUV444 mode, color space conversion formulas in which a domain range of a luminance component is [16, 235] and a domain range of a chrominance component is [16, 240] may be selected, or color space conversion formulas in which domain ranges of both a luminance component and a chrominance component are [0, 255] may be selected. Specifically, the selected color space conversion formulas may correspond to the color space conversion formulas selected to convert the RGB data into the YUV data in the foregoing embodiments.

If the domain range of the luminance component is [16, 235] and the domain range of the chrominance component is [16, 240], the color space conversion formulas are:

$R=\text{Clip3}(0,255,(298*Y+409*(Cr-128)+128)>>8)$;

$G=\text{Clip3}(0,255,(298*Y-100*(Cb-128)+208*(Cr-128)+128)>>8)$; and $B=\text{Clip3}(0,255,(298*Y+516*(Cb-128)+128)>>8)$, where "+128" is used for rounding the value of R, the value of B, and the value of G, and ">>8" represents division by the eighth power of 2.

If the domain ranges of the luminance component and the chrominance component are both [0, 255], the color space conversion formulas are:

$R=\text{Clip3}(0,255,Y+(359*(Cr-128)+128)>>8)$;

$G=\text{Clip3}(0,255,Y-(88*(Cb-128)+183*(Cr-128)+128)>>8)$; and $B=\text{Clip3}(0,255,Y+(454*(Cb-128)+128)>>8)$, where "+128" is used for rounding the value of R, the value of B, and the value of G, and ">>8" represents division by the eighth power of 2.

Raster-scan processing may be performed on pixels in each image frame by using the color space conversion formulas to convert each frame of the YUV data into corresponding RGB data.

S1108: Determine whether the picture header information data segment includes global color table information of a picture file.

S1109: Train the global color table information by using an RGB value of each pixel in the RGB data to generate local color table information of the RGB data when the RGB data is the first image frame in the picture file, and update the RGB value of each pixel by using the local color table information of the RGB data.

S1110: Train initial color table information by using an RGB value of each pixel in the RGB data to generate local color table information of the RGB data when the RGB data is the first image frame in the picture file, and update the RGB value of each pixel by using the local color table information of the RGB data.

S1111: Train local color table information of an $(N-1)^{th}$ frame of the RGB data by using the RGB value of each pixel in the RGB data to generate the local color table information of the RGB data when the RGB data is an $N^{th}$ image frame in the picture file, and update the RGB value of each pixel by using the local color table information of the RGB data.

S1112: Perform image encoding on the updated RGB data by using a delay information and a total number of frames to generate the picture file.

For steps S1108 to S1112 in this embodiment of the present application, refer to specific descriptions of steps S903 to S907 in the embodiment shown in FIG. 16. Details are not described herein.

In this embodiment of the present application, a picture header information data segment of an original picture file is generated according to the picture file, each image frame in the picture file is converted into YUV data, compressed image data is then generated based on the picture header information data segment and data stream that is obtained by encoding the YUV data, and the compressed image data is transmitted. The YUV data may be generated according to the data stream when the compressed image data is received, and the YUV data is then processed based on the picture header information data segment to generate the picture file. Each image frame in the picture file having a relatively large amount of file data is converted into the YUV data having a relatively small amount of data, and the YUV data is then encoded to obtain the data stream, so that an amount of file data of the picture file during transmission is greatly reduced, and bandwidth costs are reduced. The use of a configuration parameter is flexibly controlled, and an encoder complexity is configured, so that different service scenarios and different machine performance can be satisfied, and the efficiency of encoding the picture file is optimized. Global color table information or initial color table information is trained to generate local color table information of the RGB data, so that image distortion is effectively reduced. The G component is used to acquire a source RGB value having the closest G component, a search for a color index is made in a small range in the color table information, and it is not necessary to traverse all the color table information, so that the complexity of training the local color table information can be lowered, thereby further improving the efficiency of encoding the picture file.

Figure 21:
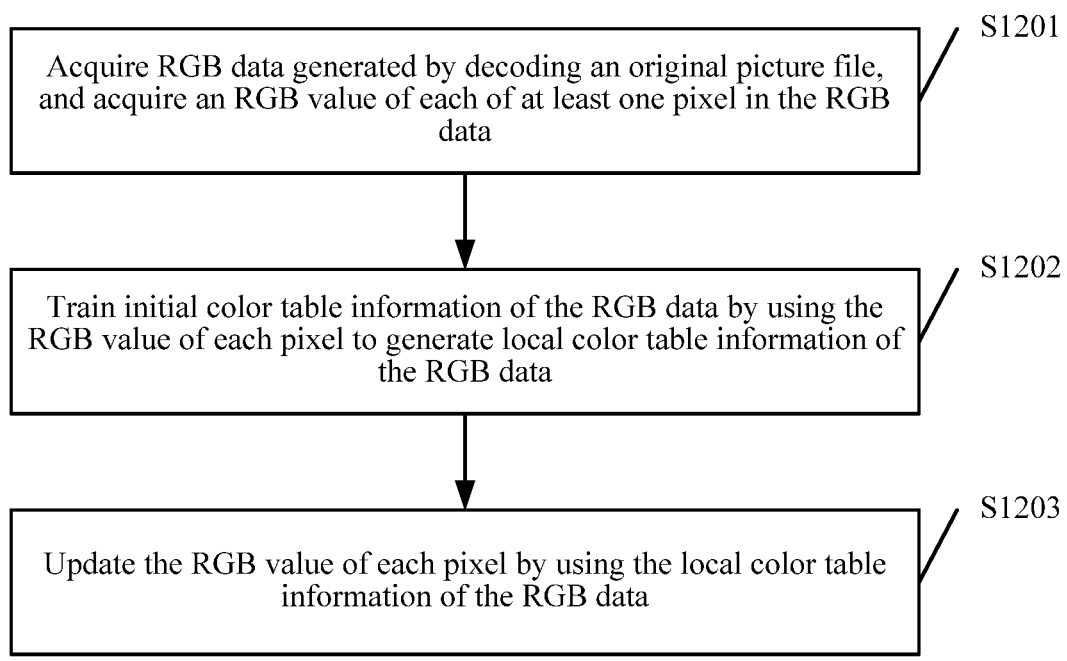
FIG. 21 is a schematic flowchart of still another picture file processing method according to an embodiment of the present application.

FIG. 21 is a schematic flowchart of still another picture file processing method according to an embodiment of the present application. As shown in FIG. 21, processes of training color table information and updating an RGB value of a pixel are described in detail in this embodiment of the present application. The method may include the following steps S1201 to S1203.

S1201: Acquire RGB data generated by decoding an original picture file, and acquire an RGB value of each pixel in the RGB data.

In some embodiments, a picture file processing device may acquire the RGB data generated by decoding the original picture file. It may be understood that the picture file may be decoded to generate a picture header information data segment of the picture file and the RGB data corresponding to each image frame in the picture file. The picture header information data segment may include delay information, a total number of frames, and the like of the picture file. The delay information records a play interval between image frames in the picture file. The total number of frames is a quantity of image frames in the picture file. It may be understood that the picture header information data segment may further include global color table information of the picture file. The global color table information includes the RGB value of each pixel in each image frame. All images included in some picture files share the global color table information, and each image frame in some other picture files has respective local color table information. Therefore, the global color table information is acquired if the picture file has the global color table information, and the local color table information is not acquired if the picture file has only the local color table information. The RGB data may be converted into YUV data, and the YUV data is encoded to generate data stream. Compressed image data that includes the data stream and the picture header information data segment is further generated. The compressed image data may be stored or transmitted to the picture file processing device to restore the picture file. In some embodiments, the picture file processing device acquires the compressed image data, and may parse the compressed image data to acquire the picture header information data segment and the data stream, and decode the data stream to generate the YUV data. The picture file processing device further converts the YUV data into the RGB data. The picture file processing device acquires the RGB data, and acquires the RGB value of each pixel in the RGB data.

S1202: Train initial color table information of the RGB data by using the RGB value of each pixel to generate local color table information of the RGB data.

In some embodiments, the picture file processing device may determine whether the picture header information data segment includes the global color table information of the picture file. The picture file processing device determines the global color table information as initial color table information of the first frame of the RGB data in the picture file if the picture header information data segment includes the global color table information of the picture file. The picture file processing device generates the initial color table information if the picture header information data segment does not include the global color table information of the picture file, and determines the initial color table information as the initial color table information of the first frame of the RGB data in the picture file. The initial color table information is trained by using the RGB value of each pixel in the first frame of the RGB data to generate the local color table information of the first frame of the RGB data. For an $N^{th}$ frame of the RGB data, the local color table information of an $(N-1)^{th}$ frame of the RGB data may be used as the initial color table information of the $N^{th}$ frame of the RGB data, and the initial color table information of the $N^{th}$ frame of the RGB data is trained by using the RGB value of each pixel in the $N^{th}$ frame of the RGB data to generate the local color table information of the $N^{th}$ frame of the RGB data, where N is a positive integer greater than 1.

S1203: Update the RGB value of each pixel by using the local color table information of the RGB data.

In some embodiments, the picture file processing device may update the RGB value of each pixel by using the local color table information of the RGB data, the picture file processing device performs image encoding on the updated RGB data by using the delay information and the total number of frames to generate the picture file.

In this embodiment of the present application, global color table information or initial color table information is trained to generate local color table information of RGB data, so that image distortion is effectively reduced.

Figure 22:
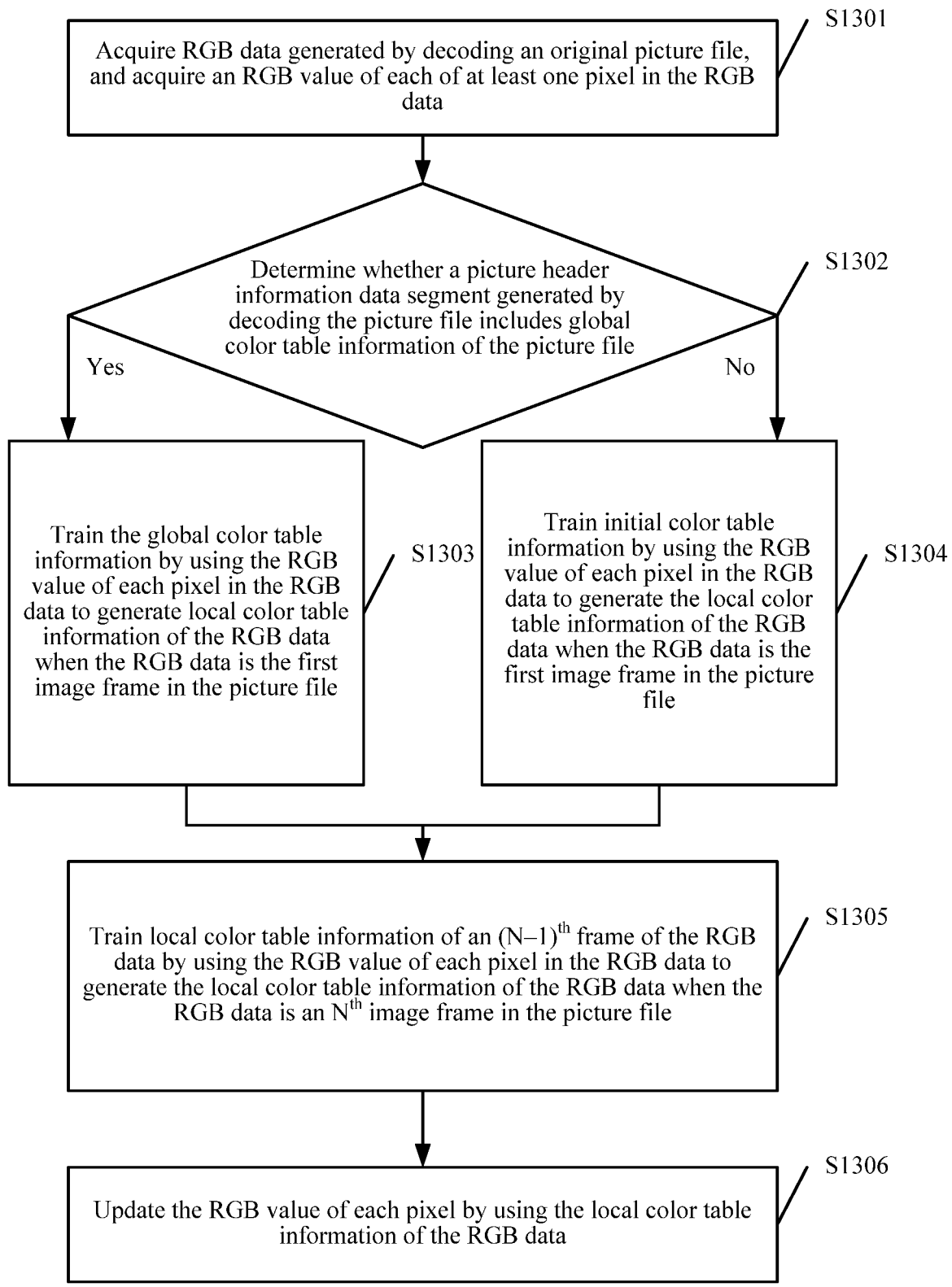
FIG. 22 is a schematic flowchart of still another picture file processing method according to an embodiment of the present application.

FIG. 22 is a schematic flowchart of still another picture file processing method according to an embodiment of the present application. As shown in FIG. 22, processes of training color table information and updating an RGB value of a pixel are described in detail in this embodiment of the present application. The method may include the following steps S1301 to S1306.

S1301: Acquire RGB data generated by decoding an original picture file, and acquire an RGB value of each pixel in the RGB data.

In some embodiments, a picture file processing device may acquire the RGB data generated by decoding the original picture file. It may be understood that the picture file may be decoded to generate a picture header information data segment of the picture file and the RGB data corresponding to each image frame in the picture file. The picture header information data segment may include delay information, a total number of frames, and the like of the picture file. The delay information records a play interval between image frames in the picture file. The total number of frames is a quantity of image frames in the picture file. It may be understood that the picture header information data segment may further include global color table information of the picture file. The global color table information includes the RGB value of each pixel in each image frame. All images included in some picture files share the global color table information, and each image frame in some other picture files has respective local color table information. Therefore, the global color table information is acquired if the picture file has the global color table information, and the local color table information is not acquired if the picture file has only the local color table information. The RGB data may be converted into YUV data, and the YUV data is encoded to generate data stream. Compressed image data that includes the data stream and the picture header information data segment is further generated. The compressed image data may be stored or transmitted to the picture file processing device to restore the picture file. In some embodiments, the picture file processing device acquires the compressed image data, and may parse the compressed image data to acquire the picture header information data segment and the data stream, and decode the data stream to generate the YUV data. The YUV data is further converted into the RGB data. The picture file processing device acquires the RGB data, and acquires the RGB value of each pixel in the RGB data.

S1302: Determine whether a picture header information data segment generated by decoding the picture file includes global color table information of the picture file.

In some embodiments, the picture file processing device determines whether the picture header information data segment includes the global color table information of the picture file. Step S1103 is performed if the picture header information data segment includes the global color table information of the picture file. Step 1104 is performed if the picture header information data segment does not include the global color table information of the picture file.

Because the YUV data is encoded previously, the RGB data obtained by converting the YUV data is distorted, and the picture file processing device may update the RGB value of each pixel in the RGB data by using the global color table information. It may be understood that the RGB data may include one or more pixels. When the RGB data has only one pixel, the RGB value of the pixel may be updated by using the global color table information. When the RGB data has a plurality of pixels, the RGB value of each of the plurality of pixels may be updated by using the global color table information. The picture file processing device needs to train the global color table information again to generate local color table information that meets the RGB data. The picture file processing device may generate initial color table information if there is no global color table information, and train the initial color table information to generate the local color table information that meets the RGB data.

S1303: Train the global color table information by using the RGB value of each pixel in the RGB data to generate local color table information of the RGB data when the RGB data is the first image frame in the picture file.

In some embodiments, in a first implementation, the picture file processing device may train the global color table information by using the RGB value of each pixel in the RGB data to generate the local color table information of the RGB data when the RGB data is the first image frame in the picture file and the picture header information data segment has the global color table information.

Further, the picture file processing device may sort at least one source RGB value in the global color table information in a preset sorting manner (for example, ascending order or descending order) of the G component to generate trained color table information when the RGB data is the first image frame in the picture file and the picture header information data segment has the global color table information. Referring together to FIG. 3, as shown in FIG. 3, the global color table information includes a color index and a source RGB value, for example: 5, (8, 1, 10); 6, (8, 9, 8); 7, (1, 7, 6); 8, (10, 8, 6); 9, (5, 8, 5); 10, (9, 10, 1). The trained color table information may be generated through sorting in ascending order of the G component, for example: 5, (8, 1, 10); 6, (1, 7, 6); 7, (5, 8, 5); 8, (10, 8, 6); 9, (8, 9, 8); 10, (9, 10, 1).

The picture file processing device acquires, from the trained color table information, a first source RGB value in which the G component is closest to the G component of a current pixel in the RGB data, and acquires a first color index of the first source RGB value. It may be understood that the picture file processing device may traverse source RGB values in the trained color table information by using the G component of the current pixel to acquire the first source RGB value having the closest G component. Referring together to FIG. 4, it is assumed that the first frame of the RGB data has four pixels, the current pixel is the first pixel in the RGB data, and an RGB value of the current pixel is (9, 9, 9). It may be found from the trained color table information that the G component in (8, 9, 8) is closest to the G component in the RGB value of the current pixel. (8, 9, 8) is determined as the first source RGB value, and it is acquired that a first color index of the first source RGB value is "9".

The picture file processing device acquires, from the trained color table information in a preset range with the first color index being the center, a second source RGB value having the smallest difference from the RGB value of the current pixel, and acquires a second color index of the second source RGB value. It may be understood that the picture file processing device may acquire a plurality of source RGB values in the preset range with the first color index being the center, calculate respectively differences of the first source RGB value and the plurality of source RGB values from the RGB value of the current pixel, and determine one of the plurality of source RGB values that has the smallest difference as the second source RGB value. According to the foregoing example, it is assumed that the preset range is a range of the center minus 1 to the center plus 1. "9" is the center, two source RGB values (10, 8, 6) and (9, 10, 1) are acquired, and difference values of (10, 8, 6), (8, 9, 8), and (9, 10, 1) from (9, 9, 9) are calculated respectively. A difference value of the source RGB value with the color index being "8" is |9−10|+|9−8|+|9−6|=5, a difference value of the source RGB value with the color index being "9" is |9−8|+|9−9|+|9−8|=2, and a difference value of the source RGB value with the color index being "10" is |9−9|+|9−10|+|9−1|=9. It is determined that the source RGB value (8, 9, 8) is the second source RGB value, and it is acquired that a second color index of the second source RGB value is "9". It may be understood that the first source RGB value and the first color index acquired in the foregoing may be respectively the same as or different from the second source RGB value and the second color index, depending specifically on an actual execution process.

The picture file processing device replaces the second source RGB value with the RGB value of the current pixel, and changes the plurality of source RGB values in a preset range with the second color index being the center in the trained color table information by using a preset weight value and the RGB value of the current pixel. Referring together to FIG. 5, according to the foregoing example, the second source RGB value is (8, 9, 8), and (8, 9, 8) is replaced with the RGB value (9, 9, 9) of the current pixel. In addition, the plurality of source RGB values in the preset range with the second color index being the center may be changed according to the preset weight value and the RGB value of the current pixel. Assuming that the preset range is a range of the center minus 1 to the center plus 1, two source RGB values (10, 8, 6) and (9, 10, 1) need to be changed. The preset weight value may be a dynamic weight value. A source RGB value whose color index is closer to the second color index is affected more significantly by the RGB value of the current pixel. It is assumed that the current distribution of weight values is 2:8. (10, 8, 6) is changed by using (9, 9, 9), for example, the R component=9*0.8+10*0.2=9.2, the G component=9*0.8+8*0.2=8.8, and the B component=9*0.8+6*0.2=8.4. The foregoing results are rounded, so that it is determined that the source RGB value with the color index "8" is changed from (10, 8, 6) into (9, 9, 8). Similarly, the source RGB value with the color index "10" is changed from (9, 10, 1) into (9, 9, 7).

The picture file processing device acquires the changed trained color table information when the current pixel is not the last pixel in the RGB data, for example, when the current pixel is the first pixel in the RGB data shown in FIG. 4 or FIG. 5, uses a next pixel of the current pixel as a current pixel, and starts to acquire, from the trained color table information, a first source RGB value in which the G component is closest to the G component of a current pixel in the RGB data. For example, the second pixel in the RGB data is used as the current pixel, and the changed trained color table information is then trained again. For a specific training process, refer to the foregoing description of the training process. Details are not described herein.

The picture file processing device acquires the changed trained color table information when the current pixel is the last pixel in the RGB data, for example, when the current pixel is the fourth pixel in the RGB data shown in FIG. 4 or FIG. 5, and determines the trained color table information as the local color table information of the RGB data.

S1304: Train initial color table information by using the RGB value of each pixel in the RGB data to generate the local color table information of the RGB data when the RGB data is the first image frame in the picture file.

Specifically, in a second implementation, the picture file processing device may train the initial color table information by using the RGB value of each pixel in the RGB data to generate the local color table information of the RGB data when the RGB data is the first image frame in the picture file and the picture header information data segment does not have the global color table information.

Further, the picture file processing device may generate one piece of initial color table information, for example, (0, 0, 0), (1, 1, 1), (2, 2, 2), . . . , and (255, 255, 255), when the RGB data is the first image frame in the picture file and the picture header information data segment does not have the global color table information. The picture file processing device acquires, from the initial color table information, a third source RGB value in which the G component is closest to the G component of the current pixel in the RGB data, and acquires a third color index of the third source RGB value. The picture file processing device acquires, from the initial color table information in a preset range with the third color index being the center, a fourth source RGB value having the smallest difference from the RGB value of the current pixel, and acquires a fourth color index of the fourth source RGB value. The picture file processing device replaces the fourth source RGB value with the RGB value of the current pixel, and changes the plurality of source RGB values in a preset range with the fourth color index being the center in the initial color table information by using a preset weight value and the RGB value of the current pixel. The picture file processing device acquires the changed initial color table information when the current pixel is not the last pixel in the RGB data, uses a next pixel of the current pixel as a current pixel, and starts to acquire, from the initial color table information, the third source RGB value in which the G component is closest to the G component of the current pixel in the RGB data. The picture file processing device acquires changed trained color table information when the current pixel is the last pixel in the RGB data, and determines the initial color table information as the local color table information of the RGB data. It should be noted that for the process of training the initial color table information in the second implementation, refer to the foregoing execution process in the first implementation. Details are not described herein.

S1305: Train local color table information of an $(N-1)^{th}$ frame of the RGB data by using the RGB value of each pixel in the RGB data to generate the local color table information of the RGB data when the RGB data is an $N^{th}$ image frame in the picture file.

In some embodiments, in a third implementation, if the RGB data is not the first image frame in the picture file, to be specific, the RGB data is the $N^{th}$ image frame in the picture file, where N is a positive integer greater than 1 and less than or equal to the total number of frames, the picture file processing device may train the local color table information of the $(N-1)^{th}$ frame of the RGB data by using the RGB value of each pixel in the RGB data to generate the local color table information of the RGB data.

Further, the picture file processing device may sort at least one source RGB value in the local color table information of the $(N-1)^{th}$ frame of the RGB data in a preset sorting manner of the G component to generate trained color table information when the RGB data is the $N^{th}$ image frame in the picture file. The picture file processing device acquires, from the trained color table information, a fifth source RGB value in which the G component is closest to the G component of the current pixel in the RGB data, and acquires a fifth color index of the fifth source RGB value. The picture file processing device acquires, from the trained color table information in a preset range with the fifth color index being the center, a sixth source RGB value having the smallest difference from the RGB value of the current pixel, and acquires a sixth color index of the sixth source RGB value. The picture file processing device replaces the sixth source RGB value with the RGB value of the current pixel, and changes the plurality of source RGB values in a preset range with the sixth color index being the center in the trained color table information by using a preset weight value and the RGB value of the current pixel. The picture file processing device acquires the changed trained color table information when the current pixel is not the last pixel in the RGB data, uses a next pixel of the current pixel as a current pixel, and starts to acquire, from the trained color table information, the fifth source RGB value in which the G component is closest to the G component of the current pixel in the RGB data. The picture file processing device acquires the changed trained color table information when the current pixel is the last pixel in the RGB data, and determines the trained color table information as the local color table information of the RGB data. It should be noted that for the training of the trained color table information in the third implementation, refer to the foregoing execution process in the first implementation. Details are not described herein.

It should be noted that the foregoing use of the G component as a guide for training of the color table information is merely an example. In this embodiment of the present application, the R component or the B component may be similarly used to guide the training of the color table information. For an execution process, refer to the description in the foregoing content. Details are not described herein. The first source RGB value, the second source RGB value, the third source RGB value, the fourth source RGB value, the fifth source RGB value, and the sixth source RGB value may represent the same meaning of a source RGB value, and the first color index, the second color index, the third color index, the fourth color index, the fifth color index, and the sixth color index may represent the same meaning of a color index. Such a naming manner is merely used to distinguish between different execution scenarios, for example, the foregoing three execution scenarios in which the RGB data is the first image frame in the picture file and the picture header information data segment has the global color table information, the RGB data is the first image frame in the picture file and the picture header information data segment does not have the global color table information, and the RGB data is the $N^{th}$ image frame in the picture file.

S1306: Update the RGB value of each pixel by using the local color table information of the RGB data.

In some embodiments, the picture file processing device may update the RGB value of each pixel in the RGB data by using the local color table information of the RGB data. The picture file processing device performs image encoding on the updated RGB data by using the delay information and the total number of frames to generate the picture file. It may be understood that a scheme of the image encoding is specifically determined by an image format of the picture file. For example, the image encoding may be GIF encoding or the like if the picture file that needs to be generated is a GIF image.

In this embodiment of the present application, global color table information or initial color table information is trained to generate local color table information of RGB data, so that image distortion is effectively reduced. A G component is used to acquire a source RGB value having the closest G component, a search for a color index is made in a small range in the color table information, and it is not necessary to traverse all the color table information, so that the complexity of training the local color table information can be lowered, thereby further improving the efficiency of encoding the picture file.

Figure 23:
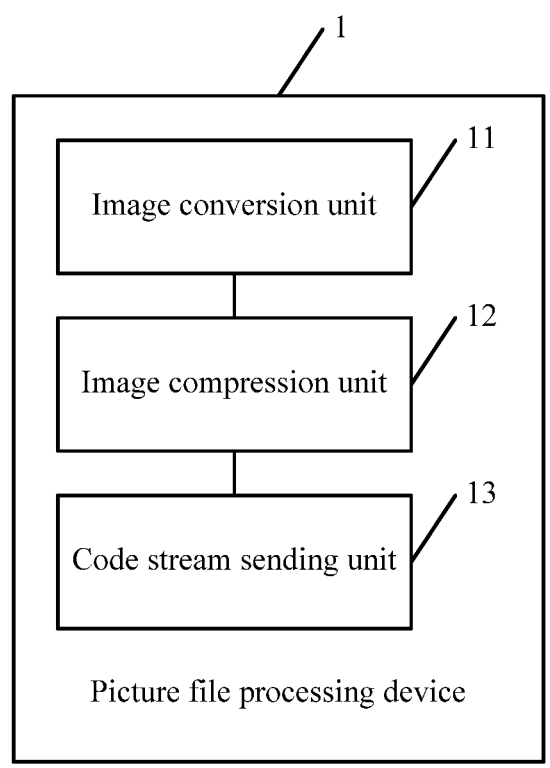
FIG. 23 is a schematic structural diagram of a picture file processing device according to an embodiment of the present application.
Figure 24:
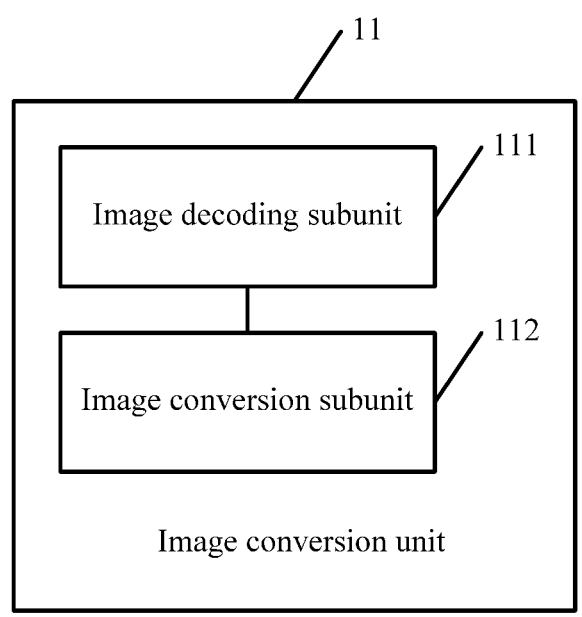
FIG. 24 is a schematic structural diagram of an image conversion unit according to an embodiment of the present application.

The picture file processing device provided in the embodiments of the present application is described below in detail with reference to FIG. 23 and FIG. 24. It should be noted that the picture file processing device in FIG. 23 and FIG. 24 is configured to perform the methods in the embodiments shown in FIG. 8 and FIG. 9 of the present application, and is specifically the transmitter in the foregoing embodiments. For ease of description, only parts related to the embodiments of the present application are shown. For specific technical details that are not disclosed, refer to the embodiments shown in FIG. 8 and FIG. 9 of the present application.

FIG. 23 is a schematic structural diagram of a picture file processing device according to an embodiment of the present application. As shown in FIG. 23, the picture file processing device 1 in this embodiment of the present application may include an image conversion unit 11, an image compression unit 12, and a code stream sending unit 13.

The image conversion unit 11 is configured to: generate a picture header information data segment of an original picture file according to the picture file, and convert each image frame in the picture file into YUV data.

During specific implementation, the image conversion unit 11 may decode the original picture file to generate the picture header information data segment of the picture file. The picture file may be an image input after a developer finishes making an image or may be an image received from another end. The picture header information data segment may include delay information, a total number of frames, and the like of the picture file. The delay information records a play interval between image frames in the picture file. The total number of frames is a quantity of image frames in the picture file. It may be understood that the picture header information data segment may further include global color table information of the picture file. The global color table information includes an RGB value of each pixel in each image frame. All images included in some picture files share the global color table information, and each image frame in some other picture files has respective local color table information. Therefore, the global color table information is acquired if the picture file has the global color table information, and the local color table information is not acquired if the picture file has only the local color table information. The image conversion unit 11 further converts each image frame in the picture file into the YUV data.

FIG. 24 is a schematic structural diagram of an image conversion unit according to an embodiment of the present application. As shown in FIG. 24, the image conversion unit 11 may include an image decoding subunit 111 and an image conversion subunit 112.

The image decoding subunit 111 is configured to decode an original picture file to generate the picture header information data segment of the picture file and RGB data corresponding to each image frame in the picture file.

During specific implementation, the image decoding subunit 111 may decode the original picture file to generate the picture header information data segment of the picture file and the RGB data corresponding to each image frame in the picture file. The picture file may be an image input after a developer finishes making an image or may be an image received from another end. The picture header information data segment may include delay information, a total number of frames, and the like of the picture file. The delay information records a play interval between image frames in the picture file. The total number of frames is a quantity of image frames in the picture file. It may be understood that the picture header information data segment may further include global color table information of the picture file. The global color table information includes an RGB value of each pixel in each image frame. All images included in some picture files share the global color table information, and each image frame in some other picture files has respective local color table information. Therefore, the global color table information is acquired if the picture file has the global color table information, and the local color table information is not acquired if the picture file has only the local color table information.

The image conversion subunit 112 is configured to convert the RGB data into YUV data by using color space conversion formulas.

During specific implementation, the image conversion subunit 112 may convert the RGB data into the YUV data by using the color space conversion formulas. During the conversion of the RGB data into the YUV data, color space conversion formulas in which a domain range of a luminance component is [16, 235] and a domain range of a chrominance component is [16, 240] may be selected. Because the ranges are reduced, the YUV data obtained after conversion can have a greatly reduced amount of data but has relatively severe distortion. Alternatively, color space conversion formulas in which domain ranges of both a luminance component and a chrominance component are [0, 255] may be selected. In this case, the YUV data obtained after conversion can have less severe distortion but has a relatively large amount of data, and the color space conversion formulas in which the domain ranges of both the luminance component and the chrominance component are [0, 255] are:

$$Y=0.299R+0.587G+0.114B;$$

$$U=-0.1687R-0.3313G+0.5B+128; \text{ and}$$

$$V=0.5R-0.4187G-0.0813B+128, \text{ where}$$

YUV is a video data format, Y is a luminance component, UV is a chrominance component, and raster-scan processing may be performed on pixels in each image frame by using the color space conversion formulas to convert each frame of the RGB data into corresponding YUV data.

The image compression unit 12 is configured to encode the YUV data to generate data stream.

During specific implementation, the image compression unit 12 may further encode the YUV data to generate the data stream. The encoding may include one or more of predictive coding, transform coding, quantization coding, and entropy coding. For example, the image compression unit 12 may compress the YUV data in IPPP mode. The first frame of the YUV data is an I frame. The I frame is an intra-frame prediction frame. The remaining frames of the YUV data are P frames. The P frame is an inter-frame prediction frame. Therefore, an amount of file data of the picture file can be effectively reduced, and a constant QP mode can further be used to stabilize quality and the like of different frames. The entropy coding may include Huffman coding, arithmetic coding, and the like.

Further, during encoding of the YUV data, it may be supported that a user adds a configuration parameter. The configuration parameter may be a parameter for encoding the YUV data. The configuration parameter may include any one of a standard definition mode parameter, a high definition mode parameter, and a lossless mode parameter. The standard definition mode parameter (for example, a YUV420 mode parameter) may be selected when reduced bandwidth is required. The high definition mode parameter (for example, a YUV444 mode parameter) may be selected when image quality is required. The image compression unit 12 may encode the YUV data by using the configuration parameter to generate the data stream.

In some embodiments, during encoding of the YUV data, it may further be supported that a user adds an encoder complexity, and the encoder complexity may be an encoding fineness parameter determined according to hardware performance of the picture file processing device 1. The encoder complexity may include any one of a first complexity, a second complexity, and a third complexity. The first complexity is higher than the second complexity, and the second complexity is higher than the third complexity. For example, the hardware performance of the picture file processing device 1 may be detected to generate a performance value. For example, a computational rate and the like of a CPU of the picture file processing device 1 are tested. It may be determined that the picture file processing device 1 has very high hardware performance when the performance value is in a first preset value range, and it may be recommended to use an encoding scheme with the first complexity. It may be determined that the picture file processing device 1 has medium hardware performance when the performance value is in a second preset value range, and it may be recommended to use an encoding scheme with the second complexity. It may be determined that the picture file processing device 1 has relatively poor hardware performance or currently real-time transcoding or the like is required when the performance value is in a third preset value range, and it may be recommended to use an encoding scheme with the third complexity. The image compression unit 12 may configure the encoder complexity to encode the YUV data to generate the data stream.

It should be noted that the foregoing two encoding schemes may be parallel encoding schemes. To be specific, the image compression unit 12 may use both the configuration parameter and the configured encoder complexity to encode the YUV data to generate the data stream. The performance value, the first preset value range, the second preset value range, and the third preset value range may be specifically set according to the experience of a developer.

The code stream sending unit 13 is configured to send compressed image data to a receiving device.

During specific implementation, the code stream sending unit 13 may generate the compressed image data. The picture file processing device 1 may store the compressed image data. The code stream sending unit 13 then sends the compressed image data to the receiving device when detecting a request from the receiving device for the picture file, for example, when detecting that a web page including the picture file is opened. Alternatively, the code stream sending unit 13 may directly send the compressed image data to the receiving device, for example, when one client of an instant messaging application needs to send the picture file to another client, or when an application service device needs to forward the picture file. The compressed image data includes the picture header information data segment and the data stream.

The receiving device receives the compressed image data sent by the picture file processing device 1, and the receiving device may parse the compressed image data to acquire the picture header information data segment and the data stream in the compressed image data.

The receiving device decodes the data stream to generate the YUV data, and encodes the YUV data based on the delay information, the total number of frames, the global color table information, and the like in the picture header information data segment to generate the picture file.

In this embodiment of the present application, a picture header information data segment of an original picture file is generated according to the picture file, each image frame in the picture file is converted into YUV data, compressed image data is then generated based on the picture header information data segment and data stream that is obtained by encoding the YUV data, and the compressed image data is transmitted. The YUV data may be generated according to the data stream when the compressed image data is received, and the YUV data is then processed based on the picture header information data segment to generate the picture file. Each image frame in the picture file having a relatively large amount of file data is converted into the YUV data having a relatively small amount of data, and the YUV data is then encoded to obtain the data stream, so that an amount of file data of the picture file during transmission is greatly reduced, and bandwidth costs are reduced. The use of a configuration parameter is flexibly controlled, and an encoder complexity is configured, so that different service scenarios and different machine performance can be satisfied, and the efficiency of encoding the picture file is optimized.

Figure 25:
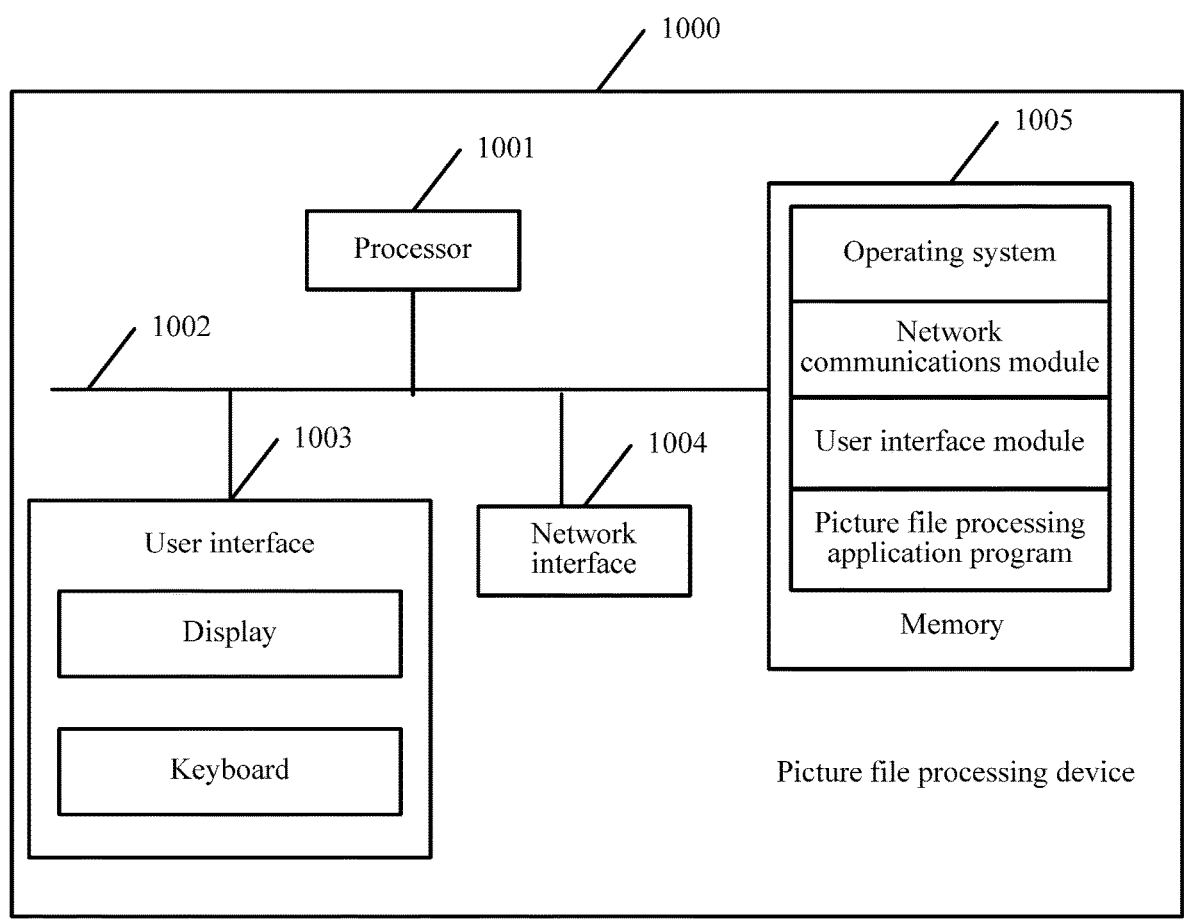
FIG. 25 is a schematic structural diagram of another picture file processing device according to an embodiment of the present application.

FIG. 25 is a schematic structural diagram of another picture file processing device according to an embodiment of the present application. As shown in FIG. 25, a picture file processing device 1000 may include at least one processor 1001 such as a CPU, at least one network interface 1004, a user interface 1003, a memory 1005, at least one communications bus 1002. The communications bus 1002 is configured to implement connection communication between these components. The user interface 1003 may include a display and a keyboard. The user interface 1003 may further include a standard wired interface and wireless interface. The network interface 1004 may include a standard wired interface and wireless interface (for example, a Wi-Fi interface). The memory 1005 may be a high-speed random-access memory (RAM), or may be a non-volatile memory, for example, at least one magnetic disk memory. The memory 1005 may further be at least one storage apparatus located far away from the processor 1001. As shown in FIG. 25, the memory 1005 used as a computer storage medium may include an operating system, a network communications module, a user interface module, and a picture file processing application program.

In the picture file processing device 1000 shown in FIG. 25, the network interface 1004 is mainly configured to connect a receiving device to perform data communication with the receiving device. The user interface 1003 is mainly configured to provide a user with an interface for input to acquire data input by the user. The processor 1001 may be configured to invoke the picture file processing application program stored in the memory 1005 to specifically perform the following steps:

generating a picture header information data segment of an original picture file according to the picture file, and converting each image frame in the picture file into YUV data;

encoding the YUV data to generate data stream; and sending compressed image data to the receiving device, the compressed image data including the picture header information data segment and the data stream, so that the receiving device parses the compressed image data to acquire the picture header information data segment and the data stream, and generates the YUV data according to the data stream, to enable the receiving device to process the YUV data based on the picture header information data segment to generate the picture file.

In an embodiment, when generating the picture header information data segment of the original picture file according to the picture file, and converting each image frame in the picture file into the YUV data, the processor 1001 specifically performs the following steps:

decoding the original picture file to generate the picture header information data segment of the picture file and RGB data corresponding to each image frame in the picture file, where the picture header information data segment includes delay information, a total number of frames, and global color table information; and converting the RGB data into the YUV data by using color space conversion formulas.

In an embodiment, the encoding includes one or more of predictive coding, transform coding, quantization coding, and entropy coding.

In an embodiment, when encoding the YUV data to generate the data stream, the processor 1001 specifically performs the following step:

encoding the YUV data by using a configuration parameter to generate the data stream, where the configuration parameter is a parameter for encoding the YUV data, and the configuration parameter includes any one of a standard definition mode parameter, a high definition mode parameter, and a lossless mode parameter.

In an embodiment, when encoding the YUV data to generate the data stream, the processor 1001 specifically performs the following step:

configuring an encoder complexity to encode the YUV data to generate the data stream, where the encoder complexity is an encoding fineness parameter determined according to hardware performance.

In an embodiment, the picture file is a GIF image.

In this embodiment of the present application, a picture header information data segment of an original picture file is generated according to the picture file, each image frame in the picture file is converted into YUV data, compressed image data is then generated based on the picture header information data segment and data stream that is obtained by encoding the YUV data, and the compressed image data is transmitted. The YUV data may be generated according to the data stream when the compressed image data is received, and the YUV data is then processed based on the picture header information data segment to generate the picture file. Each image frame in the picture file having a relatively large amount of file data is converted into the YUV data having a relatively small amount of data, and the YUV data is then encoded to obtain the data stream, so that an amount of file data of the picture file during transmission is greatly reduced, and bandwidth costs are reduced. The use of a configuration parameter is flexibly controlled, and an encoder complexity is configured, so that different service scenarios and different machine performance can be satisfied, and the efficiency of encoding the picture file is optimized.

Figure 26:
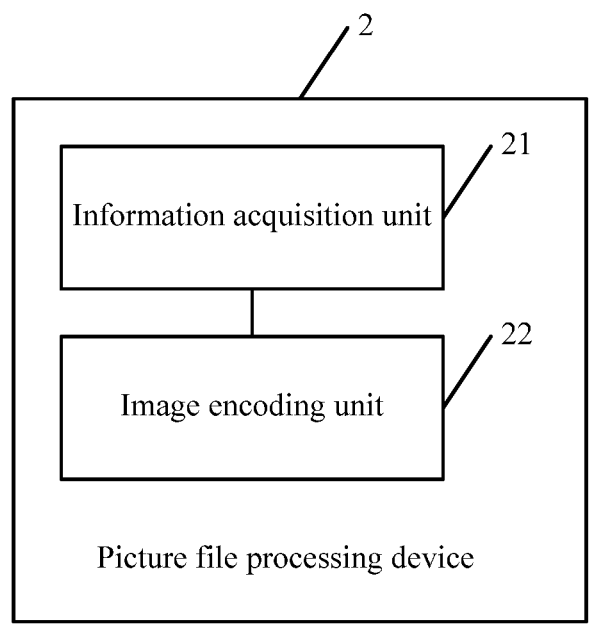
FIG. 26 is a schematic structural diagram of still another picture file processing device according to an embodiment of the present application.
Figure 27:
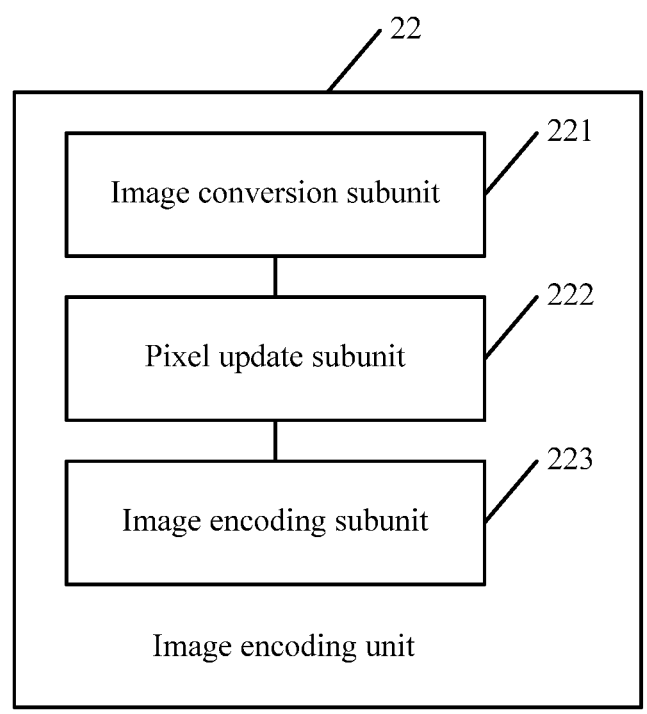
FIG. 27 is a schematic structural diagram of an image encoding unit according to an embodiment of the present application.

A picture file processing device provided in the embodiments of the present application is described below in detail with reference to FIG. 26 and FIG. 27. It should be noted that the picture file processing device shown in FIG. 26 and FIG. 27 is configured to perform the methods in the embodiments shown in FIG. 11 and FIG. 12 of the present application, and is specifically a receiving device in the foregoing embodiments. For ease of description, only parts related to the embodiments of the present application are shown. For specific technical details that are not disclosed, refer to the embodiments shown in FIG. 11 and FIG. 12 of the present application.

FIG. 26 is a schematic structural diagram of still another picture file processing device according to an embodiment of the present application. As shown in FIG. 26, a picture file processing device 2 in this embodiment of the present application may include an information acquisition unit 21 and an image encoding unit 22.

The information acquisition unit 21 is configured to: receive compressed image data that is sent by a transmitter and belongs to an original picture file, and parse the compressed image data to acquire a picture header information data segment of the picture file and data stream.

During specific implementation, the transmitter may decode the original picture file to generate the picture header information data segment of the picture file and RGB data corresponding to each image frame in the picture file. The picture file may be an image input after a developer finishes making an image or may be an image received from another end. The picture header information data segment may include delay information, a total number of frames, and the like of the picture file. The delay information records a play interval between image frames in the picture file. The total number of frames is a quantity of image frames in the picture file. It may be understood that the picture header information data segment may further include global color table information of the picture file. The global color table information includes an RGB value of each pixel in each image frame. All images included in some picture files share the global color table information, and each image frame in some other picture files has respective local color table information. Therefore, the global color table information is acquired if the picture file has the global color table information, and the local color table information is not acquired if the picture file has only the local color table information.

The transmitter may convert the RGB data into YUV data by using color space conversion formulas. During the conversion of the RGB data into the YUV data, color space conversion formulas in which a domain range of a luminance component is [16, 235] and a domain range of a chrominance component is [16, 240] may be selected. Because the ranges are reduced, the YUV data obtained after conversion can have a greatly reduced amount of data but has relatively severe distortion. Alternatively, color space conversion formulas in which domain ranges of both a luminance component and a chrominance component are [0, 255] may be selected. In this case, the YUV data obtained after conversion can have less severe distortion but has a relatively large amount of data, and the color space conversion formulas in which the domain ranges of both the luminance component and the chrominance component are [0, 255] are:

$$Y=0.299R+0.587G+0.114B;$$

$$U=-0.1687R-0.3313G+0.5B+128;\text{ and}$$

$$V=0.5R-0.4187G-0.0813B+128,\text{ where}$$

YUV is a video data format, Y is a luminance component, UV is a chrominance component, and raster-scan processing may be performed on pixels in each image frame by using the color space conversion formulas to convert each frame of the RGB data into corresponding YUV data.

The transmitter may further encode the YUV data to generate the data stream. The encoding may include one or more of predictive coding, transform coding, quantization coding, and entropy coding. For example, the transmitter may compress the YUV data in IPPP mode. The first frame of the YUV data is an I frame. The I frame is an intra-frame prediction frame. The remaining frames of the YUV data are P frames. The P frame is an inter-frame prediction frame. Therefore, an amount of file data of the picture file can be effectively reduced, and a constant QP mode can further be used to stabilize quality and the like of different frames. The entropy coding may include Huffman coding, arithmetic coding, and the like.

The transmitter may generate the compressed image data. The transmitter may store the compressed image data. The transmitter then sends the compressed image data to the picture file processing device 2 when detecting a request from the picture file processing device 2 for the picture file, for example, when detecting that a web page including the picture file is opened. Alternatively, the transmitter may directly send the compressed image data to the picture file processing device 2, for example, when one client of an instant messaging application needs to send the picture file to another client, or when an application service device needs to forward the picture file.

The information acquisition unit 21 receives the compressed image data sent by the transmitter, and the information acquisition unit 21 may parse the compressed image data to acquire the picture header information data segment and the data stream in the compressed image data.

The image encoding unit 22 is configured to: generate the YUV data according to the data stream, and process the YUV data based on the picture header information data segment to generate the picture file.

During specific implementation, the image encoding unit 22 decodes the data stream to generate the YUV data, and encodes the YUV data based on the delay information, the total number of frames, the global color table information, and the like in the picture header information data segment to generate the picture file.

FIG. 27 is a schematic structural diagram of an image encoding unit according to an embodiment of the present application. As shown in FIG. 27, the image encoding unit 22 may include an image conversion subunit 221, a pixel update subunit 222, and an image encoding subunit 223.

The image conversion subunit 221 is configured to: decode the data stream to generate the YUV data, and convert the YUV data into the RGB data by using the color space conversion formulas.

During specific implementation, the image conversion subunit 221 decodes the data stream to generate the YUV data, and may convert the YUV data into the RGB data by using the color space conversion formulas. Further, the image conversion subunit 221 needs to determine used color space conversion formulas according to a domain range of a luminance component. It may be understood that for YUV data in a YUV444 mode, color space conversion formulas in which a domain range of a luminance component is [16, 235] and a domain range of a chrominance component is [16, 240] may be selected, or color space conversion formulas in which domain ranges of both a luminance component and a chrominance component are [0, 255] may be selected. Specifically, the selected color space conversion formulas may correspond to the color space conversion formulas selected to convert the RGB data into the YUV data in the foregoing embodiments. It should be noted that the chrominance includes a sample matrix of either of two color difference signals Cb and Cr or a single sample in the sample matrix. Upsampling processing needs to be separately performed on the two color difference signals in a same manner. Cb corresponds to U in YUV, and Cr corresponds to V in YUV.

If the domain range of the luminance component is [16, 235] and the domain range of the chrominance component is [16, 240], the color space conversion formulas are:

$$R=\text{Clip3}(0,255,(298*Y+409*(Cr-128)+128)>>8);$$

$$G=\text{Clip3}(0,255,(298*Y-100*(Cb-128)+208*(Cr-128)+128)>>8);\text{ and}$$

$$B=\text{Clip3}(0,255,(298*Y+516*(Cb-128)+128)>>8),\text{ where}$$

"+128" is used for rounding the value of R, the value of B, and the value of G, and ">>8" represents division by the eighth power of 2.

If the domain ranges of the luminance component and the chrominance component are both [0, 255], the color space conversion formulas are:

$R=\text{Clip3}(0,255,Y+(359*(Cr-128)+128)>>8);$ $G=\text{Clip3}(0,255,Y-(88*(Cb-128)+183*(Cr-128)+128)>>8);$ and $B=\text{Clip3}(0,255,Y+(454*(Cb-128)+128)>>8),$ where "+128" is used for rounding the value of R, the value of B, and the value of G, and ">>8" represents division by the eighth power of 2.

Raster-scan processing may be performed on pixels in each image frame by using the color space conversion formulas to convert each frame of the YUV data into corresponding RGB data.

The pixel update subunit 222 is configured to update an RGB value of each pixel in the RGB data by using the global color table information.

During specific implementation, because the YUV data is encoded previously, the RGB data obtained by converting the YUV data is distorted, and the pixel update subunit 222 may update the RGB value of each pixel in the RGB data by using the global color table information. It may be understood that the RGB data may include one or more pixels. When the RGB data has only one pixel, the RGB value of the pixel may be updated by using the global color table information. When the RGB data has a plurality of pixels, the RGB value of each of the plurality of pixels may be updated by using the global color table information. The pixel update subunit 222 needs to train the global color table information again to generate local color table information that meets the RGB data. The pixel update subunit 222 may generate initial color table information if there is no global color table information, and train the initial color table information to generate the local color table information that meets the RGB data. A specific processing process is as follows:

In a first implementation of this embodiment of the present application, the pixel update subunit 222 may train the global color table information by using the RGB value of each pixel in the RGB data to generate the local color table information of the RGB data when the RGB data is the first image frame in the picture file and the picture header information data segment has the global color table information, and update the RGB value of each pixel by using the local color table information of the RGB data.

Further, the pixel update subunit 222 may sort at least one source RGB value in the global color table information in a preset sorting manner (for example, ascending order or descending order) of the G component to generate trained color table information when the RGB data is the first image frame in the picture file and the picture header information data segment has the global color table information. Referring together to FIG. 3, as shown in FIG. 3, the global color table information includes a color index and a source RGB value, for example: 5, (8, 1, 10); 6, (8, 9, 8); 7, (1, 7, 6); 8, (10, 8, 6); 9, (5, 8, 5); 10, (9, 10, 1). The trained color table information may be generated through sorting in ascending order of the G component, for example: 5, (8, 1, 10); 6, (1, 7, 6); 7, (5, 8, 5); 8, (10, 8, 6); 9, (8, 9, 8); 10, (9, 10, 1).

The pixel update subunit 222 acquires, from the trained color table information, a first source RGB value in which the G component is closest to the G component of a current pixel in the RGB data, and acquires a first color index of the first source RGB value. It may be understood that the pixel update subunit 222 may traverse source RGB values in the trained color table information by using the G component of the current pixel to acquire the first source RGB value having the closest G component. Referring together to FIG. 4, it is assumed that the first frame of the RGB data has four pixels, the current pixel is the first pixel in the RGB data, and an RGB value of the current pixel is (9, 9, 9). It may be found from the trained color table information that the G component in (8, 9, 8) is closest to the G component in the RGB value of the current pixel. (8, 9, 8) is determined as the first source RGB value, and it is acquired that a first color index of the first source RGB value is "9".

The pixel update subunit 222 acquires, from the trained color table information in a preset range with the first color index being the center, a second source RGB value having the smallest difference from the RGB value of the current pixel, and acquires a second color index of the second source RGB value. It may be understood that the pixel update subunit 222 may acquire a plurality of source RGB values in the preset range with the first color index being the center, calculate respectively differences of the first source RGB value and the plurality of source RGB values from the RGB value of the current pixel, and determine one of the plurality of source RGB values that has the smallest difference as the second source RGB value. According to the foregoing example, it is assumed that the preset range is a range of the center minus 1 to the center plus 1. "9" is the center, two source RGB values (10, 8, 6) and (9, 10, 1) are acquired, and difference values of (10, 8, 6), (8, 9, 8), and (9, 10, 1) from (9, 9, 9) are calculated respectively. A difference value of the source RGB value with the color index being "8" is |9−10|+|9−8|+|9−6|=5, a difference value of the source RGB value with the color index being "9" is |9−8|+|9−9|+|9−8|=2, and a difference value of the source RGB value with the color index being "10" is |9−9|+|9−10|+|9−1|=9. It is determined that the source RGB value (8, 9, 8) is the second source RGB value, and it is acquired that a second color index of the second source RGB value is "9". It may be understood that the first source RGB value and the first color index acquired in the foregoing may be respectively the same as or different from the second source RGB value and the second color index, depending specifically on an actual execution process.

The pixel update subunit 222 replaces the second source RGB value with the RGB value of the current pixel, and changes the plurality of source RGB values in a preset range with the second color index being the center in the trained color table information by using a preset weight value and the RGB value of the current pixel. Referring together to FIG. 5, according to the foregoing example, the second source RGB value is (8, 9, 8), and (8, 9, 8) is replaced with the RGB value (9, 9, 9) of the current pixel. In addition, the plurality of source RGB values in the preset range with the second color index being the center may be changed according to the preset weight value and the RGB value of the current pixel. Assuming that the preset range is a range of the center minus 1 to the center plus 1, two source RGB values (10, 8, 6) and (9, 10, 1) need to be changed. The preset weight value may be a dynamic weight value. A source RGB value whose color index is closer to the second color index is affected more significantly by the RGB value of the current pixel. It is assumed that the current distribution of weight values is 2:8. (10, 8, 6) is changed by using (9, 9, 9), for example, the R component=9*0.8+10*0.2=9.2, the G component=9*0.8+8*0.2=8.8, and the B component=9*0.8+6*0.2=8.4. The foregoing results are rounded, so that it is determined that the source RGB value with the color index "8" is changed from (10, 8, 6) into (9, 9, 8). Similarly, the source RGB value with the color index "10" is changed from (9, 10, 1) into (9, 9, 7).

The pixel update subunit 222 acquires the changed trained color table information when the current pixel is not the last pixel in the RGB data, for example, when the current pixel is the first pixel in the RGB data shown in FIG. 4 or FIG. 5, uses a next pixel of the current pixel as a current pixel, and starts to acquire, from the trained color table information, a first source RGB value in which the G component is closest to the G component of a current pixel in the RGB data. For example, the second pixel in the RGB data is used as the current pixel, and the changed trained color table information is then trained again. For a specific training process, refer to the foregoing description of the training process. Details are not described herein.

The pixel update subunit 222 acquires the changed trained color table information when the current pixel is the last pixel in the RGB data, for example, when the current pixel is the fourth pixel in the RGB data shown in FIG. 4 or FIG. 5, and determines the trained color table information as the local color table information of the RGB data.

The pixel update subunit 222 may update the RGB value of each pixel by using the local color table information of the RGB data. Further, the pixel update subunit 222 may sequentially acquire, from the local color table information of the RGB data, a source RGB value with an RGB value that is the same as or has the smallest difference from the RGB value of each pixel to replace the RGB value of the pixel. In some embodiments, the pixel update subunit 222 may use a color index corresponding to a source RGB value with an RGB value that is the same as or has the smallest difference from the RGB value of each pixel to replace the RGB value of the pixel. Referring together to FIG. 6, according to the foregoing example, the RGB value of the first pixel in the RGB data is (9, 9, 9), and (9, 9, 8) in the local color table information has the smallest difference from (9, 9, 9), so that the color index "8" corresponding to (9, 9, 8) is used to replace the RGB value of the first pixel. Similarly, the color index of the second pixel is "10", the color index of the third pixel is "9", and the color index of the fourth pixel is "6".

In a second implementation of this embodiment of the present application, the pixel update subunit 222 may train the initial color table information by using the RGB value of each pixel in the RGB data to generate the local color table information of the RGB data when the RGB data is the first image frame in the picture file and the picture header information data segment does not have the global color table information, and update the RGB value of each pixel by using the local color table information of the RGB data.

Further, the pixel update subunit 222 may generate one piece of initial color table information, for example, (0, 0, 0), (1, 1, 1), (2, 2, 2), . . . , and (255, 255, 255), when the RGB data is the first image frame in the picture file and the picture header information data segment does not have the global color table information. The pixel update subunit 222 acquires, from the initial color table information, a third source RGB value in which the G component is closest to the G component of the current pixel in the RGB data, and acquires a third color index of the third source RGB value. The picture file processing device 2 acquires, from the initial color table information in a preset range with the third color index being the center, a fourth source RGB value having the smallest difference from the RGB value of the current pixel, and acquires a fourth color index of the fourth source RGB value. The pixel update subunit 222 replaces the fourth source RGB value with the RGB value of the current pixel, and changes the plurality of source RGB values in a preset range with the fourth color index being the center in the initial color table information by using a preset weight value and the RGB value of the current pixel. The pixel update subunit 222 acquires the changed initial color table information when the current pixel is not the last pixel in the RGB data, uses a next pixel of the current pixel as a current pixel, and starts to acquire, from the initial color table information, the third source RGB value in which the G component is closest to the G component of the current pixel in the RGB data. The pixel update subunit 222 acquires changed trained color table information when the current pixel is the last pixel in the RGB data, and determines the initial color table information as the local color table information of the RGB data. The pixel update subunit 222 may update the RGB value of each pixel by using the local color table information of the RGB data. It should be noted that for both the processes of training the initial color table information and updating the RGB value of each pixel by using the local color table information of the RGB data in the second implementation, refer to the foregoing execution process in the first implementation. Details are not described herein.

For the foregoing first implementation and second implementation, in a third implementation of this embodiment of the present application, if the RGB data is not the first image frame in the picture file, to be specific, the RGB data is an $N^{th}$ image frame in the picture file, where N is a positive integer greater than 1 and less than or equal to the total number of frames, the pixel update subunit 222 may train local color table information of an $(N-1)^{th}$ frame of the RGB data by using the RGB value of each pixel in the RGB data to generate local color table information of the RGB data, and update the RGB value of each pixel by using the local color table information of the RGB data.

Further, the pixel update subunit 222 may sort at least one source RGB value in the local color table information of the $(N-1)^{th}$ frame of the RGB data in a preset sorting manner of the G component to generate trained color table information when the RGB data is the $N^{th}$ image frame in the picture file. The pixel update subunit 222 acquires, from the trained color table information, a fifth source RGB value in which the G component is closest to the G component of the current pixel in the RGB data, and acquires a fifth color index of the fifth source RGB value. The pixel update subunit 222 acquires, from the trained color table information in a preset range with the fifth color index being the center, a sixth source RGB value having the smallest difference from the RGB value of the current pixel, and acquires a sixth color index of the sixth source RGB value. The pixel update subunit 222 replaces the sixth source RGB value with the RGB value of the current pixel, and changes the plurality of source RGB values in a preset range with the sixth color index being the center in the trained color table information by using a preset weight value and the RGB value of the current pixel. The pixel update subunit 222 acquires the changed trained color table information when the current pixel is not the last pixel in the RGB data, uses a next pixel of the current pixel as a current pixel, and starts to acquire, from the trained color table information, the fifth source RGB value in which the G component is closest to the G component of the current pixel in the RGB data. The pixel update subunit 222 acquires the changed trained color table information when the current pixel is the last pixel in the RGB data, and determines the trained color table information as the local color table information of the RGB data. The pixel update subunit 222 may update the RGB value of each pixel by using the local color table information of the RGB data. It should be noted that for both the processes of training the trained color table information and updating the RGB value of each pixel by using the local color table information of the RGB data in the third implementation, refer to the foregoing execution process in the first implementation. Details are not described herein.

It should be noted that the foregoing use of the G component as a guide for training of the color table information is merely an example. In this embodiment of the present application, the R component or the B component may be similarly used to guide the training of the color table information. For an execution process, refer to the description in the foregoing content. Details are not described herein. The first source RGB value, the second source RGB value, the third source RGB value, the fourth source RGB value, the fifth source RGB value, and the sixth source RGB value may represent the same meaning of a source RGB value, and the first color index, the second color index, the third color index, the fourth color index, the fifth color index, and the sixth color index may represent the same meaning of a color index. Such a naming manner is merely used to distinguish between different execution scenarios, for example, the foregoing three execution scenarios in which the RGB data is the first image frame in the picture file and the picture header information data segment has the global color table information, the RGB data is the first image frame in the picture file and the picture header information data segment does not have the global color table information, and the RGB data is the $N^{th}$ image frame in the picture file.

The image encoding subunit 223 is configured to perform image encoding on the updated RGB data by using the delay information and the total number of frames to generate the picture file.

During specific implementation, the image encoding subunit 223 performs image encoding on the updated RGB data by using the delay information and the total number of frames to generate the picture file. In some embodiments, the picture file processing device 2 may perform image encoding on the color index of each pixel in the RGB data based on the delay information and the total number of frames and by using LZW encoding to generate the picture file. The picture file processing device 2 may store or present the picture file. It may be understood that a scheme of the image encoding is specifically determined by an image format of the picture file. For example, the image encoding may be GIF encoding or the like if the picture file that needs to be generated is a GIF image.

In this embodiment of the present application, YUV data may be generated according to data stream when compressed image data is received, and the YUV data is then processed based on the picture header information data segment to generate a picture file. Each image frame in the picture file having a relatively large amount of file data is converted into the YUV data having a relatively small amount of data, and the YUV data is then encoded to obtain the data stream, so that an amount of file data of the picture file during transmission is greatly reduced, and bandwidth costs are reduced. Global color table information or initial color table information is trained to generate local color table information of the RGB data, so that image distortion is effectively reduced. The G component is used to acquire a source RGB value having the closest G component, a search for a color index is made in a small range in the color table information, and it is not necessary to traverse all the color table information, so that the complexity of training the local color table information can be lowered, thereby further improving the efficiency of encoding the picture file.

Figure 28:
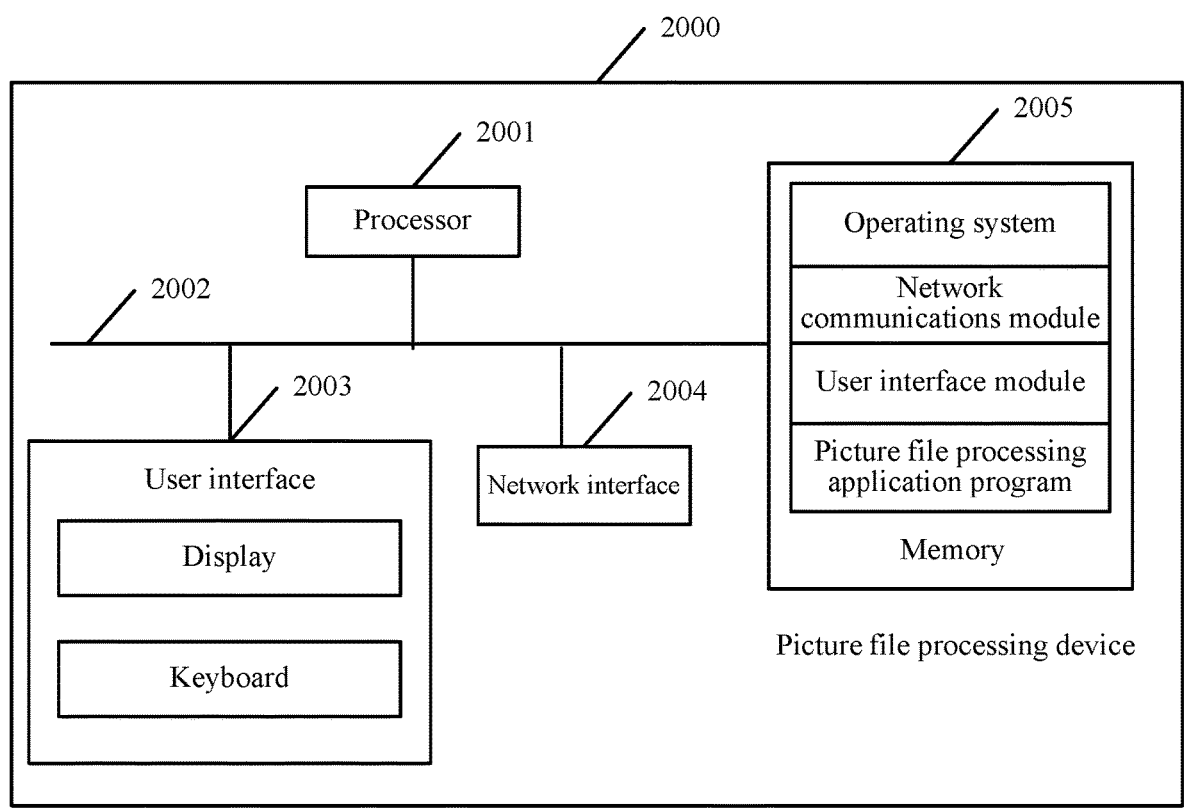
FIG. 28 is a schematic structural diagram of still another picture file processing device according to an embodiment of the present application.

FIG. 28 is a schematic structural diagram of still another picture file processing device according to an embodiment of the present application. As shown in FIG. 28, a picture file processing device 2000 may include at least one processor 2001 such as a CPU, at least one network interface 2004, a user interface 2003, a memory 2005, at least one communications bus 2002. The communications bus 2002 is configured to implement connection communication between these components. The user interface 2003 may include a display and a keyboard. The user interface 2003 may further include a standard wired interface and wireless interface. The network interface 2004 may include a standard wired interface and wireless interface (for example, a Wi-Fi interface). The memory 2005 may be a high-speed RAM, or may be a non-volatile memory, for example, at least one magnetic disk memory. The memory 2005 may further be at least one storage apparatus located far away from the processor 2001. As shown in FIG. 28, the memory 2005 used as a computer storage medium may include an operating system, a network communications module, a user interface module, and a picture file processing application program.

In the picture file processing device 2000 shown in FIG. 28, the network interface 2004 is mainly configured to connect a transmitter to perform data communication with the transmitter. The user interface 2003 is mainly configured to provide a user with an interface for input to acquire data input by the user. The processor 2001 may be configured to invoke the picture file processing application program stored in the memory 2005 to specifically perform the following steps:

receiving compressed image data that is sent by the transmitter and belongs to an original picture file, parsing the compressed image data to acquire a picture header information data segment of the picture file and data stream, where the data stream is information generated by encoding YUV data converted from each image frame in the picture file; and generating the YUV data according to the data stream, and processing the YUV data based on the picture header information data segment to generate the picture file.

In an embodiment, the picture header information data segment includes delay information, a total number of frames, and global color table information; and when generating the YUV data according to the data stream, and processing the YUV data based on the picture header information data segment to generate the picture file, the processor 2001 specifically performs the following steps:

decoding the data stream to generate the YUV data, and converting the YUV data into RGB data by using color space conversion formulas;

updating an RGB value of each pixel in the RGB data by using the global color table information; and performing image encoding on the updated RGB data by using the delay information and the total number of frames to generate the picture file.

In an embodiment, when updating the RGB value of each pixel in the RGB data by using the global color table information, the processor 2001 specifically performs the following steps:

training the global color table information by using the RGB value of each pixel in the RGB data to generate local color table information of the RGB data when the RGB data is the first image frame in the picture file and the picture header information data segment has the global color table information, and updating the RGB value of each pixel by using the local color table information of the RGB data.

In an embodiment, when training the global color table information by using the RGB value of each pixel in the RGB data to generate the local color table information of the RGB data, the processor 2001 specifically performs the following steps:

sorting at least one source RGB value in the global color table information in a preset sorting manner of the G component to generate trained color table information;

acquiring, from the trained color table information, a first source RGB value in which the G component is closest to the G component of a current pixel in the RGB data, and acquiring a first color index of the first source RGB value;

acquiring, from the trained color table information in a preset range with the first color index being the center, a second source RGB value having the smallest difference from the RGB value of the current pixel, and acquiring a second color index of the second source RGB value;

replacing the second source RGB value with the RGB value of the current pixel, and changing a plurality of source RGB values in a preset range with the second color index being the center in the trained color table information by using a preset weight value and the RGB value of the current pixel;

acquiring the changed trained color table information when the current pixel is not the last pixel in the RGB data, using a next pixel of the current pixel as a current pixel, and starting to acquire, from the trained color table information, a first source RGB value in which the G component is closest to the G component of a current pixel in the RGB data; and acquiring the changed trained color table information when the current pixel is the last pixel in the RGB data, and determining the trained color table information as the local color table information of the RGB data.

In an embodiment, when updating the RGB value of each pixel in the RGB data by using the global color table information, the processor 2001 specifically performs the following steps:

training initial color table information by using the RGB value of each pixel in the RGB data to generate the local color table information of the RGB data when the RGB data is the first image frame in the picture file and the picture header information data segment does not have the global color table information, and updating the RGB value of each pixel by using the local color table information of the RGB data.

In an embodiment, when training the initial color table information by using the RGB value of each pixel in the RGB data to generate the local color table information of the RGB data, the processor 2001 specifically performs the following steps:

acquiring, from the initial color table information, a third source RGB value in which the G component is closest to the G component of the current pixel in the RGB data, and acquiring a third color index of the third source RGB value;

acquiring, from the initial color table information in a preset range with the third color index being the center, a fourth source RGB value having the smallest difference from the RGB value of the current pixel, and acquiring a fourth color index of the fourth source RGB value;

replacing the fourth source RGB value with the RGB value of the current pixel, and changing a plurality of source RGB values in a preset range with the fourth color index being the center in the initial color table information by using a preset weight value and the RGB value of the current pixel;

acquiring the changed initial color table information when the current pixel is not the last pixel in the RGB data, using a next pixel of the current pixel as a current pixel, and starting to acquire, from the initial color table information, the third source RGB value in which the G component is closest to the G component of the current pixel in the RGB data; and acquiring changed trained color table information when the current pixel is the last pixel in the RGB data, and determining the initial color table information as the local color table information of the RGB data.

In an embodiment, when updating the RGB value of each pixel in the RGB data by using the global color table information, the processor 2001 specifically performs the following steps:

training local color table information of an $(N-1)^{th}$ frame of the RGB data by using the RGB value of each pixel in the RGB data to generate local color table information of the RGB data when the RGB data is an $N^{th}$ image frame in the picture file, and updating the RGB value of each pixel by using the local color table information of the RGB data, where N is a positive integer greater than 1 and less than or equal to the total number of frames.

In an embodiment, when training the local color table information of the $(N-1)^{th}$ frame of the RGB data by using the RGB value of each pixel in the RGB data to generate the local color table information of the RGB data, the processor 2001 specifically performs the following steps:

sorting at least one source RGB value in the local color table information of the $(N-1)^{th}$ frame of the RGB data in a preset sorting manner of the G component to generate trained color table information;

acquiring, from the trained color table information, a fifth source RGB value in which the G component is closest to the G component of the current pixel in the RGB data, and acquiring a fifth color index of the fifth source RGB value;

acquiring, from the trained color table information in a preset range with the fifth color index being the center, a sixth source RGB value having the smallest difference from the RGB value of the current pixel, and acquiring a sixth color index of the sixth source RGB value;

replacing the sixth source RGB value with the RGB value of the current pixel, and changing a plurality of source RGB values in a preset range with the sixth color index being the center in the trained color table information by using a preset weight value and the RGB value of the current pixel;

acquiring the changed trained color table information when the current pixel is not the last pixel in the RGB data, using a next pixel of the current pixel as a current pixel, and starting to acquire, from the trained color table information, the fifth source RGB value in which the G component is closest to the G component of the current pixel in the RGB data; and acquiring the changed trained color table information when the current pixel is the last pixel in the RGB data, and determining the trained color table information as the local color table information of the RGB data.

In an embodiment, the picture file is a GIF image.

In this embodiment of the present application, YUV data may be generated according to data stream when compressed image data is received, and the YUV data is then processed based on the picture header information data segment to generate a picture file. Each image frame in the picture file having a relatively large amount of file data is converted into the YUV data having a relatively small amount of data, and the YUV data is then encoded to obtain the data stream, so that an amount of file data of the picture file during transmission is greatly reduced, and bandwidth costs are reduced. Global color table information or initial color table information is trained to generate local color table information of RGB data, so that image distortion is effectively reduced. The G component is used to acquire a source RGB value having the closest G component, a search for a color index is made in a small range in the color table information, and it is not necessary to traverse all the color table information, so that the complexity of training the local color table information can be lowered, thereby further improving the efficiency of encoding the picture file.

Figure 29:
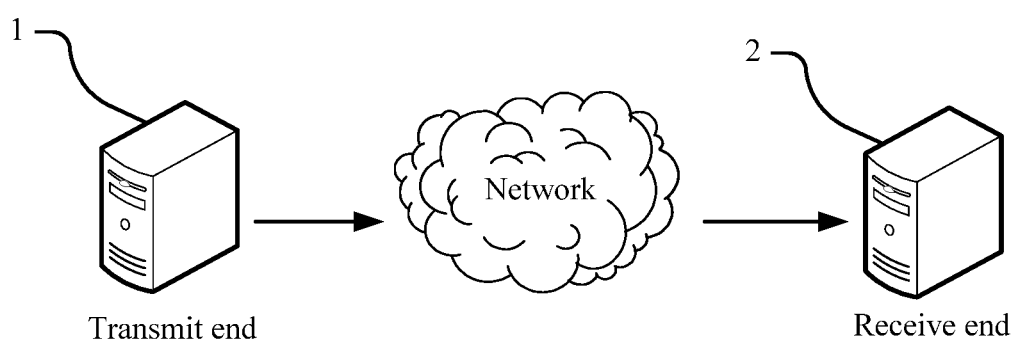
FIG. 29 is a schematic structural diagram of a picture file processing system according to an embodiment of the present application.

FIG. 29 is a schematic structural diagram of a picture file processing system according to an embodiment of the present application. As shown in FIG. 29, the system may include a transmitter 1 and a receiving device 2. The transmitter 1 and the receiving device 2 may be connected to each other through a network. The transmitter 1 is specifically the picture file processing device 1 in the embodiment shown in FIG. 23, and the receiving device 2 is specifically the picture file processing device 2 in the embodiment shown in FIG. 26. Alternatively, the transmitter 1 is specifically the picture file processing device 1000 in the embodiment shown in FIG. 25, and the receiving device 2 is specifically the picture file processing device 2000 in the embodiment shown in FIG. 28.

The transmitter 1 is configured to: generate a picture header information data segment of an original picture file according to the picture file, convert each image frame in the picture file into YUV data, encode the YUV data to generate data stream, and send compressed image data to the receiving device 2, the compressed image data including the picture header information data segment and the data stream.

The receiving device 2 is configured to: receive the compressed image data sent by the transmitter 1, parse the compressed image data to acquire the picture header information data segment and the data stream, generate the YUV data according to the data stream, and process the YUV data based on the picture header information data segment to generate the picture file.

In an embodiment, when being configured to: generate the picture header information data segment of the original picture file according to the picture file, and convert each image frame in the picture file into the YUV data, the transmitter 1 is specifically configured to:

decode the original picture file to generate the picture header information data segment of the picture file and RGB data corresponding to each image frame in the picture file, where the picture header information data segment includes delay information, a total number of frames, and global color table information; and convert the RGB data into the YUV data by using color space conversion formulas.

In an embodiment, the encoding includes one or more of predictive coding, transform coding, quantization coding, and entropy coding.

In an embodiment, when being configured to encode the YUV data to generate the data stream, the transmitter 1 is specifically configured to:

encode the YUV data by using a configuration parameter to generate the data stream, where the configuration parameter is a parameter for encoding the YUV data, and the configuration parameter includes any one of a standard definition mode parameter, a high definition mode parameter, and a lossless mode parameter.

In an embodiment, when being configured to encode the YUV data to generate the data stream, the transmitter 1 is specifically configured to:

configure an encoder complexity to encode the YUV data to generate the data stream, where the encoder complexity is an encoding fineness parameter determined according to hardware performance of the transmitter 1.

In an embodiment, when being configured to: generate the YUV data according to the data stream, and process the YUV data based on the picture header information data segment to generate the picture file, the receiving device 2 is specifically configured to:

decode the data stream to generate the YUV data, and convert the YUV data into the RGB data by using the color space conversion formulas;

update an RGB value of each pixel in the RGB data by using the global color table information; and perform image encoding on the updated RGB data by using the delay information and the total number of frames to generate the picture file.

In an embodiment, when being configured to update the RGB value of each pixel in the RGB data by using the global color table information, the receiving device 2 is specifically configured to:

train the global color table information by using the RGB value of each pixel in the RGB data to generate local color table information of the RGB data when the RGB data is the first image frame in the picture file and the picture header information data segment has the global color table information, and update the RGB value of each pixel by using the local color table information of the RGB data.

In an embodiment, when being configured to train the global color table information by using the RGB value of each pixel in the RGB data to generate the local color table information of the RGB data, the receiving device 2 is specifically configured to:

sort at least one source RGB value in the global color table information in a preset sorting manner of the G component to generate trained color table information;

acquire, from the trained color table information, a first source RGB value in which the G component is closest to the G component of a current pixel in the RGB data, and acquire a first color index of the first source RGB value;

acquire, from the trained color table information in a preset range with the first color index being the center, a second source RGB value having the smallest difference from the RGB value of the current pixel, and acquire a second color index of the second source RGB value;

replace the second source RGB value with the RGB value of the current pixel, and change a plurality of source RGB values in a preset range with the second color index being the center in the trained color table information by using a preset weight value and the RGB value of the current pixel;

acquire the changed trained color table information when the current pixel is not the last pixel in the RGB data, use a next pixel of the current pixel as a current pixel, and start to acquire, from the trained color table information, a first source RGB value in which the G component is closest to the G component of a current pixel in the RGB data; and acquire the changed trained color table information when the current pixel is the last pixel in the RGB data, and determine the trained color table information as the local color table information of the RGB data.

In an embodiment, when being configured to update the RGB value of each pixel in the RGB data by using the global color table information, the receiving device 2 is specifically configured to:

train initial color table information by using the RGB value of each pixel in the RGB data to generate the local color table information of the RGB data when the RGB data is the first image frame in the picture file and the picture header information data segment does not have the global color table information, and update the RGB value of each pixel by using the local color table information of the RGB data.

In an embodiment, when being configured to train the initial color table information by using the RGB value of each pixel in the RGB data to generate the local color table information of the RGB data, the receiving device 2 is specifically configured to:

acquire, from the initial color table information, a third source RGB value in which the G component is closest to the G component of the current pixel in the RGB data, and acquire the third color index of the third source RGB value;

acquire, from the initial color table information in a preset range with the third color index being the center, a fourth source RGB value having the smallest difference from the RGB value of the current pixel, and acquire a fourth color index of the fourth source RGB value;

replace the fourth source RGB value with the RGB value of the current pixel, and change the plurality of source RGB values in a preset range with the fourth color index being the center in the initial color table information by using a preset weight value and the RGB value of the current pixel;

acquire the changed initial color table information when the current pixel is not the last pixel in the RGB data, use a next pixel of the current pixel as a current pixel, and start to acquire, from the initial color table information, a third source RGB value in which the G component is closest to the G component of the current pixel in the RGB data; and acquire changed trained color table information when the current pixel is the last pixel in the RGB data, and determine the initial color table information as the local color table information of the RGB data.

In an embodiment, when being configured to update the RGB value of each pixel in the RGB data by using the global color table information, the receiving device 2 is specifically configured to:

train local color table information of an $(N-1)^{th}$ frame of the RGB data by using the RGB value of each pixel in the RGB data to generate local color table information of the RGB data when the RGB data is an $N^{th}$ image frame in the picture file, and update the RGB value of each pixel by using the local color table information of the RGB data, where N is a positive integer greater than 1 and less than or equal to the total number of frames.

In an embodiment, when being configured to train the local color table information of the $(N-1)^{th}$ frame of the RGB data by using the RGB value of each pixel in the RGB data to generate the local color table information of the RGB data, the receiving device 2 is specifically configured to:

sort at least one source RGB value in the local color table information of the $(N-1)^{th}$ frame of the RGB data in a preset sorting manner of the G component to generate trained color table information;

acquire, from the trained color table information, a fifth source RGB value in which the G component is closest to the G component of the current pixel in the RGB data, and acquire a fifth color index of the fifth source RGB value;

acquire, from the trained color table information in a preset range with the fifth color index being the center, a sixth source RGB value having the smallest difference from the RGB value of the current pixel, and acquire a sixth color index of the sixth source RGB value;

replace the sixth source RGB value with the RGB value of the current pixel, and change a plurality of source RGB values in a preset range with the sixth color index being the center in the trained color table information by using a preset weight value and the RGB value of the current pixel;

acquire the changed trained color table information when the current pixel is not the last pixel in the RGB data, use a next pixel of the current pixel as a current pixel, and start to acquire, from the trained color table information, a fifth source RGB value in which the G component is closest to the G component of the current pixel in the RGB data; and acquire the changed trained color table information when the current pixel is the last pixel in the RGB data, and determine the trained color table information as the local color table information of the RGB data.

In an embodiment, the picture file is a GIF image.

In this embodiment of the present application, a picture header information data segment of an original picture file is generated according to the picture file, each image frame in the picture file is converted into YUV data, compressed image data is then generated based on the picture header information data segment and data stream that is obtained by encoding the YUV data, and the compressed image data is transmitted. The YUV data may be generated according to the data stream when the compressed image data is received, and the YUV data is then processed based on the picture header information data segment to generate the picture file. Each image frame in the picture file having a relatively large amount of file data is converted into the YUV data having a relatively small amount of data, and the YUV data is then encoded to obtain the data stream, so that an amount of file data of the picture file during transmission is greatly reduced, and bandwidth costs are reduced. The use of a configuration parameter is flexibly controlled, and an encoder complexity is configured, so that different service scenarios and different machine performance can be satisfied, and the efficiency of encoding the picture file is optimized. Global color table information or initial color table information is trained to generate local color table information of RGB data, so that image distortion is effectively reduced. The G component is used to acquire a source RGB value having the closest G component, a search for a color index is made in a small range in the color table information, and it is not necessary to traverse all the color table information, so that the complexity of training the local color table information can be lowered, thereby further improving the efficiency of encoding the picture file.

Figure 30:
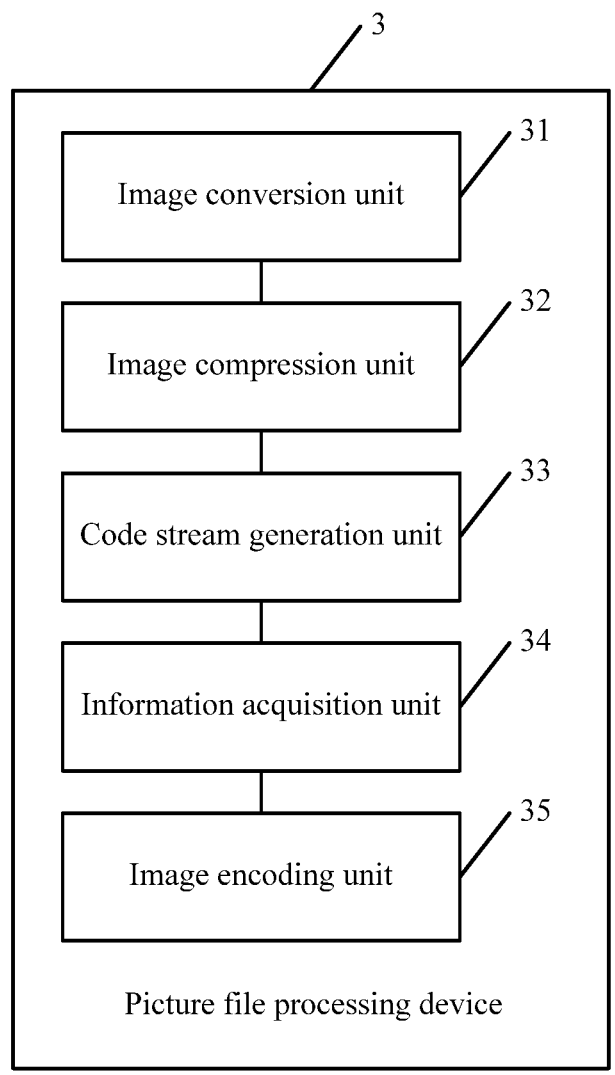
FIG. 30 is a schematic structural diagram of still another picture file processing device according to an embodiment of the present application.
Figure 31:
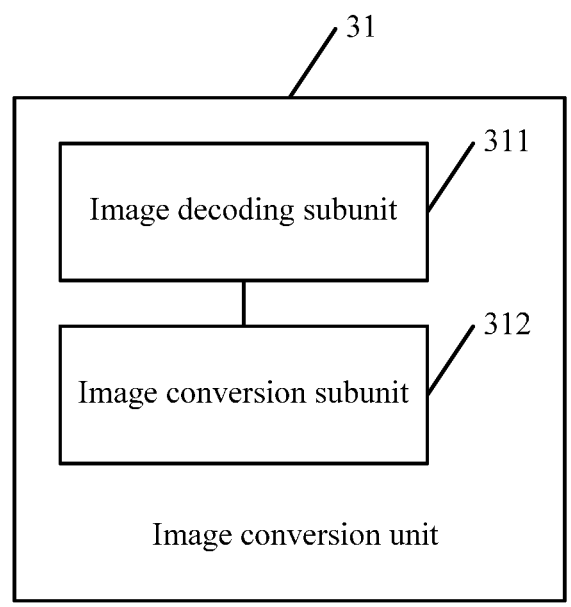
FIG. 31 is a schematic structural diagram of another image conversion unit according to an embodiment of the present application.
Figure 32:
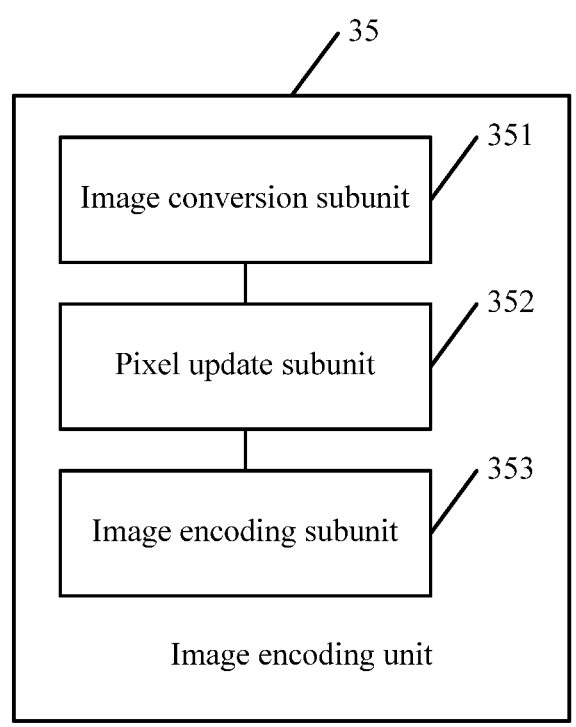
FIG. 32 is a schematic structural diagram of another image encoding unit according to an embodiment of the present application.

A picture file processing device provided in the embodiments of the present application is described below in detail with reference to FIG. 30 to FIG. 32. It should be noted that the picture file processing device shown in FIG. 30 to FIG. 32 is configured to perform the methods in the embodiments shown in FIG. 14 to FIG. 16 of the present application. For ease of description, only parts related to the embodiments of the present application are shown. For specific technical details that are not disclosed, refer to the embodiments shown in FIG. 14 to FIG. 16 of the present application.

FIG. 30 is a schematic structural diagram of still another picture file processing device according to an embodiment of the present application. As shown in FIG. 30, a picture file processing device 3 in this embodiment of the present application may include an image conversion unit 31, an image compression unit 32, a code stream generation unit 33, an information acquisition unit 34, and an image encoding unit 35.

The image conversion unit 31 is configured to: generate a picture header information data segment of an original picture file according to the picture file, and convert each image frame in the picture file into YUV data.

During specific implementation, the image conversion unit 31 may decode the original picture file to generate the picture header information data segment of the picture file.

The picture file may be an image input after a developer finishes making an image or may be an image received from another end. The picture header information data segment may include delay information, a total number of frames, and the like of the picture file. The delay information records a play interval between image frames in the picture file. The total number of frames is a quantity of image frames in the picture file. It may be understood that the picture header information data segment may further include global color table information of the picture file. The global color table information includes an RGB value of each pixel in each image frame. All images included in some picture files share the global color table information, and each image frame in some other picture files has respective local color table information. Therefore, the global color table information is acquired if the picture file has the global color table information, and the local color table information is not acquired if the picture file has only the local color table information. The image conversion unit 31 further converts each image frame in the picture file into the YUV data.

FIG. 31 is a schematic structural diagram of another image conversion unit according to an embodiment of the present application. As shown in FIG. 31, the image conversion unit 31 may include an image decoding subunit 311 and an image conversion subunit 312.

The image decoding subunit 311 is configured to decode an original picture file to generate the picture header information data segment of the picture file and RGB data corresponding to each image frame in the picture file.

During specific implementation, the image decoding subunit 311 may decode the original picture file. It may be understood that the global color table information includes an RGB value of each pixel in each image frame in the picture file. All images included in some picture files share the global color table information, and each image frame in some other picture files has respective local color table information. The image decoding subunit 311 may further determine whether the color table information of the picture file is the global color table information of the picture file.

The image decoding subunit 311 may generate the picture header information data segment that includes delay information, a total number of frames, the global color table information, and the like when it is determined that the color table information of the picture file is the global color table information of the picture file. The delay information records a play interval between image frames in the picture file. The total number of frames is a quantity of image frames in the picture file. In addition, the image decoding subunit 311 further generates the RGB data corresponding to each image frame in the picture file.

The image decoding subunit 311 may generate the picture header information data segment that includes delay information, a total number of frames, and the like when it is determined that the color table information of the picture file is not the global color table information of the picture file. The delay information records a play interval between image frames in the picture file. The total number of frames is a quantity of image frames in the picture file. In addition, the image decoding subunit 311 further generates the RGB data corresponding to each image frame in the picture file.

The image conversion subunit 312 is configured to convert the RGB data into the YUV data by using color space conversion formulas.

During specific implementation, the image conversion subunit 312 may convert the RGB data into the YUV data by using color space conversion formulas. During the conversion of the RGB data into the YUV data, color space conversion formulas in which a domain range of a luminance component is [16, 235] and a domain range of a chrominance component is [16, 240] may be selected. Because the ranges are reduced, the YUV data obtained after conversion can have a greatly reduced amount of data but has relatively severe distortion. Alternatively, color space conversion formulas in which domain ranges of both a luminance component and a chrominance component are [0, 255] may be selected. In this case, the YUV data obtained after conversion can have less severe distortion but has a relatively large amount of data, and the color space conversion formulas in which the domain ranges of both the luminance component and the chrominance component are [0, 255] are:

$$Y=0.299R+0.587G+0.114B;$$

$$U=-0.1687R-0.3313G+0.5B+128; \text{ and}$$

$$V=0.5R-0.4187G-0.0813B+128, \text{ where}$$

YUV is a video data format, Y is a luminance component, UV is a chrominance component, and raster-scan processing may be performed on pixels in each image frame by using the color space conversion formulas to convert each frame of the RGB data into corresponding YUV data.

The image compression unit 32 is configured to encode the YUV data to generate data stream.

During specific implementation, the image compression unit 32 may further encode the YUV data to generate the data stream. The encoding may include one or more of predictive coding, transform coding, quantization coding, and entropy coding. For example, the image compression unit 32 may compress the YUV data in IPPP mode. The first frame of the YUV data is an I frame. The I frame is an intra-frame prediction frame. The remaining frames of the YUV data are P frames. The P frame is an inter-frame prediction frame. Therefore, an amount of file data of the picture file can be effectively reduced, and a constant QP mode can further be used to stabilize quality and the like of different frames. The entropy coding may include Huffman coding, arithmetic coding, and the like.

The code stream generation unit 33 is configured to store compressed image data.

During specific implementation, the code stream generation unit 33 may generate the compressed image data. The code stream generation unit 33 may store the compressed image data. The compressed image data includes the picture header information data segment and the data stream.

The information acquisition unit 34 is configured to parse the compressed image data to acquire the picture header information data segment and the data stream.

During specific implementation, the information acquisition unit 34 may parse the compressed image data to acquire the picture header information data segment and the data stream in the compressed image data.

The image encoding unit 35 is configured to: generate the YUV data according to the data stream, and process the YUV data based on the picture header information data segment to generate the picture file.

During specific implementation, the image encoding unit 35 decodes the data stream to generate the YUV data, and encodes the YUV data based on the delay information, the total number of frames, the global color table information, and the like in the picture header information data segment to generate the picture file.

FIG. 32 is a schematic structural diagram of another image encoding unit according to an embodiment of the present application. As shown in FIG. 32, the image encoding unit 35 may include an image conversion subunit 351, a pixel update subunit 352, and an image encoding subunit 353.

The image conversion subunit 351 is configured to: decode the data stream to generate the YUV data, and convert the YUV data into the RGB data by using the color space conversion formulas.

During specific implementation, the image conversion subunit 351 decodes the data stream to generate the YUV data, and may convert the YUV data into the RGB data by using the color space conversion formulas. Further, the image conversion subunit 351 needs to determine used color space conversion formulas according to a domain range of a luminance component. It may be understood that for YUV data in a YUV444 mode, color space conversion formulas in which a domain range of a luminance component is [16, 235] and a domain range of a chrominance component is [16, 240] may be selected, or color space conversion formulas in which domain ranges of both a luminance component and a chrominance component are [0, 255] may be selected. Specifically, the selected color space conversion formulas may correspond to the color space conversion formulas selected to convert the RGB data into the YUV data in the foregoing embodiments. It should be noted that the chrominance includes a sample matrix of either of two color difference signals Cb and Cr or a single sample in the sample matrix. Upsampling processing needs to be separately performed on the two color difference signals in a same manner. Cb corresponds to U in YUV, and Cr corresponds to V in YUV.

If the domain range of the luminance component is [16, 235] and the domain range of the chrominance component is [16, 240], the color space conversion formulas are:

$R = \text{Clip3}(0, 255, (298*Y + 409*(Cr-128) + 128) >> 8);$ $G = \text{Clip3}(0, 255, (298*Y - 100*(Cb-128) + 208*(Cr-128) + 128) >> 8);$ and $B = \text{Clip3}(0, 255, (298*Y + 516*(Cb-128) + 128) >> 8),$ where "+128" is used for rounding the value of R, the value of B, and the value of G, and ">>8" represents division by the eighth power of 2.

If the domain ranges of the luminance component and the chrominance component are both [0, 255], the color space conversion formulas are:

$R = \text{Clip3}(0, 255, Y + (359*(Cr-128) + 128) >> 8);$ $G = \text{Clip3}(0, 255, Y - (88*(Cb-128) + 183*(Cr-128) + 128) >> 8);$ and $B = \text{Clip3}(0, 255, Y + (454*(Cb-128) + 128) >> 8),$ where "+128" is used for rounding the value of R, the value of B, and the value of G, and ">>8" represents division by the eighth power of 2.

Raster-scan processing may be performed on pixels in each image frame by using the color space conversion formulas to convert each frame of the YUV data into corresponding RGB data.

The pixel update subunit 352 is configured to update an RGB value of each pixel in the RGB data by using the global color table information.

During specific implementation, the pixel update subunit 352 determines whether the picture header information data segment includes the global color table information of the picture file. Because the YUV data is encoded previously, the RGB data obtained by converting the YUV data is distorted, and the picture file processing device 3 may update the RGB value of each pixel in the RGB data by using the global color table information. It may be understood that the RGB data may include one or more pixels. When the RGB data has only one pixel, the RGB value of the pixel may be updated by using the global color table information. When the RGB data has a plurality of pixels, the RGB value of each of the plurality of pixels may be updated by using the global color table information. The pixel update subunit 352 needs to train the global color table information again to generate local color table information that meets the RGB data. The pixel update subunit 352 may generate initial color table information if there is no global color table information, and train the initial color table information to generate the local color table information that meets the RGB data.

In a first implementation, the pixel update subunit 352 may train the global color table information by using the RGB value of each pixel in the RGB data to generate the local color table information of the RGB data when the RGB data is the first image frame in the picture file and the picture header information data segment has the global color table information, and update the RGB value of each pixel by using the local color table information of the RGB data.

Further, the pixel update subunit 352 may sort at least one source RGB value in the global color table information in a preset sorting manner (for example, ascending order or descending order) of the G component to generate trained color table information when the RGB data is the first image frame in the picture file and the picture header information data segment has the global color table information. Referring together to FIG. 3, as shown in FIG. 3, the global color table information includes a color index and a source RGB value, for example: 5, (8, 1, 10); 6, (8, 9, 8); 7, (1, 7, 6); 8, (10, 8, 6); 9, (5, 8, 5); 10, (9, 10, 1). The trained color table information may be generated through sorting in ascending order of the G component, for example: 5, (8, 1, 10); 6, (1, 7, 6); 7, (5, 8, 5); 8, (10, 8, 6); 9, (8, 9, 8); 10, (9, 10, 1).

The pixel update subunit 352 acquires, from the trained color table information, a first source RGB value in which the G component is closest to the G component of a current pixel in the RGB data, and acquires a first color index of the first source RGB value. It may be understood that the pixel update subunit 352 may traverse source RGB values in the trained color table information by using the G component of the current pixel to acquire the first source RGB value having the closest G component. Referring together to FIG. 4, it is assumed that the first frame of the RGB data has four pixels, the current pixel is the first pixel in the RGB data, and an RGB value of the current pixel is (9, 9, 9). It may be found from the trained color table information that the G component in (8, 9, 8) is closest to the G component in the RGB value of the current pixel. (8, 9, 8) is determined as the first source RGB value, and it is acquired that a first color index of the first source RGB value is "9".

The pixel update subunit 352 acquires, from the trained color table information in a preset range with the first color index being the center, a second source RGB value having the smallest difference from the RGB value of the current pixel, and acquires a second color index of the second source RGB value. It may be understood that the pixel update subunit 352 may acquire a plurality of source RGB values in the preset range with the first color index being the center, calculate respectively differences of the first source RGB value and the plurality of source RGB values from the RGB value of the current pixel, and determine one of the plurality of source RGB values that has the smallest difference as the second source RGB value. According to the foregoing example, it is assumed that the preset range is a range of the center minus 1 to the center plus 1. "9" is the center, two source RGB values (10, 8, 6) and (9, 10, 1) are acquired, and difference values of (10, 8, 6), (8, 9, 8), and (9, 10, 1) from (9, 9, 9) are calculated respectively. A difference value of the source RGB value with the color index being "8" is |9−10|+|9−8|+|9−6|=5, a difference value of the source RGB value with the color index being "9" is |9−8|+|9−9|+|9−8|=2, and a difference value of the source RGB value with the color index being "10" is |9−9|+|9−10|+|9−1|=9. It is determined that the source RGB value (8, 9, 8) is the second source RGB value, and it is acquired that a second color index of the second source RGB value is "9". It may be understood that the first source RGB value and the first color index acquired in the foregoing may be respectively the same as or different from the second source RGB value and the second color index, depending specifically on an actual execution process.

The pixel update subunit 352 replaces the second source RGB value with the RGB value of the current pixel, and changes the plurality of source RGB values in a preset range with the second color index being the center in the trained color table information by using a preset weight value and the RGB value of the current pixel. Referring together to FIG. 5, according to the foregoing example, the second source RGB value is (8, 9, 8), and (8, 9, 8) is replaced with the RGB value (9, 9, 9) of the current pixel. In addition, the plurality of source RGB values in the preset range with the second color index being the center may be changed according to the preset weight value and the RGB value of the current pixel. Assuming that the preset range is a range of the center minus 1 to the center plus 1, two source RGB values (10, 8, 6) and (9, 10, 1) need to be changed. The preset weight value may be a dynamic weight value. A source RGB value whose color index is closer to the second color index is affected more significantly by the RGB value of the current pixel. It is assumed that the current distribution of weight values is 2:8. (10, 8, 6) is changed by using (9, 9, 9), for example, the R component=9*0.8+10*0.2=9.2, the G component=9*0.8+8*0.2=8.8, and the B component=9*0.8+6*0.2=8.4. The foregoing results are rounded, so that it is determined that the source RGB value with the color index "8" is changed from (10, 8, 6) into (9, 9, 8). Similarly, the source RGB value with the color index "10" is changed from (9, 10, 1) into (9, 9, 7).

The picture file processing device 3 acquires the changed trained color table information when the current pixel is not the last pixel in the RGB data, for example, when the current pixel is the first pixel in the RGB data shown in FIG. 4 or FIG. 5, uses a next pixel of the current pixel as a current pixel, and starts to acquire, from the trained color table information, a first source RGB value in which the G component is closest to the G component of a current pixel in the RGB data. For example, the second pixel in the RGB data is used as the current pixel, and the changed trained color table information is then trained again. For a specific training process, refer to the foregoing description of the training process. Details are not described herein.

The pixel update subunit 352 acquires the changed trained color table information when the current pixel is the last pixel in the RGB data, for example, when the current pixel is the fourth pixel in the RGB data shown in FIG. 4 or FIG. 5, and determines the trained color table information as the local color table information of the RGB data.

The pixel update subunit 352 may update the RGB value of each pixel by using the local color table information of the RGB data. Further, the pixel update subunit 352 may sequentially acquire, from the local color table information of the RGB data, a source RGB value with an RGB value that is the same as or has the smallest difference from the RGB value of each pixel to replace the RGB value of the pixel. In some embodiments, the pixel update subunit 352 may use a color index corresponding to a source RGB value with an RGB value that is the same as or has the smallest difference from the RGB value of each pixel to replace the RGB value of the pixel. Referring together to FIG. 6, according to the foregoing example, the RGB value of the first pixel in the RGB data is (9, 9, 9), and (9, 9, 8) in the local color table information has the smallest difference from (9, 9, 9), so that the color index "8" corresponding to (9, 9, 8) is used to replace the RGB value of the first pixel. Similarly, the color index of the second pixel is "10", the color index of the third pixel is "9", and the color index of the fourth pixel is "6".

In a second implementation, the pixel update subunit 352 may train the initial color table information by using the RGB value of each pixel in the RGB data to generate the local color table information of the RGB data when the RGB data is the first image frame in the picture file and the picture header information data segment does not have the global color table information, and update the RGB value of each pixel by using the local color table information of the RGB data.

Further, the pixel update subunit 352 may generate one piece of initial color table information, for example, (0, 0, 0), (1, 1, 1), (2, 2, 2), . . . , and (255, 255, 255), when the RGB data is the first image frame in the picture file and the picture header information data segment does not have the global color table information. The picture file processing device 3 acquires, from the initial color table information, a third source RGB value in which the G component is closest to the G component of the current pixel in the RGB data, and acquires a third color index of the third source RGB value. The pixel update subunit 352 acquires, from the initial color table information in a preset range with the third color index being the center, a fourth source RGB value having the smallest difference from the RGB value of the current pixel, and acquires a fourth color index of the fourth source RGB value. The pixel update subunit 352 replaces the fourth source RGB value with the RGB value of the current pixel, and changes the plurality of source RGB values in a preset range with the fourth color index being the center in the initial color table information by using a preset weight value and the RGB value of the current pixel. The pixel update subunit 352 acquires the changed initial color table information when the current pixel is not the last pixel in the RGB data, uses a next pixel of the current pixel as a current pixel, and starts to acquire, from the initial color table information, the third source RGB value in which the G component is closest to the G component of the current pixel in the RGB data. The pixel update subunit 352 acquires changed trained color table information when the current pixel is the last pixel in the RGB data, and determines the initial color table information as the local color table information of the RGB data. The pixel update subunit 352 may update the RGB value of each pixel by using the local color table information of the RGB data. It should be noted that for both the processes of training the initial color table information and updating the RGB value of each pixel by using the local color table information of the RGB data in the second implementation, refer to the foregoing execution process in the first implementation. Details are not described herein.

In a third implementation, if the RGB data is not the first image frame in the picture file, to be specific, the RGB data is an $N^{th}$ image frame in the picture file, where N is a positive integer greater than 1 and less than or equal to the total number of frames, the pixel update subunit 352 may train local color table information of an $(N-1)^{th}$ frame of the RGB data by using the RGB value of each pixel in the RGB data to generate local color table information of the RGB data, and update the RGB value of each pixel by using the local color table information of the RGB data.

Further, the pixel update subunit 352 may sort at least one source RGB value in the local color table information of the $(N-1)^{th}$ frame of the RGB data in a preset sorting manner of the G component to generate trained color table information when the RGB data is the $N^{th}$ image frame in the picture file. The pixel update subunit 352 acquires, from the trained color table information, a fifth source RGB value in which the G component is closest to the G component of the current pixel in the RGB data, and acquires a fifth color index of the fifth source RGB value. The pixel update subunit 352 acquires, from the trained color table information in a preset range with the fifth color index being the center, a sixth source RGB value having the smallest difference from the RGB value of the current pixel, and acquires a sixth color index of the sixth source RGB value. The pixel update subunit 352 replaces the sixth source RGB value with the RGB value of the current pixel, and changes the plurality of source RGB values in a preset range with the sixth color index being the center in the trained color table information by using a preset weight value and the RGB value of the current pixel. The pixel update subunit 352 acquires the changed trained color table information when the current pixel is not the last pixel in the RGB data, uses a next pixel of the current pixel as a current pixel, and starts to acquire, from the trained color table information, the fifth source RGB value in which the G component is closest to the G component of the current pixel in the RGB data. The pixel update subunit 352 acquires the changed trained color table information when the current pixel is the last pixel in the RGB data, and determines the trained color table information as the local color table information of the RGB data. The pixel update subunit 352 may update the RGB value of each pixel by using the local color table information of the RGB data. It should be noted that for both the processes of training the trained color table information and updating the RGB value of each pixel by using the local color table information of the RGB data in the third implementation, refer to the foregoing execution process in the first implementation. Details are not described herein.

It should be noted that the foregoing use of the G component as a guide for training of the color table information is merely an example. In this embodiment of the present application, the R component or the B component may be similarly used to guide the training of the color table information. For an execution process, refer to the description in the foregoing content. Details are not described herein. The first source RGB value, the second source RGB value, the third source RGB value, the fourth source RGB value, the fifth source RGB value, and the sixth source RGB value may represent the same meaning of a source RGB value, and the first color index, the second color index, the third color index, the fourth color index, the fifth color index, and the sixth color index may represent the same meaning of a color index. Such a naming manner is merely used to distinguish between different execution scenarios, for example, the foregoing three execution scenarios in which the RGB data is the first image frame in the picture file and the picture header information data segment has the global color table information, the RGB data is the first image frame in the picture file and the picture header information data segment does not have the global color table information, and the RGB data is the $N^{th}$ image frame in the picture file.

The image encoding subunit 353 is configured to perform image encoding on the updated RGB data by using the delay information and the total number of frames to generate the picture file.

During specific implementation, the image encoding subunit 353 performs image encoding on the updated RGB data by using the delay information and the total number of frames to generate the picture file. In some embodiments, the image encoding subunit 353 may perform image encoding on the color index of each pixel in the RGB data based on the delay information and the total number of frames and by using LZW encoding to generate the picture file. The picture file processing device 3 may store or present the picture file. It may be understood that a scheme of the image encoding is specifically determined by an image format of the picture file. For example, the image encoding may be GIF encoding or the like if the picture file that needs to be generated is a GIF image.

In this embodiment of the present application, a picture header information data segment of an original picture file is generated according to the picture file, each image frame in the picture file is converted into YUV data, compressed image data is then generated based on the picture header information data segment and data stream that is obtained by encoding the YUV data, and the compressed image data is transmitted. The YUV data may be generated according to the data stream when the compressed image data is received, and the YUV data is then processed based on the picture header information data segment to generate the picture file. Each image frame in the picture file having a relatively large amount of file data is converted into the YUV data having a relatively small amount of data, and the YUV data is then encoded to obtain the data stream, so that an amount of file data of the picture file during transmission is greatly reduced, and bandwidth costs are reduced. The use of a configuration parameter is flexibly controlled, and an encoder complexity is configured, so that different service scenarios and different machine performance can be satisfied, and the efficiency of encoding the picture file is optimized. Global color table information or initial color table information is trained to generate local color table information of the RGB data, so that image distortion is effectively reduced. The G component is used to acquire a source RGB value having the closest G component, a search for a color index is made in a small range in the color table information, and it is not necessary to traverse all the color table information, so that the complexity of training the local color table information can be lowered, thereby further improving the efficiency of encoding the picture file.

Figure 33:
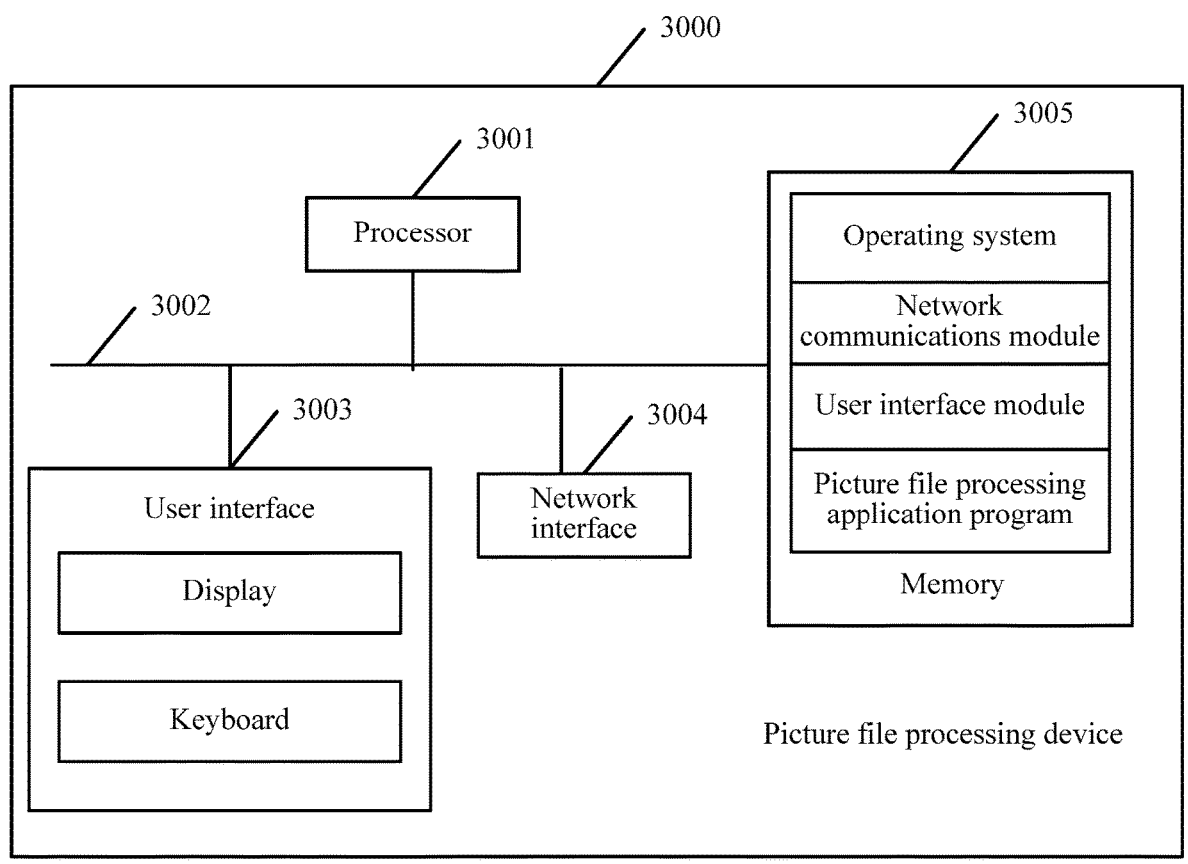
FIG. 33 is a schematic structural diagram of still another picture file processing device according to an embodiment of the present application.

FIG. 33 is a schematic structural diagram of still another picture file processing device according to an embodiment of the present application. As shown in FIG. 33, a picture file processing device 3000 may include at least one processor 3001 such as a CPU, at least one network interface 3004, a user interface 3003, a memory 3005, at least one communications bus 3002. The communications bus 3002 is configured to implement connection communication between these components. The user interface 3003 may include a display and a keyboard. The user interface 3003 may further include a standard wired interface and wireless interface. The network interface 3004 may include a standard wired interface and wireless interface (for example, a Wi-Fi interface). The memory 3005 may be a high-speed RAM, or may be a non-volatile memory, for example, at least one magnetic disk memory. The memory 3005 may further be at least one storage apparatus located far away from the processor 3001. As shown in FIG. 33, the memory 3005 used as a computer storage medium may include an operating system, a network communications module, a user interface module, and a picture file processing application program.

In the picture file processing device 3000 shown in FIG. 33, the network interface 3004 is mainly configured to connect functional modules in a distributed service device, and perform data communication with the functional modules. The user interface 3003 is mainly configured to provide a user with an interface for input to acquire data input by the user. The processor 3001 may be configured to invoke the picture file processing application program stored in the memory 3005 to specifically perform the following steps:

generating a picture header information data segment of an original picture file according to the picture file, and converting each image frame in the picture file into YUV data;

encoding the YUV data to generate data stream;

storing compressed image data, the compressed image data including the picture header information data segment and the data stream;

parsing the compressed image data to acquire the picture header information data segment and the data stream; and decoding the data stream to generate the YUV data, and encoding the YUV data based on the picture header information data segment to generate the picture file.

In an embodiment, when generating the picture header information data segment of the original picture file according to the picture file, and converting each image frame in the picture file into the YUV data, the processor 3001 specifically performs the following steps:

decoding the original picture file to generate the picture header information data segment of the picture file and RGB data corresponding to each image frame in the picture file, where the picture header information data segment includes delay information, a total number of frames, and global color table information; and converting the RGB data into the YUV data by using color space conversion formulas.

In an embodiment, the encoding includes one or more of predictive coding, transform coding, quantization coding, and entropy coding.

In an embodiment, when encoding the YUV data to generate the data stream, the processor 3001 specifically performs the following step:

encoding the YUV data by using a configuration parameter to generate the data stream, where the configuration parameter is a parameter for encoding the YUV data, and the configuration parameter includes any one of a standard definition mode parameter, a high definition mode parameter, and a lossless mode parameter.

In an embodiment, when encoding the YUV data to generate the data stream, the processor 3001 specifically performs the following step:

configuring an encoder complexity to encode the YUV data to generate the data stream, where the encoder complexity is an encoding fineness parameter determined according to hardware performance of a transmitter.

In an embodiment, when decoding the data stream to generate the YUV data, and encoding the YUV data based on the picture header information data segment to generate the picture file, the processor 3001 specifically performs the following steps:

decoding the data stream to generate the YUV data, and converting the YUV data into the RGB data by using the color space conversion formulas;

updating an RGB value of each pixel in the RGB data by using the global color table information; and performing image encoding on the updated RGB data by using the delay information and the total number of frames to generate the picture file.

In an embodiment, when updating the RGB value of each pixel in the RGB data by using the global color table information, the processor 3001 specifically performs the following steps:

training the global color table information by using the RGB value of each pixel in the RGB data to generate local color table information of the RGB data when the RGB data is the first image frame in the picture file and the picture header information data segment has the global color table information, and updating the RGB value of each pixel by using the local color table information of the RGB data.

In an embodiment, when training the global color table information by using the RGB value of each pixel in the RGB data to generate the local color table information of the RGB data, the processor 3001 specifically performs the following steps:

sorting at least one source RGB value in the global color table information in a preset sorting manner of the G component to generate trained color table information;

acquiring, from the trained color table information, a first source RGB value in which the G component is closest to the G component of a current pixel in the RGB data, and acquiring a first color index of the first source RGB value;

acquiring, by a receiving device from the trained color table information in a preset range with the first color index being the center, a second source RGB value having the smallest difference from the RGB value of the current pixel, and acquiring a second color index of the second source RGB value;

replacing the second source RGB value with the RGB value of the current pixel, and changing a plurality of source RGB values in a preset range with the second color index being the center in the trained color table information by using a preset weight value and the RGB value of the current pixel;

acquiring the changed trained color table information when the current pixel is not the last pixel in the RGB data, using a next pixel of the current pixel as a current pixel, and starting to acquire, from the trained color table information, a first source RGB value in which the G component is closest to the G component of a current pixel in the RGB data; and acquiring the changed trained color table information when the current pixel is the last pixel in the RGB data, and determining the trained color table information as the local color table information of the RGB data.

In an embodiment, when updating the RGB value of each pixel in the RGB data by using the global color table information, the processor 3001 specifically performs the following steps:

training initial color table information by using the RGB value of each pixel in the RGB data to generate the local color table information of the RGB data when the RGB data is the first image frame in the picture file and the picture header information data segment does not have the global color table information, and updating the RGB value of each pixel by using the local color table information of the RGB data.

In an embodiment, when training the initial color table information by using the RGB value of each pixel in the RGB data to generate the local color table information of the RGB data, the processor 3001 specifically performs the following steps:

acquiring, from the initial color table information, a third source RGB value in which the G component is closest to the G component of the current pixel in the RGB data, and acquiring the third color index of the third source RGB value;

acquiring, from the initial color table information in a preset range with the third color index being the center, a fourth source RGB value having the smallest difference from the RGB value of the current pixel, and acquiring a fourth color index of the fourth source RGB value;

replacing the fourth source RGB value with the RGB value of the current pixel, and changing a plurality of source RGB values in a preset range with the fourth color index being the center in the initial color table information by using a preset weight value and the RGB value of the current pixel;

acquiring the changed initial color table information when the current pixel is not the last pixel in the RGB data, using a next pixel of the current pixel as a current pixel, and starting to acquire, from the initial color table information, a third source RGB value in which the G component is closest to the G component of the current pixel in the RGB data; and acquiring changed trained color table information when the current pixel is the last pixel in the RGB data, and determining the initial color table information as the local color table information of the RGB data.

In an embodiment, when updating the RGB value of each pixel in the RGB data by using the global color table information, the processor 3001 specifically performs the following steps:

training local color table information of an $(N-1)^{th}$ frame of the RGB data by using the RGB value of each pixel in the RGB data to generate local color table information of the RGB data when the RGB data is an $N^{th}$ image frame in the picture file, and updating the RGB value of each pixel by using the local color table information of the RGB data, where N is a positive integer greater than 1 and less than or equal to the total number of frames.

In an embodiment, when training the local color table information of the $(N-1)^{th}$ frame of the RGB data by using the RGB value of each pixel in the RGB data to generate the local color table information of the RGB data, the processor 3001 specifically performs the following steps:

sorting at least one source RGB value in the local color table information of the $(N-1)^{th}$ frame of the RGB data in a preset sorting manner of the G component to generate trained color table information;

acquiring, from the trained color table information, a fifth source RGB value in which the G component is closest to the G component of the current pixel in the RGB data, and acquiring a fifth color index of the fifth source RGB value;

acquiring, from the trained color table information in a preset range with the fifth color index being the center, a sixth source RGB value having the smallest difference from the RGB value of the current pixel, and acquiring a sixth color index of the sixth source RGB value;

replacing the sixth source RGB value with the RGB value of the current pixel, and changing a plurality of source RGB values in a preset range with the sixth color index being the center in the trained color table information by using a preset weight value and the RGB value of the current pixel;

acquiring the changed trained color table information when the current pixel is not the last pixel in the RGB data, using a next pixel of the current pixel as a current pixel, and starting to acquire, from the trained color table information, a fifth source RGB value in which the G component is closest to the G component of the current pixel in the RGB data; and acquiring the changed trained color table information when the current pixel is the last pixel in the RGB data, and determining the trained color table information as the local color table information of the RGB data.

In an embodiment, the compressed image data includes the picture header information data segment and the data stream.

In this embodiment of the present application, a picture header information data segment of an original picture file is generated according to the picture file, each image frame in the picture file is converted into YUV data, compressed image data is then generated based on the picture header information data segment and data stream that is obtained by encoding the YUV data, and the compressed image data is transmitted. The YUV data may be generated according to the data stream when the compressed image data is received, and the YUV data is then processed based on the picture header information data segment to generate the picture file. Each image frame in the picture file having a relatively large amount of file data is converted into the YUV data having a relatively small amount of data, and the YUV data is then encoded to obtain the data stream, so that an amount of file data of the picture file during transmission is greatly reduced, and bandwidth costs are reduced. The use of a configuration parameter is flexibly controlled, and an encoder complexity is configured, so that different service scenarios and different machine performance can be satisfied, and the efficiency of encoding the picture file is optimized. Global color table information or initial color table information is trained to generate local color table information of the RGB data, so that image distortion is effectively reduced. The G component is used to acquire a source RGB value having the closest G component, a search for a color index is made in a small range in the color table information, and it is not necessary to traverse all the color table information, so that the complexity of training the local color table information can be lowered, thereby further improving the efficiency of encoding the picture file.

Figure 34:
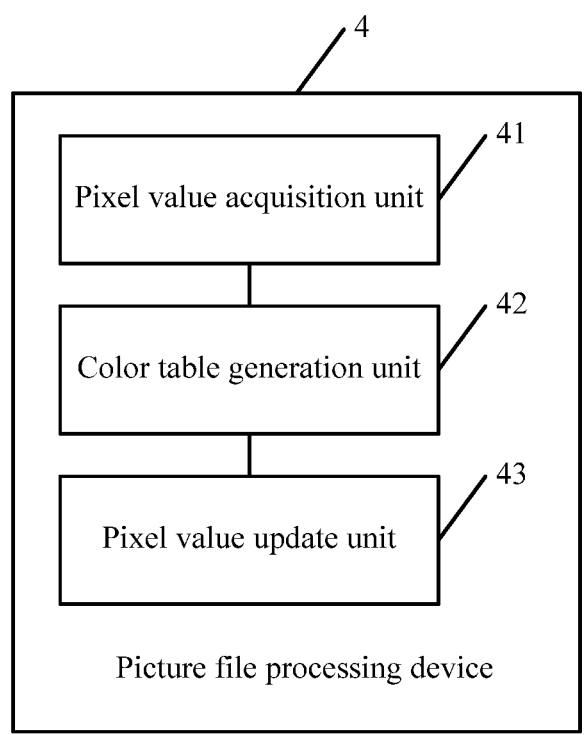
FIG. 34 is a schematic structural diagram of still another picture file processing device according to an embodiment of the present application.
Figure 35:
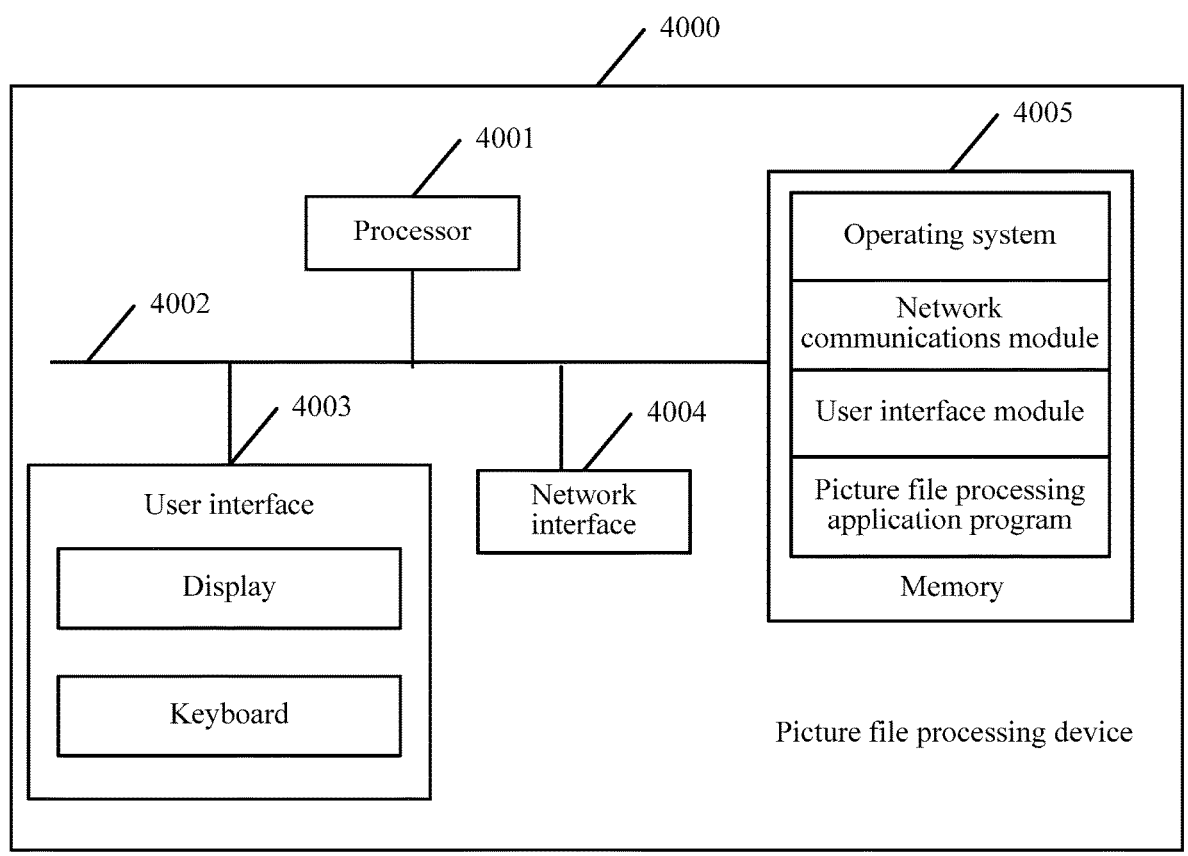
FIG. 35 is a schematic structural diagram of still another picture file processing device according to an embodiment of the present application.

A picture file processing device provided in the embodiments of the present application is described below in detail with reference to FIG. 34 and FIG. 35. It should be noted that the picture file processing device shown in FIG. 34 and FIG. 35 is configured to perform the methods in the embodiments shown in FIG. 17 to FIG. 20 of the present application. For ease of description, only parts related to the embodiments of the present application are shown. For specific technical details that are not disclosed, refer to the embodiments shown in FIG. 17 to FIG. 20 of the present application.

FIG. 34 is a schematic structural diagram of still another picture file processing device according to an embodiment of the present application. As shown in FIG. 34, a picture file processing device 4 in this embodiment of the present application may include a pixel value acquisition unit 41, a color table generation unit 42, and a pixel value update unit 43.

The pixel value acquisition unit 41 is configured to: acquire RGB data generated by processing an original picture file, and acquire an RGB value of each pixel in the RGB data.

During specific implementation, the pixel value acquisition unit 41 may acquire the RGB data generated by decoding the original picture file. It may be understood that the picture file may be decoded to generate a picture header information data segment of the picture file and the RGB data corresponding to each image frame in the picture file. The picture header information data segment may include delay information, a total number of frames, and the like of the picture file. The delay information records a play interval between image frames in the picture file. The total number of frames is a quantity of image frames in the picture file. It may be understood that the picture header information data segment may further include global color table information of the picture file. The global color table information includes the RGB value of each pixel in each image frame. All images included in some picture files share the global color table information, and each image frame in some other picture files has respective local color table information. Therefore, the global color table information is acquired if the picture file has the global color table information, and the local color table information is not acquired if the picture file has only the local color table information. The RGB data may be converted into YUV data, and the YUV data is encoded to generate data stream. Compressed image data that includes the data stream and the picture header information data segment is further generated. The compressed image data may be stored or transmitted to the picture file processing device 4 to restore the picture file. In some embodiments, the pixel value acquisition unit 41 acquires the compressed image data, and may parse the compressed image data to acquire the picture header information data segment and the data stream, and decode the data stream to generate the YUV data. The pixel value acquisition unit 41 further converts the YUV data into the RGB data. The pixel value acquisition unit 41 acquires the RGB data, and acquires the RGB value of each pixel in the RGB data.

The color table generation unit 42 is configured to train initial color table information of the RGB data by using the RGB value of each pixel to generate the local color table information of the RGB data.

During specific implementation, the color table generation unit 42 determines whether the picture header information data segment includes the global color table information of the picture file. Because the YUV data is encoded previously, the RGB data obtained by converting the YUV data is distorted, and the color table generation unit 42 may update the RGB value of each pixel in the RGB data by using the global color table information. It may be understood that the RGB data may include one or more pixels. When the RGB data has only one pixel, the initial color table information may be trained by using the RGB value of the pixel. When the RGB data has a plurality of pixels, the initial color table information may be trained by using the RGB value of each of the plurality of pixels. The color table generation unit 42 needs to train the global color table information again to generate local color table information that meets the RGB data. The color table generation unit 42 may generate the initial color table information if there is no global color table information, and train the initial color table information to generate the local color table information that meets the RGB data.

In a first implementation, when the RGB data is the first image frame in the picture file and the picture header information data segment has the global color table information, the color table generation unit 42 may train the global color table information by using the RGB value of each pixel in the RGB data to generate the local color table information of the RGB data.

Further, the color table generation unit 42 may sort at least one source RGB value in the global color table information in a preset sorting manner (for example, ascending order or descending order) of the G component to generate trained color table information when the RGB data is the first image frame in the picture file and the picture header information data segment has the global color table information. Referring together to FIG. 3, as shown in FIG. 3, the global color table information includes a color index and a source RGB value, for example: 5, (8, 1, 10); 6, (8, 9, 8); 7, (1, 7, 6); 8, (10, 8, 6); 9, (5, 8, 5); 10, (9, 10, 1). The trained color table information may be generated through sorting in ascending order of the G component, for example: 5, (8, 1, 10); 6, (1, 7, 6); 7, (5, 8, 5); 8, (10, 8, 6); 9, (8, 9, 8); 10, (9, 10, 1).

The color table generation unit 42 acquires, from the trained color table information, a first source RGB value in which the G component is closest to the G component of a current pixel in the RGB data, and acquires a first color index of the first source RGB value. It may be understood that the color table generation unit 42 may traverse source RGB values in the trained color table information by using the G component of the current pixel to acquire the first source RGB value having the closest G component. Referring together to FIG. 4, it is assumed that the first frame of the RGB data has four pixels, the current pixel is the first pixel in the RGB data, and an RGB value of the current pixel is (9, 9, 9). It may be found from the trained color table information that the G component in (8, 9, 8) is closest to the G component in the RGB value of the current pixel. (8, 9, 8) is determined as the first source RGB value, and it is acquired that a first color index of the first source RGB value is "9".

The color table generation unit 42 acquires, from the trained color table information in a preset range with the first color index being the center, a second source RGB value having the smallest difference from the RGB value of the current pixel, and acquires a second color index of the second source RGB value. It may be understood that the color table generation unit 42 may acquire a plurality of source RGB values in a preset range with the first color index being the center, calculate respectively differences of the first source RGB value and the plurality of source RGB values from the RGB value of the current pixel, and determine one of the plurality of source RGB values that has the smallest difference as the second source RGB value. According to the foregoing example, it is assumed that the preset range is a range of the center minus 1 to the center plus 1. "9" is the center, two source RGB values (10, 8, 6) and (9, 10, 1) are acquired, and difference values of (10, 8, 6), (8, 9, 8), and (9, 10, 1) from (9, 9, 9) are calculated respectively. A difference value of the source RGB value with the color index being "8" is |9−10|+|9−8|+|9−6|=5, a difference value of the source RGB value with the color index being "9" is |9−8|+|9−9|+|9−8|=2, and a difference value of the source RGB value with the color index being "10" is |9−9|+|9−10|+|9−1|=9. It is determined that the source RGB value (8, 9, 8) is the second source RGB value, and it is acquired that a second color index of the second source RGB value is "9". It may be understood that the first source RGB value and the first color index acquired in the foregoing may be respectively the same as or different from the second source RGB value and the second color index, depending specifically on an actual execution process.

The color table generation unit 42 replaces the second source RGB value with the RGB value of the current pixel, and changes the plurality of source RGB values in a preset range with the second color index being the center in the trained color table information by using a preset weight value and the RGB value of the current pixel. Referring together to FIG. 5, according to the foregoing example, the second source RGB value is (8, 9, 8), and (8, 9, 8) is replaced with the RGB value (9, 9, 9) of the current pixel. In addition, the plurality of source RGB values in the preset range with the second color index being the center may be changed according to the preset weight value and the RGB value of the current pixel. Assuming that the preset range is a range of the center minus 1 to the center plus 1, two source RGB values (10, 8, 6) and (9, 10, 1) need to be changed. The preset weight value may be a dynamic weight value. A source RGB value whose color index is closer to the second color index is affected more significantly by the RGB value of the current pixel. It is assumed that the current distribution of weight values is 2:8. (10, 8, 6) is changed by using (9, 9, 9), for example, the R component=9*0.8+10*0.2=9.2, the G component=9*0.8+8*0.2=8.8, and the B component=9*0.8+6*0.2=8.4. The foregoing results are rounded, so that it is determined that the source RGB value with the color index "8" is changed from (10, 8, 6) into (9, 9, 8). Similarly, the source RGB value with the color index "10" is changed from (9, 10, 1) into (9, 9, 7).

The color table generation unit 42 acquires the changed trained color table information when the current pixel is not the last pixel in the RGB data, for example, when the current pixel is the first pixel in the RGB data shown in FIG. 4 or FIG. 5, uses a next pixel of the current pixel as a current pixel, and starts to acquire, from the trained color table information, a first source RGB value in which the G component is closest to the G component of a current pixel in the RGB data. For example, the second pixel in the RGB data is used as the current pixel, and the changed trained color table information is then trained again. For a specific training process, refer to the foregoing description of the training process. Details are not described herein.

The color table generation unit 42 acquires the changed trained color table information when the current pixel is the last pixel in the RGB data, for example, when the current pixel is the fourth pixel in the RGB data shown in FIG. 4 or FIG. 5, and determines the trained color table information as the local color table information of the RGB data.

In a second implementation, the color table generation unit 42 may train the initial color table information by using the RGB value of each pixel in the RGB data to generate the local color table information of the RGB data when the RGB data is the first image frame in the picture file and the picture header information data segment does not have the global color table information.

Further, the color table generation unit 42 may generate one piece of initial color table information, for example, (0, 0, 0), (1, 1, 1), (2, 2, 2), . . . , and (255, 255, 255), when the RGB data is the first image frame in the picture file and the picture header information data segment does not have the global color table information. The color table generation unit 42 acquires, from the initial color table information, a third source RGB value in which the G component is closest to the G component of the current pixel in the RGB data, and acquires a third color index of the third source RGB value. The color table generation unit 42 acquires, from the initial color table information in a preset range with the third color index being the center, a fourth source RGB value having the smallest difference from the RGB value of the current pixel, and acquires a fourth color index of the fourth source RGB value. The color table generation unit 42 replaces the fourth source RGB value with the RGB value of the current pixel, and changes the plurality of source RGB values in a preset range with the fourth color index being the center in the initial color table information by using a preset weight value and the RGB value of the current pixel. The color table generation unit 42 acquires the changed initial color table information when the current pixel is not the last pixel in the RGB data, uses a next pixel of the current pixel as a current pixel, and starts to acquire, from the initial color table information, the third source RGB value in which the G component is closest to the G component of the current pixel in the RGB data. The color table generation unit 42 acquires changed trained color table information when the current pixel is the last pixel in the RGB data, and determines the initial color table information as the local color table information of the RGB data. It should be noted that for the process of training the initial color table information in the second implementation, refer to the foregoing execution process in the first implementation. Details are not described herein.

In a third implementation, if the RGB data is not the first image frame in the picture file, to be specific, the RGB data is an $N^{th}$ image frame in the picture file, where N is a positive integer greater than 1 and less than or equal to the total number of frames, the color table generation unit 42 may train local color table information of an $(N-1)^{th}$ frame of the RGB data by using the RGB value of each pixel in the RGB data to generate local color table information of the RGB data.

Further, the color table generation unit 42 may sort at least one source RGB value in the local color table information of the $(N-1)^{th}$ frame of the RGB data in a preset sorting manner of the G component to generate trained color table information when the RGB data is the $N^{th}$ image frame in the picture file. The color table generation unit 42 acquires, from the trained color table information, a fifth source RGB value in which the G component is closest to the G component of the current pixel in the RGB data, and acquires a fifth color index of the fifth source RGB value. The color table generation unit 42 acquires, from the trained color table information in a preset range with the fifth color index being the center, a sixth source RGB value having the smallest difference from the RGB value of the current pixel, and acquires a sixth color index of the sixth source RGB value. The color table generation unit 42 replaces the sixth source RGB value with the RGB value of the current pixel, and changes the plurality of source RGB values in a preset range with the sixth color index being the center in the trained color table information by using a preset weight value and the RGB value of the current pixel. The color table generation unit 42 acquires the changed trained color table information when the current pixel is not the last pixel in the RGB data, uses a next pixel of the current pixel as a current pixel, and starts to acquire, from the trained color table information, the fifth source RGB value in which the G component is closest to the G component of the current pixel in the RGB data. The color table generation unit 42 acquires the changed trained color table information when the current pixel is the last pixel in the RGB data, and determines the trained color table information as the local color table information of the RGB data. It should be noted that for the training of the trained color table information in the third implementation, refer to the foregoing execution process in the first implementation. Details are not described herein.

It should be noted that the foregoing use of the G component as a guide for training of the color table information is merely an example. In this embodiment of the present application, the R component or the B component may be similarly used to guide the training of the color table information. For an execution process, refer to the description in the foregoing content. Details are not described herein. The first source RGB value, the second source RGB value, the third source RGB value, the fourth source RGB value, the fifth source RGB value, and the sixth source RGB value may represent the same meaning of a source RGB value, and the first color index, the second color index, the third color index, the fourth color index, the fifth color index, and the sixth color index may represent the same meaning of a color index. Such a naming manner is merely used to distinguish between different execution scenarios, for example, the foregoing three execution scenarios in which the RGB data is the first image frame in the picture file and the picture header information data segment has the global color table information, the RGB data is the first image frame in the picture file and the picture header information data segment does not have the global color table information, and the RGB data is the $N^{th}$ image frame in the picture file.

The pixel value update unit 43 is configured to update the RGB value of each pixel by using the local color table information of the RGB data.

During specific implementation, the pixel value update unit 43 may update the RGB value of each pixel in the RGB data by using the local color table information of the RGB data. The picture file processing device 4 performs image encoding on the updated RGB data by using the delay information and the total number of frames to generate the picture file. It may be understood that a scheme of the image encoding is specifically determined by an image format of the picture file. For example, the image encoding may be GIF encoding or the like if the picture file that needs to be generated is a GIF image.

In this embodiment of the present application, global color table information or initial color table information is trained to generate local color table information of RGB data, so that image distortion is effectively reduced. A G component is used to acquire a source RGB value having the closest G component, a search for a color index is made in a small range in the color table information, and it is not necessary to traverse all the color table information, so that the complexity of training the local color table information can be lowered, thereby further improving the efficiency of encoding the picture file.

FIG. 35 is a schematic structural diagram of still another picture file processing device according to an embodiment of the present application. As shown in FIG. 35, a picture file processing device 4000 may include at least one processor 4001 such as a CPU, at least one network interface 4004, a user interface 4003, a memory 4005, at least one communications bus 4002. The communications bus 4002 is configured to implement connection communication between these components. The user interface 4003 may include a display and a keyboard. The user interface 4003 may further include a standard wired interface and wireless interface. The network interface 4004 may include a standard wired interface and wireless interface (for example, a Wi-Fi interface). The memory 4005 may be a high-speed RAM, or may be a non-volatile memory, for example, at least one magnetic disk memory. The memory 4005 may further be at least one storage apparatus located far away from the processor 4001. As shown in FIG. 35, the memory 4005 used as a computer storage medium may include an operating system, a network communications module, a user interface module, and a picture file processing application program.

In the picture file processing device 4000 shown in FIG. 35, the network interface 4004 is mainly configured to connect a transmitter and perform data communication with the transmitter. The user interface 4003 is mainly configured to provide a user with an interface for input to acquire data input by the user. The processor 4001 may be configured to invoke the picture file processing application program stored in the memory 4005 to specifically perform the following steps:

acquiring RGB data generated by processing an original picture file, and acquiring an RGB value of each pixel in the RGB data;

training initial color table information of the RGB data by using the RGB value of each pixel to generate local color table information of the RGB data; and updating the RGB value of each pixel by using the local color table information of the RGB data.

In an embodiment, when training the initial color table information of the RGB data by using the RGB value of each pixel to generate the local color table information of the RGB data, the processor 4001 specifically performs the following step:

training global color table information by using the RGB value of each pixel in the RGB data to generate the local color table information of the RGB data when the RGB data is the first image frame in the picture file and a picture header information data segment generated by decoding the picture file has the global color table information.

In an embodiment, when training the global color table information by using the RGB value of each pixel in the RGB data to generate the local color table information of the RGB data, the processor 4001 specifically performs the following steps:

sorting at least one source RGB value in the global color table information in a preset sorting manner of the G component to generate trained color table information;

acquiring, from the trained color table information, a first source RGB value in which the G component is closest to the G component of a current pixel in the RGB data, and acquiring a first color index of the first source RGB value;

acquiring, from the trained color table information in a preset range with the first color index being the center, a second source RGB value having the smallest difference from the RGB value of the current pixel, and acquiring a second color index of the second source RGB value;

replacing the second source RGB value with the RGB value of the current pixel, and changing a plurality of source RGB values in a preset range with the second color index being the center in the trained color table information by using a preset weight value and the RGB value of the current pixel;

acquiring the changed trained color table information when the current pixel is not the last pixel in the RGB data, using a next pixel of the current pixel as a current pixel, and starting to acquire, from the trained color table information, a first source RGB value in which the G component is closest to the G component of a current pixel in the RGB data; and acquiring the changed trained color table information when the current pixel is the last pixel in the RGB data, and determining the trained color table information as the local color table information of the RGB data.

In an embodiment, when training the initial color table information of the RGB data by using the RGB value of each pixel to generate the local color table information of the RGB data, the processor 4001 specifically performs the following step:

training the initial color table information by using the RGB value of each pixel in the RGB data to generate the local color table information of the RGB data when the RGB data is the first image frame in the picture file and a picture header information data segment generated by decoding the picture file does not have the global color table information.

In an embodiment, when training the initial color table information by using the RGB value of each pixel in the RGB data to generate the local color table information of the RGB data, the processor 4001 specifically performs the following steps:

acquiring, from the initial color table information, a third source RGB value in which the G component is closest to the G component of the current pixel in the RGB data, and acquiring the third color index of the third source RGB value;

acquiring, from the initial color table information in a preset range with the third color index being the center, a fourth source RGB value having the smallest difference from the RGB value of the current pixel, and acquiring a fourth color index of the fourth source RGB value;

replacing the fourth source RGB value with the RGB value of the current pixel, and changing a plurality of source RGB values in a preset range with the fourth color index being the center in the initial color table information by using a preset weight value and the RGB value of the current pixel;

acquiring the changed initial color table information when the current pixel is not the last pixel in the RGB data, using a next pixel of the current pixel as a current pixel, and starting to acquire, from the initial color table information, a third source RGB value in which the G component is closest to the G component of the current pixel in the RGB data; and acquiring changed trained color table information when the current pixel is the last pixel in the RGB data, and determining the initial color table information as the local color table information of the RGB data.

In an embodiment, when training the initial color table information of the RGB data by using the RGB value of each pixel to generate the local color table information of the RGB data, the processor 4001 specifically performs the following step:

training local color table information of an $(N-1)^{th}$ frame of the RGB data by using the RGB value of each pixel in the RGB data to generate local color table information of the RGB data when the RGB data is an $N^{th}$ image frame in the picture file, where N is a positive integer greater than 1 and less than or equal to a total number of frames.

In an embodiment, when training the local color table information of the $(N-1)^{th}$ frame of the RGB data by using the RGB value of each pixel in the RGB data to generate the local color table information of the RGB data, the processor 4001 specifically performs the following steps:

sorting at least one source RGB value in the local color table information of the $(N-1)^{th}$ frame of the RGB data in a preset sorting manner of the G component to generate trained color table information;

acquiring, from the trained color table information, a fifth source RGB value in which the G component is closest to the G component of the current pixel in the RGB data, and acquiring a fifth color index of the fifth source RGB value;

acquiring, from the trained color table information in a preset range with the fifth color index being the center, a sixth source RGB value having the smallest difference from the RGB value of the current pixel, and acquiring a sixth color index of the sixth source RGB value;

replacing the sixth source RGB value with the RGB value of the current pixel, and changing a plurality of source RGB values in a preset range with the sixth color index being the center in the trained color table information by using a preset weight value and the RGB value of the current pixel;

acquiring the changed trained color table information when the current pixel is not the last pixel in the RGB data, using a next pixel of the current pixel as a current pixel, and starting to acquire, from the trained color table information, a fifth source RGB value in which the G component is closest to the G component of the current pixel in the RGB data; and acquiring the changed trained color table information when the current pixel is the last pixel in the RGB data, and determining the trained color table information as the local color table information of the RGB data.

In an embodiment, the picture file is a GIF image.

In this embodiment of the present application, global color table information or initial color table information is trained to generate local color table information of the RGB data, so that image distortion is effectively reduced. The G component is used to acquire a source RGB value having the closest G component, a search for a color index is made in a small range in the color table information, and it is not necessary to traverse all the color table information, so that the complexity of training the local color table information can be lowered, thereby further improving the efficiency of encoding the picture file.

A person of ordinary skill in the art may understand that all or some of the steps in the methods of the foregoing embodiments may be implemented by a computer program instructing relevant hardware. The program may be stored in a computer-readable storage medium. When the program is run, the procedures of the embodiments of the foregoing method are performed. The storage medium may be a magnetic disk, an optical disk, a Read-Only Memory (ROM), a RAM, and the like.

The foregoing descriptions are merely embodiments of the present application but certainly are not intended to limit the patent scope of the present application. Therefore, equivalent variations made according to the claims of the present application still fall within the scope of the present application.

What is claimed is:

1. A method, comprising:
   receiving, by a receiving device comprising a memory and a processor in communication with the memory, compressed image data transmitted by a transmitter;
   parsing, by the receiving device, the compressed image data to acquire picture header information data segment and data stream of a picture, wherein the picture header information data segment represents a starting of the compressed image data and comprises an image feature information segment which is used for representing at least one of delay information, a total number of frames, and global color table information of the picture;
   generating, by the receiving device, YUV data according to the data stream of the picture; and
   converting, by the receiving device, the YUV data into RGB data based on the picture header information data segment.

2. The method according to claim 1, further comprising:
updating, by the receiving device, an RGB value in the RGB data according to the global color table information in the picture header information data segment, wherein the RGB data is converted by using color space conversion formulas; and
encoding, by the receiving device, the updated RGB data by using the delay information and the total number of frames indicated in the picture header information data segment.

3. The method according to claim 2, wherein the updating the RGB value in the RGB data according to the global color table information in the picture header information data segment comprises:
when the RGB data belongs to a first image frame of the picture and the picture header information data segment indicates that the global color table information is existed, training, by the receiving device, the global color table information by using the RGB value in the RGB data to generate local color table information of the RGB data; and
updating, by the receiving device, the RGB value in the RGB data, which is corresponding to each current pixel of the picture, by using the local color table information of the RGB data.

4. The method according to claim 3, wherein the training the global color table information by using the RGB value in the RGB data to generate the local color table information of the RGB data comprises:
sorting, by the receiving device, at least one source RGB value in the global color table information in a preset sorting manner of a G component to generate trained color table information;
acquiring, by the receiving device from the trained color table information, a first source RGB value in which the G component is closest to the G component of a current pixel in the RGB data, and acquiring a first color index of the first source RGB value;
acquiring, by the receiving device from the trained color table information in a preset range with the first color index being the center, a second source RGB value having the smallest difference from the RGB value of the current pixel, and acquiring a second color index of the second source RGB value;
replacing, by the receiving device, the second source RGB value with the RGB value of the current pixel;
changing, by the receiving device, a plurality of source RGB values, in a preset range with the second color index being the center in the trained color table information, by using a preset weight value and the RGB value of the current pixel; and
when the current pixel is the last pixel in the RGB data, acquiring, by the receiving device, the trained color table information and determining the trained color table information as the local color table information of the RGB data.

5. The method according to claim 4, wherein when the current pixel is not the last pixel in the RGB data, acquiring, by the receiving device, the changed and trained color table information, while using a next pixel of the current pixel as a current pixel, and starting to acquire, from the trained color table information, a first source RGB value in which the G component is closest to the G component of a current pixel in the RGB data.

6. The method according to claim 2, wherein the updating the RGB value in the RGB data according to the global color table information in the picture header information data segment comprises:
when the RGB data belongs to a first image frame in the picture and the picture header information data segment does not have the global color table information, training, by the receiving device, initial color table information by using the RGB value in the RGB data to generate the global color table information of the RGB data; and
updating, by the receiving device, the RGB value in the RGB data, which is corresponding to each current pixel of the picture, by using the trained global color table information of the RGB data.

7. The method according to claim 6, wherein the training the initial color table information by using the RGB value of each pixel in the RGB data to generate the global color table information of the RGB data comprises:
acquiring, by the receiving device from the initial color table information, a third source RGB value in which a G component is closest to a G component of a current pixel in the RGB data, and acquiring a third color index of the third source RGB value;
acquiring, by the receiving device from the initial color table information in a preset range with the third color index being the center, a fourth source RGB value having the smallest difference from the RGB value of the current pixel, and acquiring a fourth color index of the fourth source RGB value;
replacing, by the receiving device, the fourth source RGB value with the RGB value of the current pixel, and changing a plurality of source RGB values in a preset range with the fourth color index being the center in the initial color table information by using a preset weight value and the RGB value of the current pixel; and
when the current pixel is the last pixel in the RGB data, acquiring, by the receiving device, trained color table information and determining the initial color table information as the global color table information of the RGB data.

8. The method according to claim 7, wherein when the current pixel is not the last pixel in the RGB data, acquiring, by the receiving device, the changed initial color table information while using a next pixel of the current pixel as a current pixel, and starting to acquire, from the initial color table information, a third source RGB value in which a G component is closest to a G component of the current pixel in the RGB data.

9. The method according to claim 2, wherein the updating the RGB value in the RGB data according to the global color table information in the picture header information data segment comprises:
training, by the receiving device, local color table information of an $(N-1)^{th}$ frame of the RGB data by using the RGB value of each pixel in the RGB data to generate local color table information of the RGB data when the RGB data is an $N^{th}$ image frame in the picture; and
updating, by the receiving device, the RGB value of each current pixel by using the local color table information of the RGB data, wherein N is a positive integer greater than 1 and less than or equal to the total number of frames.

10. The method according to claim 9, wherein the training the local color table information of the $(N-1)^{th}$ frame of the RGB data by using the RGB value of each pixel in the RGB data to generate local color table information of the RGB data when the RGB data is the $N^{th}$ image frame in the picture comprises:
- sorting, by the receiving device, at least one source RGB value in the local color table information of the $(N-1)^{th}$ frame of the RGB data in a preset sorting manner of a G component to generate trained color table information;
- acquiring, by the receiving device from the trained color table information, a fifth source RGB value in which the G component is closest to a G component of the current pixel in the RGB data, and acquiring a fifth color index of the fifth source RGB value;
- acquiring, by the receiving device from the trained color table information in a preset range with the fifth color index being the center, a sixth source RGB value having the smallest difference from the RGB value of the current pixel, and acquiring a sixth color index of the sixth source RGB value;
- replacing, by the receiving device, the sixth source RGB value with the RGB value of the current pixel, and changing a plurality of source RGB values in a preset range with the sixth color index being the center in the trained color table information by using a preset weight value and the RGB value of the current pixel; and
- when the current pixel is the last pixel in the RGB data, acquiring, by the receiving device, the changed and trained color table information, and determining the trained color table information as the local color table information of the RGB data.

11. The method according to claim 10, wherein when the current pixel is not the last pixel in the RGB data, acquiring, by the receiving device, the changed and trained color table information while using a next pixel of the current pixel as a current pixel, and starting to acquire, from the trained color table information, a fifth source RGB value in which a G component is closest to a G component of the current pixel in the RGB data.

12. The method according to claim 2, wherein before converting the YUV data into the RGB data, the method further comprises:
- determining, by the receiving device, the color space conversion formulas according to a domain range of a luminance component and a domain range of a chrominance component; and
- when the domain range of the luminance component is [16, 235] and the domain range of the chrominance component is [16, 240], setting, by the receiving device, the color space conversion formulas as:

$R=\text{Clip3}(0,255,(298*Y+409*(Cr-128)+128)>>8);$ $G=\text{Clip3}(0,255,(298*Y-100*(Cb-128)+208*(Cr-128)+128)>>8);$ and $B=\text{Clip3}(0,255,(298*Y+516*(Cb-128)+128)>>8),$ wherein "+128" is used for rounding a value of R, a value of B, and a value of G, and ">>8" represents division by an eighth power of 2.

13. The method according to claim 2, wherein before converting the YUV data into the RGB data, the method further comprises:
- determining, by the receiving device, the color space conversion formulas according to a domain range of a luminance component and a domain range of a chrominance component; and
- if the domain ranges of the luminance component and the chrominance component are both [0, 255], setting, by the receiving device, the color space conversion formulas are defined as:

$R=\text{Clip3}(0,255,Y+(359*(Cr-128)+128)>>8);$ $G=\text{Clip3}(0,255,Y-(88*(Cb-128)+183*(Cr-128)+128)>>8);$ and $B=\text{Clip3}(0,255,Y+(454*(Cb-128)+128)>>8),$ wherein "+128" is used for rounding a value of R, a value of B, and a value of G, and ">>8" represents division by an eighth power of 2.

14. The method according to claim 2, wherein the encoding the updated RGB data by using the delay information and the total number of frames indicated in the picture header information data segment comprises:
- performing, by the receiving device, image encoding on color index of each pixel in the RGB data based on the delay information and the total number of frames and by using Lempel-Ziv-Welch (LZW) encoding.

15. An apparatus, comprising:
- a processor; and
- a memory in communication with the processor, wherein the memory stores processor-executable instructions, that when executed by the processor, cause the processor to:
  - receive compressed image data transmitted by a transmitter,
  - parse the compressed image data to acquire picture header information data segment and data stream of a picture, wherein the picture header information data segment represents a starting of the compressed image data and comprises an image feature information segment which is used for representing at least one of delay information, a total number of frames, and global color table information of the picture,
  - generate YUV data according to the data stream of the picture, and
  - convert the YUV data into RGB data based on the picture header information data segment.

16. The apparatus according to claim 15, wherein the instructions further cause the processor to:
- update an RGB value in the RGB data according to the global color table information in the picture header information data segment, wherein the RGB data is converted by using color space conversion formulas; and
- encoding the updated RGB data by using the delay information and the total number of frames indicated in the picture header information data segment.

17. The apparatus according to claim 16, wherein when causing the processor to update the RGB value in the RGB data according to the global color table information in the picture header information data segment, the instructions cause the processor to:
- train the global color table information by using the RGB value in the RGB data to generate local color table information of the RGB data, when the RGB data belongs to a first image frame of the picture and the picture header information data segment indicates that the global color table information is existed; and
- update the RGB value by using the local color table information of the RGB data.

18. The apparatus according to claim 17, wherein when causing the processor to train the global color table information by using the RGB value in the RGB data to generate local color table information of the RGB data, the instructions cause the processor to:
  sort at least one source RGB value in the global color table information in a preset sorting manner of a G component to generate trained color table information;
  acquire, from the trained color table information, a first source RGB value in which the G component is closest to the G component of a current pixel in the RGB data, and acquire a first color index of the first source RGB value;
  acquire, from the trained color table information in a preset range with the first color index being the center, a second source RGB value having the smallest difference from the RGB value of the current pixel, and acquire a second color index of the second source RGB value;
  replace the second source RGB value with the RGB value of the current pixel;
  change a plurality of source RGB values, in a preset range with the second color index being the center in the trained color table information, by using a preset weight value and the RGB value of the current pixel; and
  when the current pixel is the last pixel in the RGB data, acquire the trained color table information and determine the trained color table information as the local color table information of the RGB data.

19. The apparatus according to claim 18, wherein when the current pixel is not the last pixel in the RGB data, the instructions cause the processor to:
  acquire the changed and trained color table information, while using a next pixel of the current pixel as a current pixel, and start to acquire, from the trained color table information, a first source RGB value in which the G component is closest to the G component of a current pixel in the RGB data.

20. A non-transitory computer readable medium storing a computer-executable program, the computer-executable program, when executed by a processor, causing the processor to:
  receive compressed image data transmitted by a transmitter;
  parse the compressed image data to acquire picture header information data segment and data stream of a picture, wherein the picture header information data segment represents a starting of the compressed image data and comprises an image feature information segment which is used for representing at least one of delay information, a total number of frames, and global color table information of the picture;
  generate YUV data according to the data stream of the picture; and
  convert the YUV data into RGB data based on the picture header information data segment.

* * * * *